(12) United States Patent
Moll et al.

(10) Patent No.: US 10,475,226 B2
(45) Date of Patent: Nov. 12, 2019

(54) COLORING KIT FOR CAPTURING AND ANIMATING TWO-DIMENSIONAL COLORED CREATION

(71) Applicant: CRAYOLA, LLC, Easton, PA (US)

(72) Inventors: Joseph Thomas Moll, Bethlehem, PA (US); Brian Nemeckay, Belvidere, NJ (US); Stephen Weiss, Easton, PA (US)

(73) Assignee: CRAYOLA LLC, Easton, PA (US)

( * ) Notice: Subject to any disclaimer, the term of this patent is extended or adjusted under 35 U.S.C. 154(b) by 0 days.

(21) Appl. No.: 15/953,073

(22) Filed: Apr. 13, 2018

(65) Prior Publication Data

US 2018/0232932 A1 Aug. 16, 2018

Related U.S. Application Data

(63) Continuation-in-part of application No. 15/168,243, filed on May 31, 2016, now Pat. No. 9,946,448, which is a continuation-in-part of application No. 14/213,586, filed on Mar. 14, 2014, now Pat. No. 9,355,487.

(60) Provisional application No. 61/788,381, filed on Mar. 15, 2013.

(51) Int. Cl.
*G06T 13/40* (2011.01)
*G06T 13/60* (2011.01)

(52) U.S. Cl.
CPC .............. *G06T 13/40* (2013.01); *G06T 13/60* (2013.01); *G06T 2213/08* (2013.01)

(58) Field of Classification Search
CPC ...... G06T 13/40; G06T 13/60; G06T 2213/08
See application file for complete search history.

(56) References Cited

U.S. PATENT DOCUMENTS

| 5,277,302 | A | 1/1994 | Seisa |
| 5,420,607 | A | 5/1995 | Miller et al. |
| 5,957,697 | A | 9/1999 | Iggulden et al. |
| 6,098,793 | A | 8/2000 | Jaksha |
| 6,123,362 | A | 9/2000 | Squilla et al. |
| 6,535,215 | B1 | 3/2003 | DeWitt et al. |

(Continued)

OTHER PUBLICATIONS

Non-Final Office Action dated Jun. 18, 2015 in U.S. Appl. No. 14/213,544, 8 pages.

(Continued)

*Primary Examiner* — Maurice L. McDowell, Jr.
(74) *Attorney, Agent, or Firm* — Shook, Hardy & Bacon, L.L.P.

(57) ABSTRACT

A digital template animation kit is provided for generating a three-dimensional animation corresponding to a captured two-dimensional template. In embodiments, a template animation kit includes a template portfolio having template designs for coloring in by a user. A computing device executing a template animation kit application, such as a digital fashion portfolio kit application, may then capture an image of the user-completed drawings on each template design. In some embodiments, capturing an image of a template design includes identifying a coloring figure identifier, an upper page guide identifier, and a lower page guide identifier. In further embodiments, the captured images of two-dimensional template designs are applied to three dimensional digital templates for animation within a digital template animation environment.

6 Claims, 34 Drawing Sheets

(56) References Cited

U.S. PATENT DOCUMENTS

| | | |
|---|---|---|
| 6,608,631 B1 | 8/2003 | Milliron |
| 6,745,907 B2 | 6/2004 | Kjelgaard |
| 6,921,336 B1 | 7/2005 | Best |
| 6,958,752 B2 | 10/2005 | Jennings, Jr. et al. |
| 7,079,153 B2 | 7/2006 | Derry et al. |
| 7,532,771 B2 | 5/2009 | Taylor et al. |
| 7,567,263 B2 | 7/2009 | Georgiev et al. |
| 8,139,036 B2 | 3/2012 | Do et al. |
| 8,493,408 B2 | 7/2013 | Williamson et al. |
| 8,760,391 B2 | 6/2014 | Hawkins |
| 8,896,621 B1 | 11/2014 | Sipher et al. |
| 8,963,868 B2 | 2/2015 | Nakamura et al. |
| 9,182,832 B2 | 11/2015 | Natori |
| 9,182,882 B2 | 11/2015 | Fowler et al. |
| 9,355,487 B2 | 5/2016 | Moll et al. |
| 2002/0171746 A1 | 11/2002 | Stephany et al. |
| 2003/0104343 A1 | 6/2003 | Rehkemper et al. |
| 2003/0133629 A1 | 7/2003 | Sayers |
| 2004/0156556 A1 | 8/2004 | Lopez |
| 2006/0001650 A1 | 1/2006 | Robbins et al. |
| 2006/0209040 A1 | 9/2006 | Garside et al. |
| 2006/0274070 A1 | 12/2006 | Herman et al. |
| 2008/0123993 A1 | 5/2008 | Widdowson |
| 2008/0156667 A1 | 7/2008 | Huggins |
| 2009/0002327 A1 | 1/2009 | Wilson et al. |
| 2009/0066700 A1 | 3/2009 | Harding et al. |
| 2009/0079743 A1 | 3/2009 | Pearson et al. |
| 2009/0263038 A1 | 10/2009 | Luo et al. |
| 2010/0199227 A1 | 8/2010 | Xiao et al. |
| 2010/0223568 A1 | 9/2010 | Quek et al. |
| 2011/0099517 A1 | 4/2011 | Mull et al. |
| 2011/0113624 A1 | 5/2011 | Harada |
| 2011/0175821 A1 | 7/2011 | King |
| 2011/0191719 A1 | 8/2011 | Hinckley et al. |
| 2011/0227871 A1 | 9/2011 | Cannon |
| 2011/0285748 A1 | 11/2011 | Slatter et al. |
| 2012/0122531 A1 | 5/2012 | Aoki et al. |
| 2012/0122553 A1 | 5/2012 | Bunch et al. |
| 2012/0142415 A1 | 6/2012 | Lindsay |
| 2012/0179995 A1 | 7/2012 | Cok et al. |
| 2012/0185805 A1 | 7/2012 | Louch et al. |
| 2012/0218262 A1 | 8/2012 | Yomdin et al. |
| 2012/0275704 A1 | 11/2012 | Cok et al. |
| 2012/0299912 A1* | 11/2012 | Kapur ............... G06F 3/017 345/419 |
| 2012/0321217 A1 | 12/2012 | Cok et al. |
| 2013/0063418 A1 | 3/2013 | Kaschalk et al. |
| 2013/0120281 A1 | 5/2013 | Harris |
| 2013/0120436 A1 | 5/2013 | Krishnaswamy et al. |
| 2013/0201354 A1 | 8/2013 | LaScolea et al. |
| 2013/0222385 A1 | 8/2013 | Dorsey et al. |
| 2013/0239104 A1 | 9/2013 | Savant et al. |
| 2013/0258117 A1 | 10/2013 | Penov et al. |
| 2013/0278540 A1 | 10/2013 | Yilmaz |
| 2014/0002417 A1 | 1/2014 | Yoshida |
| 2014/0050367 A1 | 2/2014 | Chen |
| 2014/0071251 A1 | 3/2014 | Nakamura et al. |
| 2014/0129990 A1 | 5/2014 | Xin et al. |
| 2014/0168098 A1 | 6/2014 | Lucero et al. |
| 2014/0197922 A1 | 7/2014 | Stanwood et al. |
| 2014/0300722 A1 | 10/2014 | Garcia |
| 2014/0307980 A1 | 10/2014 | Hilt |
| 2015/0170418 A1 | 6/2015 | Flynn et al. |

OTHER PUBLICATIONS

Pre-Interview Communication dated Jun. 19, 2015 in U.S. Appl. No. 14/211,815, 5 pages.

First Action Interview Office Action dated Sep. 9, 2015 in U.S. Appl. No. 14/211,815, 8 pages.

First Action Interview Preinterview Communication dated Sep. 17, 2015 in U.S. Appl. No. 14/213,564, 5 pages.

First Action Interview Preinterview Communication dated Sep. 17, 2015 in U.S. Appl. No. 14/213,526, 7 pages.

Clark et al, An Interactive Augmented Reality Coloring Book, Dec. 12-15, 2011, SIGGRAPH Asia 2011. pp. 1.

First Action Interview Preinterview Communication dated Nov. 13, 2015 in U.S. Appl. No. 14/213,586, 7 pages.

"Fat Brain Toys, Art 101 Double Sided Trifold Easel Art Set—179 pc, Oct. 20, 2010, http://web.archive.org/web/20101030082932/http://www.fatbraintoys.com/toy_companies/dm_creations/art_101_double_sided_trifold_easel_art_set_179_pc.cfm, pp. 1-2".

First Action Interview Office Action dated Jan. 15, 2016 in U.S. Appl. No. 14/213,564, 3 pages.

Notice of Allowance dated Jan. 29, 2016 in U.S. Appl. No. 14/213,586, 22 pages.

First Action Interview Office Action dated Feb. 1, 2016 in U.S. Appl. No. 14/213,526, 4 pages.

Final Office Action dated Feb. 26, 2016 in U.S. Appl. No. 14/211,815, 17 pages.

Notice of Allowance dated Apr. 7, 2016 in U.S. Appl. No. 14/213,586, 3 pages.

Final Office Action dated May 25, 2016 in U.S. Appl. No. 14/213,564, 14 pages.

Notice of Allowance dated Jun. 29, 2016 in U.S. Appl. No. 14/213,526, 7 pages.

Non-Final Office Action dated Mar. 3, 2017 in U.S. Appl. No. 14/213,564, 16 pages.

Non-Final Office Action dated Apr. 21, 2017 in U.S. Appl. No. 14/211,815, 21 pages.

Final Office Action dated Aug. 30, 2017 in U.S. Appl. No. 14/213,564, 17 pages.

Non-Final Office Action dated Aug. 21, 2017 in U.S. Appl. No. 15/168,243, 12 pages.

Notice of Allowance dated Dec. 11, 2017 in U.S. Appl. No. 15/168,243, 9 pages.

Final Office Action dated Dec. 14, 2017 in U.S. Appl. No. 14/211,815, 23 pages.

* cited by examiner

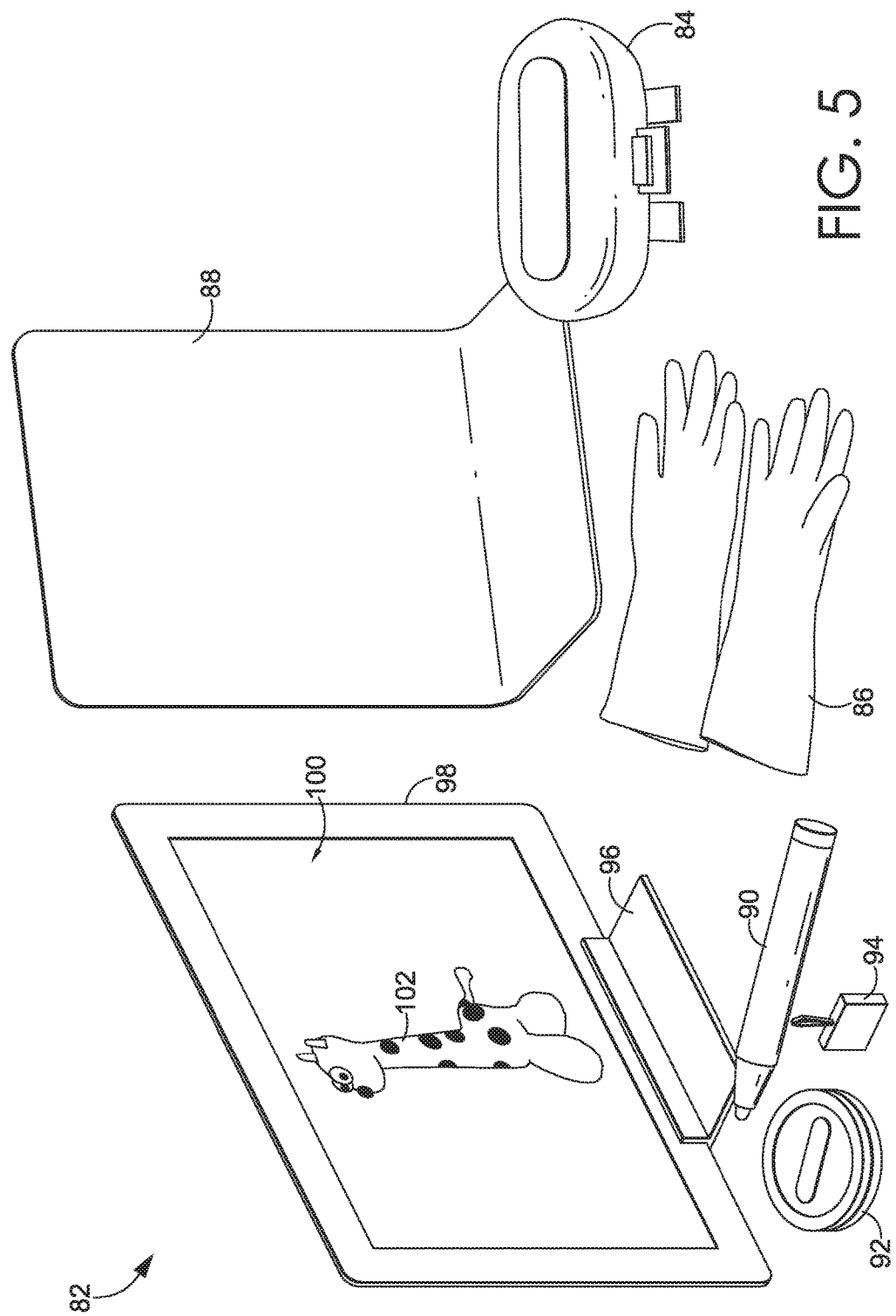

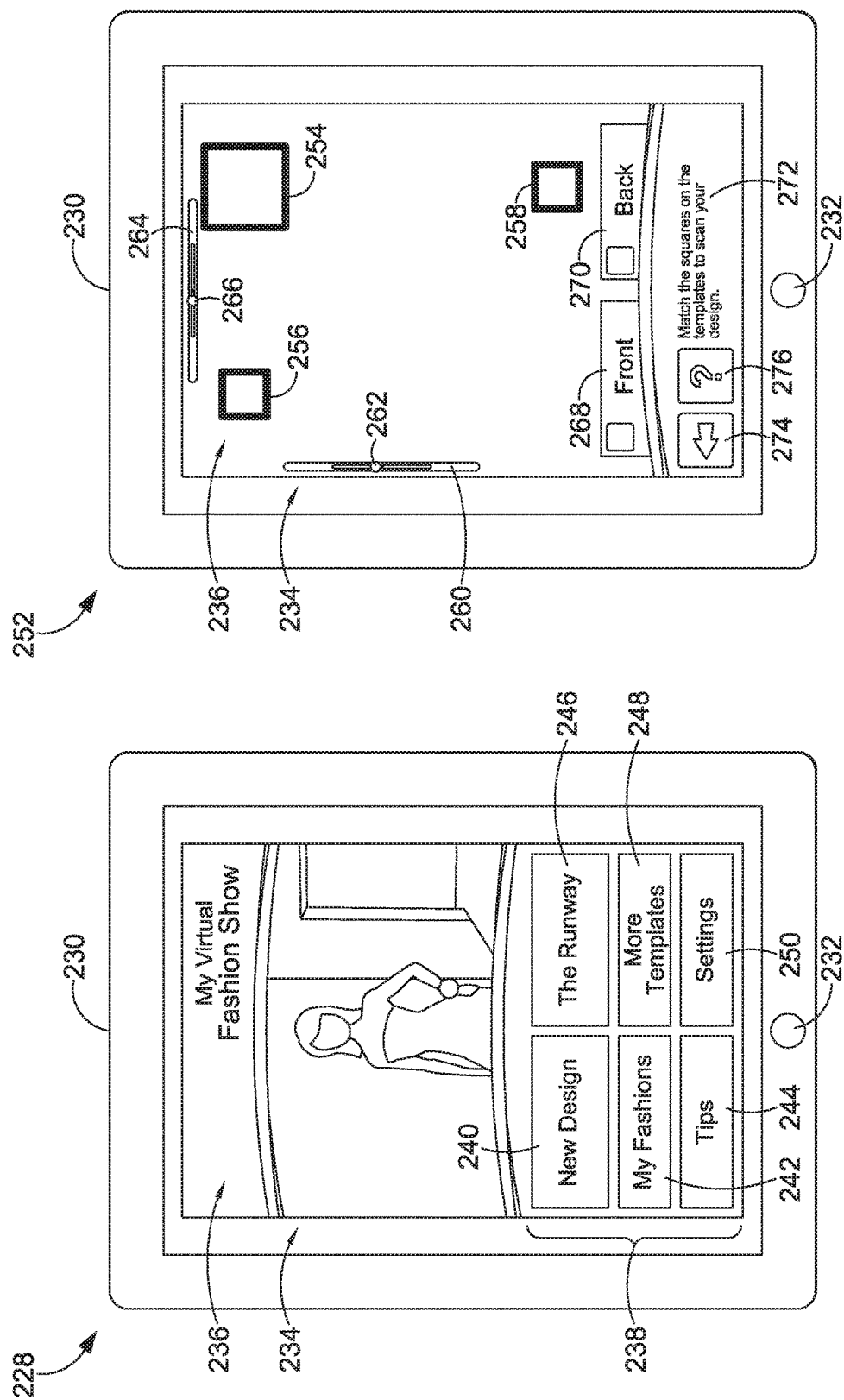

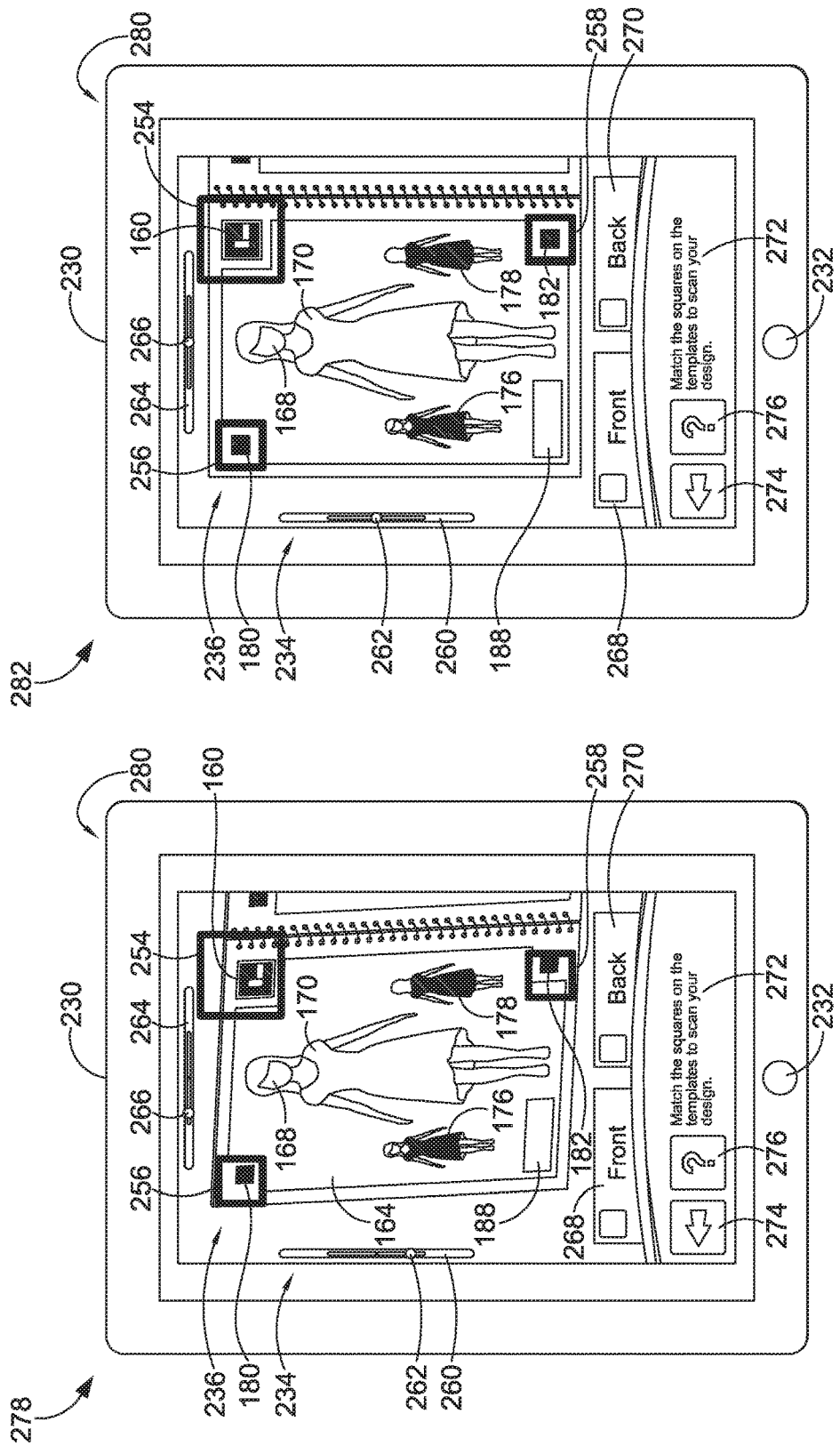

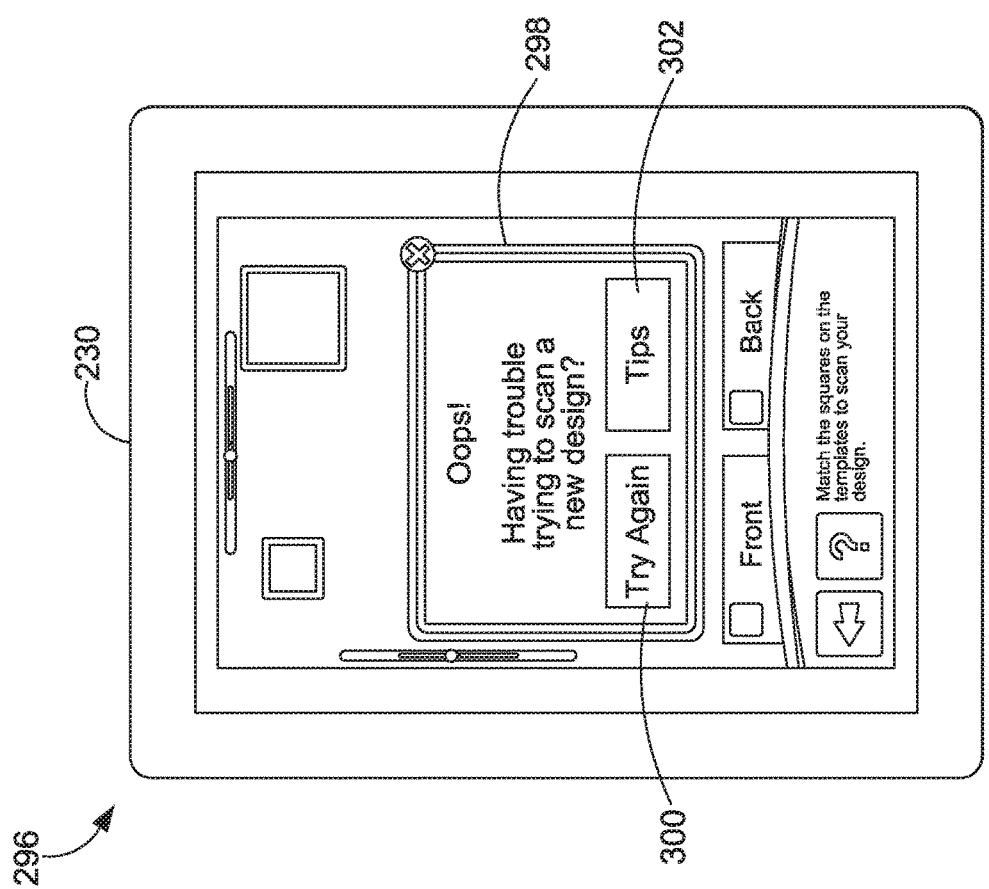

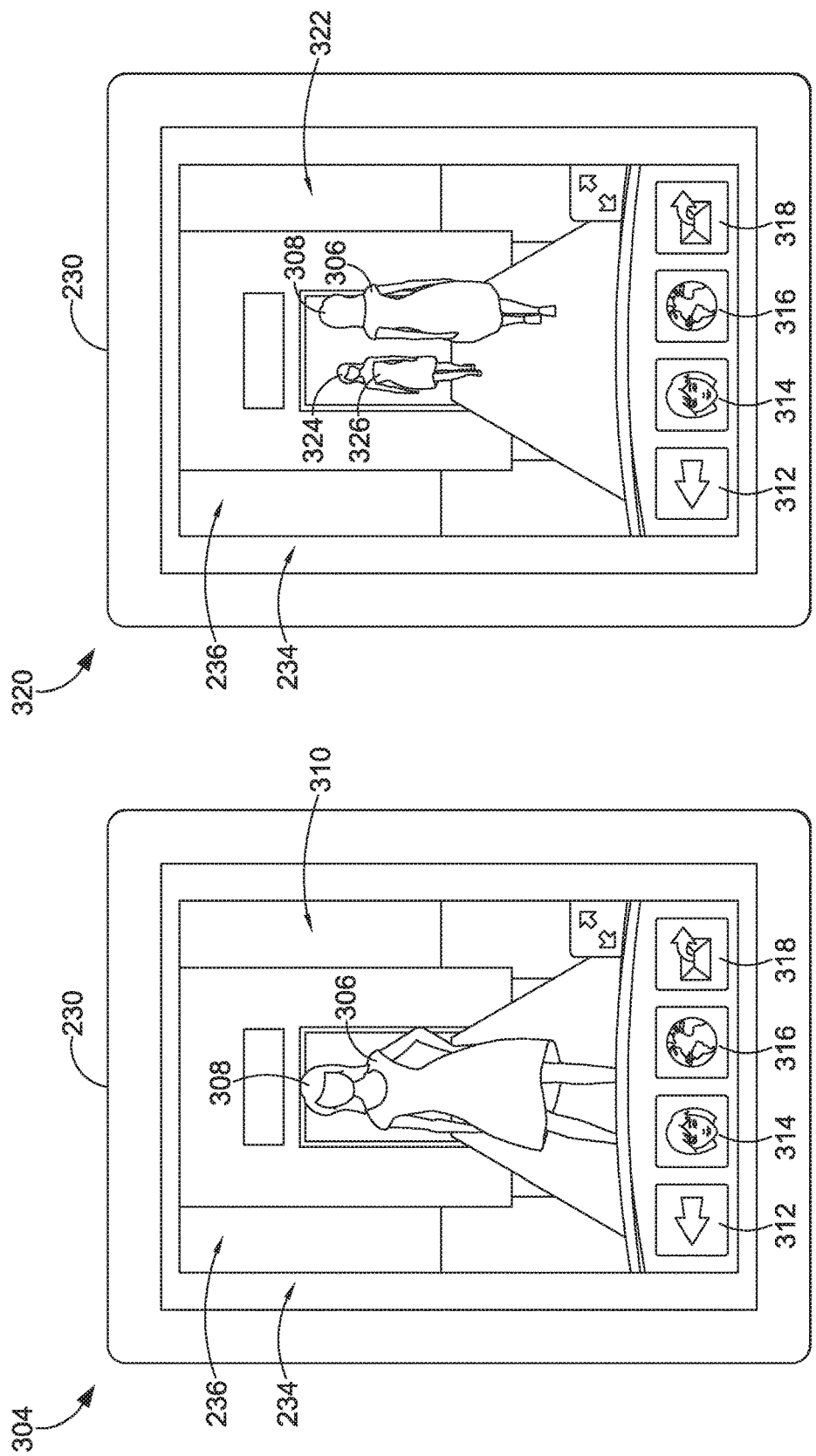

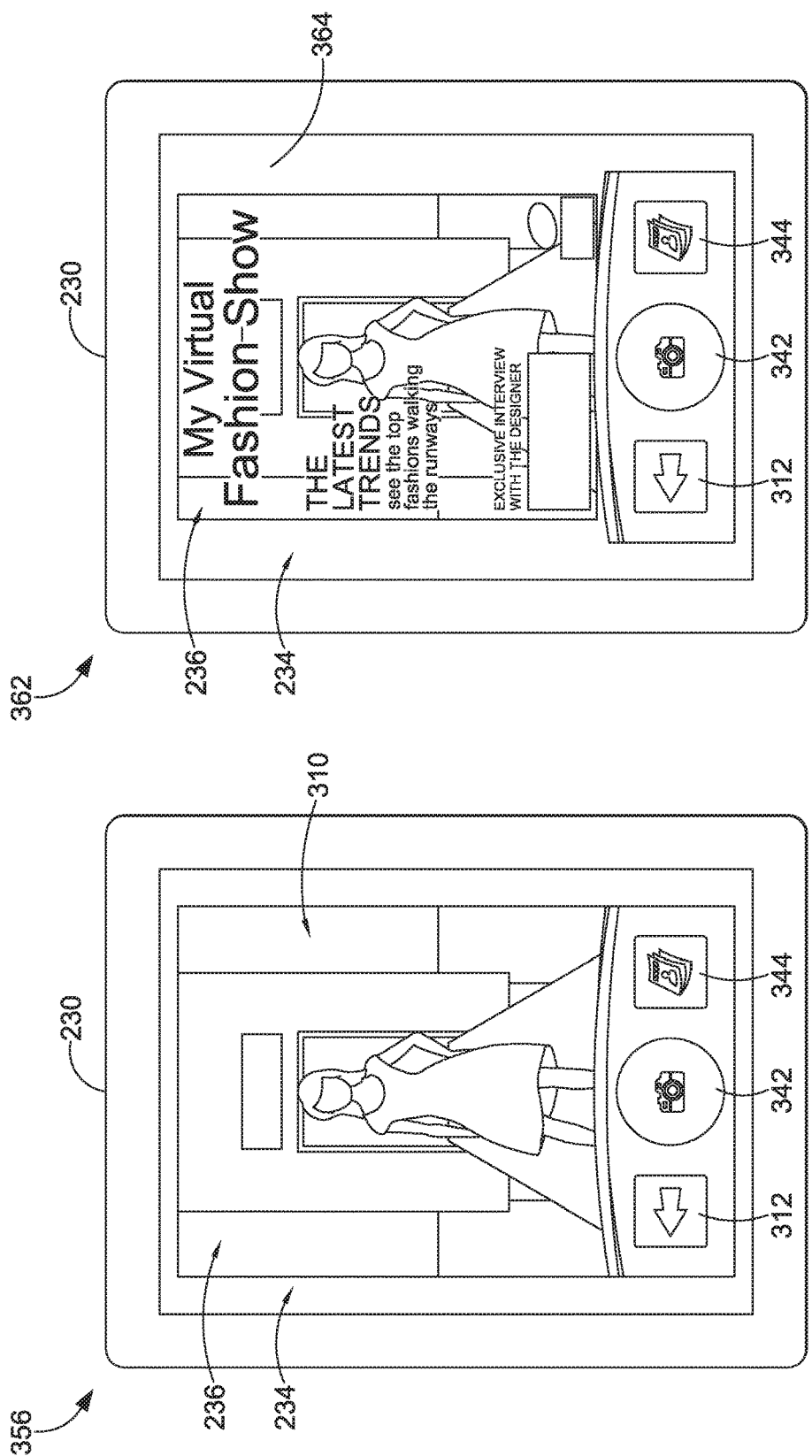

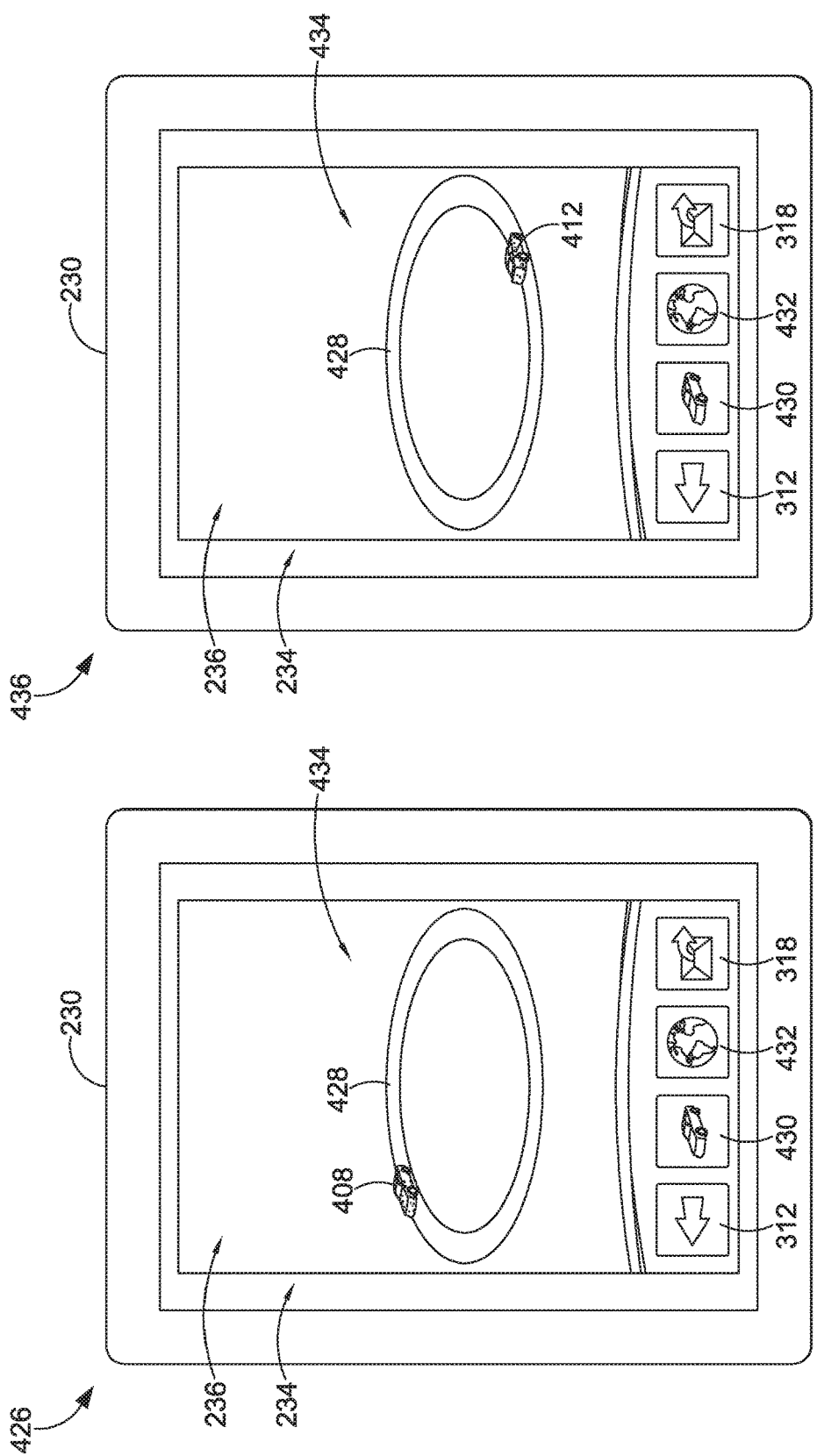

COLORING KIT FOR CAPTURING AND ANIMATING TWO-DIMENSIONAL COLORED CREATION

CROSS-REFERENCE TO RELATED APPLICATIONS

This application is a continuation-in-part of U.S. patent application Ser. No. 15/168,243, filed May 31, 2016, entitled "Coloring Kit For Capture And Animating Two-Dimensional Colored Creation," which is a continuation-in-part of U.S. patent application Ser. No. 14/213,586, filed Mar. 14, 2014, entitled "Coloring Kit For Capturing And Animating Two-Dimensional Colored Creation," now U.S. Pat. No. 9,355,487, issued May 31, 2016, which claims the benefit of U.S. Provisional Application No. 61/788,381, filed Mar. 15, 2013, entitled "Digital Fashion Portfolio And Green Screen Animation Kit," which is hereby incorporated by reference in its entirety.

BRIEF SUMMARY OF THE INVENTION

Embodiments of the invention are defined by the claims below, not this summary. A high-level overview of various aspects of the invention are provided here for that reason, to provide an overview of the disclosure, and to introduce a selection of concepts that are further described in the detailed description section below. This summary is not intended to identify key features or essential features of the claimed subject matter, nor is it intended to be used as an aid in isolation to determine the scope of the claimed subject matter.

In brief and at a high level, this disclosure describes, among other things, a digital fashion portfolio kit for customizing printed templates of fashion drawings and animating the drawings on a virtual runway. Embodiments of the kit include a fashion portfolio, design templates pages having template outlines, design markers, and a shading tool. As part of the kit, a user can color, shade, and pattern an outfit on a printed, template outline of the template pages in the fashion portfolio. In embodiments, the components of the kit are configured to interact with an application for execution by a computing device, such as a personal computer or handheld device that captures an image of a colored-in template outline using a camera associated with the computing device. Having captured the image of the colored-in template outline, the application may associate the image with a particular digital template for the physical template outline. As such, an application may automatically recognize a line art drawing and apply the user-provided coloring to the corresponding digital template, thereby creating a modified digital template.

In further embodiments, an automobile design portfolio kit for customizing printed templates of automobile drawings and animating the drawings in virtual settings is provided. Embodiments of the kit include a design portfolio having printed template pages with template outlines, design marking devices (i.e., crayons, markers, colored pencils, etc.), and one or more accessories. As part of the kit, a user may color, shade, and/or pattern an automobile on a template outline of the printed, template pages in the design portfolio. In embodiments, the components of the kit are configured to interact with an application for execution by a computing device, such as a personal computer or handheld device that captures an image of a colored-in template outline using a camera associated with the computing device. Having captured the image of the colored-in template outline, the application may associate the captured, colored-in image with a particular digital template for the physical template outline. In other words, the physical template of a particular automobile (e.g., a drawing outline) may be colored in by a user on a portfolio template page (e.g., using crayons, markers, colored pencils, etc.) and the designed/customized content of the automobile template may become animated with the user's markings, on a screen, in one aspect. As such, an application executed by a computing device may automatically recognize a line art drawing on a portfolio template page, receive a captured image of one or more user markings within the line art drawing (i.e., a user's colored-in markings), and apply the user-provided markings/coloring to a corresponding digital template.

Embodiments also include generating a modified digital template from two or more template outlines. As mentioned, having captured the image of the colored-in template outline, the application may associate a digital template for each physical template outline in the captured, colored-in image. The application may repeat this process to generate a plurality of modified digital templates. In one aspect, the template designs relate to different fashion items of a fashion outfit. The application can then generate a complex modified digital template (e.g., a virtual fashion outfit) from the plurality of modified digital templates. In embodiments, this may be achieved through a user interface that allows a user to quickly query the modified digital templates (e.g., fashion items) and choose which to combine, thereby generating the complex modified digital template.

In further embodiments, the digital template maybe applied to a three-dimensional digital template to create an enhanced three-dimensional template. In other words, if the digital template were a virtual fashion outfit, the virtual fashion outfit may be applied to a three-dimensional digital template (e.g., a model). In some embodiments, the three-dimensional digital template is customizable by the user such that one or more features of the three-dimensional digital template may be changed (e.g., a model's hairstyle). In further embodiments, the application can create an animation scene, such as a fashion show, incorporating the enhanced three-dimensional digital template.

Embodiments of the invention also include a green screen animation kit for animating scenes provided by a user. Green screen technology, and the detection of objects to the exclusion of green-colored items surrounding an object, is known to one of ordinary skill in the art and is therefore not described in detail herein. In embodiments of the invention, the green screen animation kit includes a green screen, a green screen glove, a special effects glyph, and a device stand for supporting a computing device executing an application associated with the kit. A physical object, such as a child's toy, may be manipulated by a user in front of the green screen while the user wears the green screen glove to mask the user's hand. As such, the image detected by the camera of the computing device, as processed according to an application, exhibits only the physical object in motion in front of the screen, without the user's hand. Additional enhancements may be made to the video captured by the kit, such as static backgrounds, animated movie backgrounds, and animated effects. In further embodiments, a special effects glyph may be coupled to the physical object such that the application detects movement of both the physical object and the glyph. In the video produced by the application, a variety of digital enhancements may replace the physical glyph.

BRIEF DESCRIPTION OF THE DRAWINGS

Illustrative embodiments of the invention are described in detail below with reference to the attached drawing figures, and wherein:

FIG. 5 is a perspective view of components of a green screen animation kit, in accordance with an embodiment of the invention;

FIG. 16 is a top view of the user interface of a computing device executing an application, in accordance with an embodiment of the invention;

FIG. 17 is a top view of the user interface of a computing device executing an application, in accordance with an embodiment of the invention;

FIG. 18 is a top view of the user interface of a computing device executing an application, in accordance with an embodiment of the invention;

FIG. 19 is a top view of the user interface of a computing device executing an application, in accordance with an embodiment of the invention;

FIG. 22 is a top view of the user interface of a computing device executing an application, in accordance with an embodiment of the invention;

FIG. 23 is a top view of the user interface of a computing device executing an application, in accordance with an embodiment of the invention;

FIG. 24 is a top view of the user interface of a computing device executing an application, in accordance with an embodiment of the invention;

FIG. 28 is a top view of the user interface of a computing device executing an application, in accordance with an embodiment of the invention;

FIG. 29 is a top view of the user interface of a computing device executing an application, in accordance with an embodiment of the invention;

FIG. 35 is a top view of the user interface of a computing device executing an application, in accordance with an embodiment of the invention;

FIG. 36 is a top view of the user interface of a computing device executing an application, in accordance with an embodiment of the invention;

DETAILED DESCRIPTION OF THE INVENTION

Figure 1:
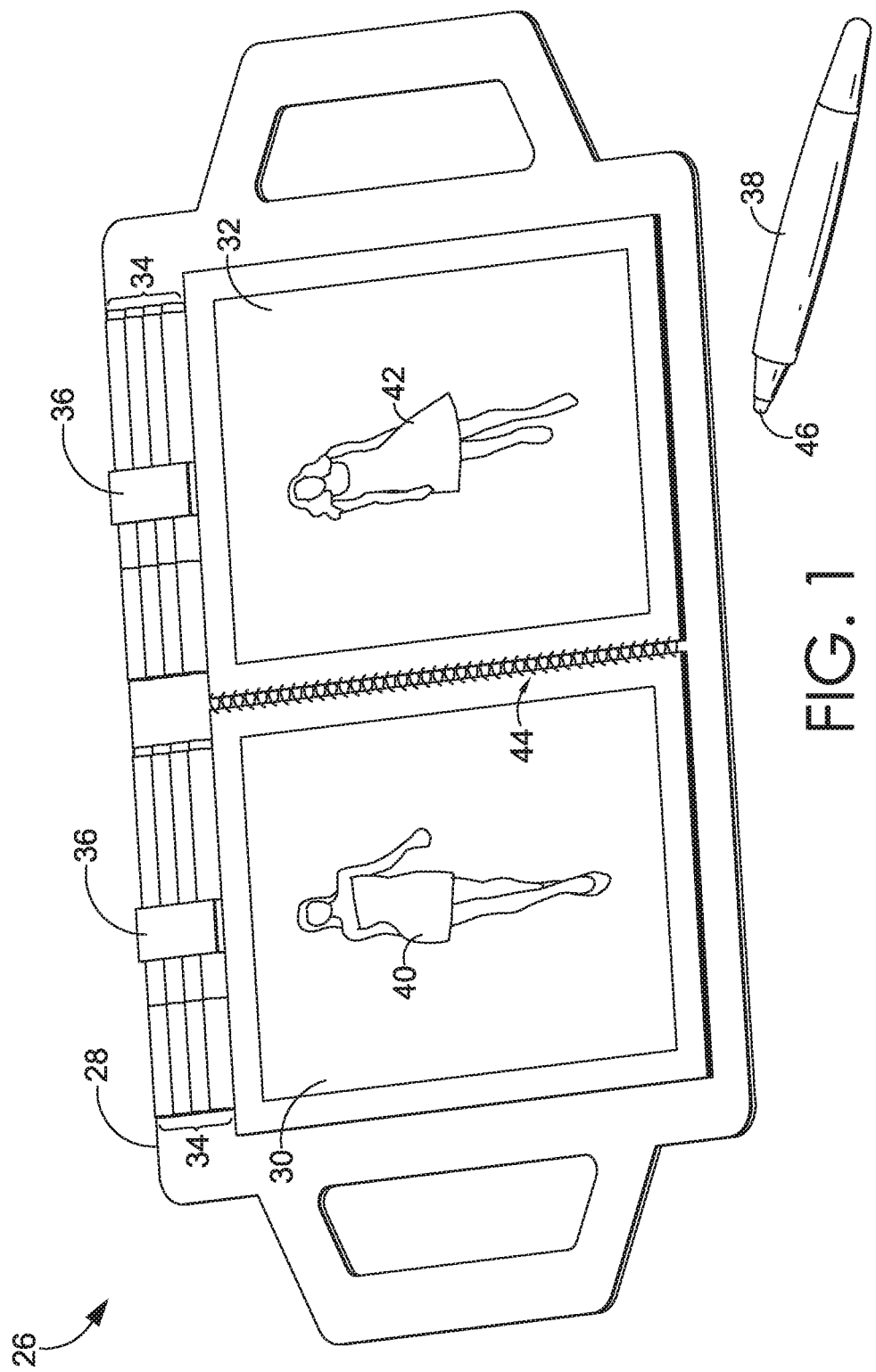
FIG. 1 is a top perspective view of a digital fashion portfolio kit, in accordance with an embodiment of the invention.

The subject matter of embodiments of the invention is described with specificity herein to meet statutory requirements. But the description itself is not intended to necessarily limit the scope of claims. Rather, the claimed subject matter might be embodied in other ways to include different steps or combinations of steps similar to the ones described in this document, in conjunction with other technologies. Terms should not be interpreted as implying any particular order among or between various steps herein disclosed unless and except when the order of individual steps is explicitly described.

In brief and at a high level, this disclosure describes, among other things, a digital fashion portfolio kit for customizing printed templates of fashion drawings and animating the drawings on a virtual runway. Embodiments of the kit include a fashion portfolio, design template pages having template outlines, design markers, and a shading tool. As part of the kit, a user can color, shade, and pattern an outfit on a printed, template outline of the template pages in the fashion portfolio. In embodiments, the components of the kit are configured to interact with an application for execution by a computing device, such as a personal computer or handheld device that captures an image of a colored-in template outline using a camera associated with the computing device. Having captured the image of the colored-in template outline, the application may associate the image with a particular digital template for the physical template outline. As such, an application may automatically recognize a line art drawing and apply the user-provided coloring to the corresponding digital template.

Embodiments of the invention also include a green screen animation kit for animating scenes provided by a user. Green screen technology, and the detection of objects to the exclusion of green-colored items surrounding an object, is known to one of ordinary skill in the art and is therefore not describe in detail herein. In embodiments of the invention, the green screen animation kit includes a green screen, a green screen glove, a special effects glyph, and a device stand for supporting a computing device executing an application associated with the kit. A physical object, such as a child's toy, may be manipulated by a user in front of the green screen while the user wears the green screen glove to mask the user's hand. As such, the image detected by the camera of the computing device, as processed according to an application, exhibits only the physical object in motion in front of the screen, without the user's hand. Additional enhancements may be made to the video captured by the kit, such as static backgrounds, animated movie backgrounds, and animated effects. In further embodiments, a special effects glyph may be coupled to the physical object such that the application detects movement of both the physical object and the glyph. In the video produced by the application, a variety of digital enhancements may replace the physical glyph.

In one embodiment of the invention, a digital template animation kit is provided. The digital template animation kit may include a template portfolio comprising at least one template page, the at least one template page comprising at least one template design. The digital template animation kit may further include a template animation kit application that when executed by a computing device generates a digital template animation environment, wherein the digital template animation environment comprises a captured image of at least a portion of the at least one template design.

With reference to another embodiment, a digital template animation kit is provided. The digital template animation kit may include, in some embodiments, an activation feature for a template animation kit application that when executed by a computing device generates a digital template animation environment. The digital template animation kit may further include a template portfolio comprising a plurality of template pages, the plurality of template pages comprising a first template page and a second template page, where the first template page includes a first template design, the second template page includes a second template design, and where the first template design and the second template design correspond to a three-dimensional digital template associated with the digital template animation environment of the template animation kit application. In embodiments, the digital template animation environment may be configured to animate the three-dimensional digital template based on a camera associated with the computing device capturing an image of the first template page and the second template page.

In a further embodiment of the invention, a method for generating, by a template animation kit application executed on a computing device, a three-dimensional digital template animation corresponding to a captured two-dimensional template design. The method includes: receiving a captured image of a first template page, the first template page comprising a first two-dimensional template design; receiving a captured image of a second template page, the second template page comprising a second two-dimensional template design; extracting a first portion of the first template page, the first portion corresponding to at least a portion of the first two-dimensional template design; extracting a second portion of the second template page, the second portion corresponding to at least a portion of the second two-dimensional template design; applying the extracted first portion and the extracted second portion to a three-dimensional digital template associated with the template animation kit application to provide an enhanced, three-dimensional digital template; and generating an animated scene comprising the enhanced, three-dimensional digital template.

In further embodiments of the invention, a template animation kit comprises: a template portfolio comprising at least one template page, the at least one template page comprising at least one template design and at least one page guide identifier; and a template animation kit application that, when executed on a computing device, generates a digital template animation environment, wherein the digital template animation environment incorporates a captured image of the at least one template design, and further wherein the captured image is captured based at least in part on the at least one page guide identifier.

In further embodiments, a digital template animation kit comprises a template portfolio comprising at least one template page, the at least one template page comprising at least one template design to receive a user marking. In addition, the digital template animation kit comprises a template animation kit application that when executed by a computing device generates a customizable animation environment, where the customizable animation environment comprises a captured image of the user marking made to the at least one template design.

Figure 13:
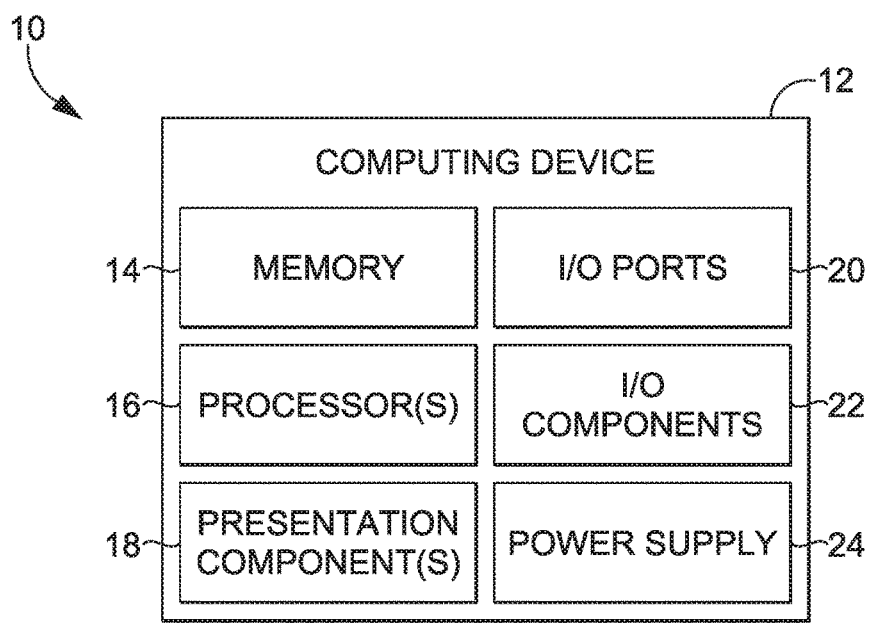
FIG. 13 is an exemplary computing system for executing an application, in accordance with embodiments of the invention.

Referring initially to FIG. 13, an exemplary operating environment 10 in which embodiments of the present invention may be implemented is described below to provide a general context for various aspects of the present invention. Exemplary operating environment 10 includes a computing device 12, which is but one example of a computing environment for use with the present invention. The computing device 12 is not intended to suggest any limitation as to the scope of use or functionality of embodiments of the invention, and should not be interpreted as having any dependency or requirement relating to any one component nor any combination of components illustrated. As one skilled in the art would recognize, one or more of the components of operating environment 10 may be used to execute an application associated with embodiments of the invention.

Computing device 12 may include hand-held devices, consumer electronics, general-purpose computers, more specialty computing devices, touch-pad computing devices, touch-screen computing devices, and the like. Embodiments of the invention may be described in the general context of computer code or machine-useable instructions, including computer-useable or computer-executable instructions such as program modules, being executed by the computing device 12. The computing device 12 typically includes a variety of computer-readable media, which may be any available media that is accessible by the computing device 12, such as computer storage media that stores computer-executable instructions for executing by the computing device. In one embodiment, computing device 12 is a touch-screen device having a camera, such as an iPod Touch®, iPad®, and/or an iPhone® device provided by Apple® Inc.

As shown in the exemplary embodiment included in FIG. 13, the computing device 12 includes the following components: a memory 14, one or more processors 16, one or more presentation components 18, one or more input/output (110) ports 20, one or more 1/0 components 22, and an illustrative power supply 24. As will be understood, the components of exemplary computing device 12 may be used in connection with one or more embodiments of the invention. In embodiments, computing device 12 may include fewer components than those depicted in FIG. 13, or other components in addition to those depicted in FIG. 13. In one embodiment, the computing device 12 may execute a template animation kit application to provide a template animation environment, such as a template animation environment of a fashion portfolio kit application.

The memory 14 includes computer-storage media in the form of volatile and/or nonvolatile memory that may be removable, non-removable, or a combination thereof. The computing device 12 also includes one or more processors 16 that read data from various entities such as the memory 14 or the 1/0 components 22. The presentation component(s) 18 present data indications to a user or other device, such as a display device, speaker, printing component, vibrating component, and the like. The 1/0 ports 20 allow the computing device 12 to be logically coupled to other devices, while the 1/0 components 22 may include a microphone, joystick, game pad, satellite dish, scanner, printer, wireless device, and a controller, such as a stylus, a keyboard and a mouse, a natural user interface (NUI), and the like.

Turning next to FIGS. 1-4 in particular, embodiments of an exemplary template animation kit are provided, for use with an associated template animation kit application. In the embodiment of FIG. 1, a digital fashion portfolio kit 26 is depicted in accordance with embodiments of the invention. As shown in the top perspective view of FIG. 1, the digital fashion portfolio kit 26 may include a fashion portfolio 28, template pages 30 and 32, design markers 34, design marker holders 36, and a shading tool 38. The configuration of the components of the fashion portfolio kit 26 is not limited to that depicted by FIG. 1, and in various embodiments, the digital fashion portfolio kit 26 may include any number of template pages, design markers, and/or shading tools. Embodiments of the digital fashion portfolio kit 26 may also include an application for execution by a computing device that interacts with one or more of the components of the fashion portfolio 28, such as the application being executed on the computing device of FIG. 2B, as discussed below.

In embodiments, the fashion portfolio 28 includes any number of pre-printed template pages, such as template pages 30 and 32 in FIG. 1. As such, a user may color in the pre-printed template outlines 40 and 42 on template pages 30 and 32 using any number of the design markers 34. Design markers 34 may be any type of marking device for marking on a surface, such as a washable marker, a permanent marker, a dry-erase marker, a crayon, a pencil, a colored pencil, a pen, and the like. Further, design markers 34 associated with template page 30 may be marking devices that are different from the design markers 34 associated with template page 32, such as design markers 34 including both a set of washable markers and a set of colored pencils.

Having applied an amount of color to a portion of the template outlines 40 and 42, a user may augment the appearance of the colored portion using shading tool 38. In embodiments, shading tool 38 has a tip surface 46 configured to blend and/or transfer an amount of the marking produced by design markers 34. In one embodiment, the tip surface 46 is a rubberized surface for blending pencil and/or colored pencil markings by the design markers 34. In another embodiment, tip surface 46 is a felt-tipped surface wetted with an amount of a blending solution for transferring an amount of color on a writing surface, such as an amount of color from a water-based marker solution and/or colored pencil marking.

In embodiments, template outlines 40 and 42 are 2-dimensional line drawings for coloring in by a user on the writing surface associated with template pages 30 and 32. As such, the writing surface of template pages 30 and 32 may be any surface adapted to receive markings from the design markers 34 and 36. In one embodiment, the template pages 30 and 32 are paper surfaces for accepting markings from one or more of the design markers 34, which may include markers, pens, pencils, and/or any other design marker 34 configured to create a marking on a paper writing surface. In another embodiment, the template pages 30 and 32 are dry-erase surfaces for accepting dry-erasable markings from one or more of the design markers 34 configured to interact with a dry-erase surface, which includes dry-erase markers, dray-erase crayons, and/or any other design marker 34 configured to create a marking on a paper writing surface.

Additionally, although depicted in FIG. 1 as having a spiral binding 44 coupling the template pages 30 and 32 to the fashion portfolio 28, any means may be used to couple the template pages 30 and 32 together, such as any method to position and/or associate the template pages 30 and 32 with the fashion portfolio 28, including clasps, tabs, adhesives, posts, rings, hooks, frames, and the like. Accordingly, fashion portfolio 28 may be refillable portfolio for holding any number of template pages, such as refill template pages that may be provided to a user for replacing used template pages inside the fashion portfolio 28.

In some embodiments, an application associated with the digital fashion portfolio kit 26 includes additional fashion sketch art files that a user can print out and attach to and/or associated with the fashion portfolio 28. As part of digital embodiments of the application, a user may also be able to purchase digital enhancements for the application (i.e., "in-app purchases") that further enhance the user's experience, such as additional fashion packs that unlock new accessories, venues, and/or models. In further embodiments, the application may provide a user with the ability to print out replacement template pages of the same line art format as those that comes with the product (such as the line art of template outlines 40 and 42).

Figure 2A:
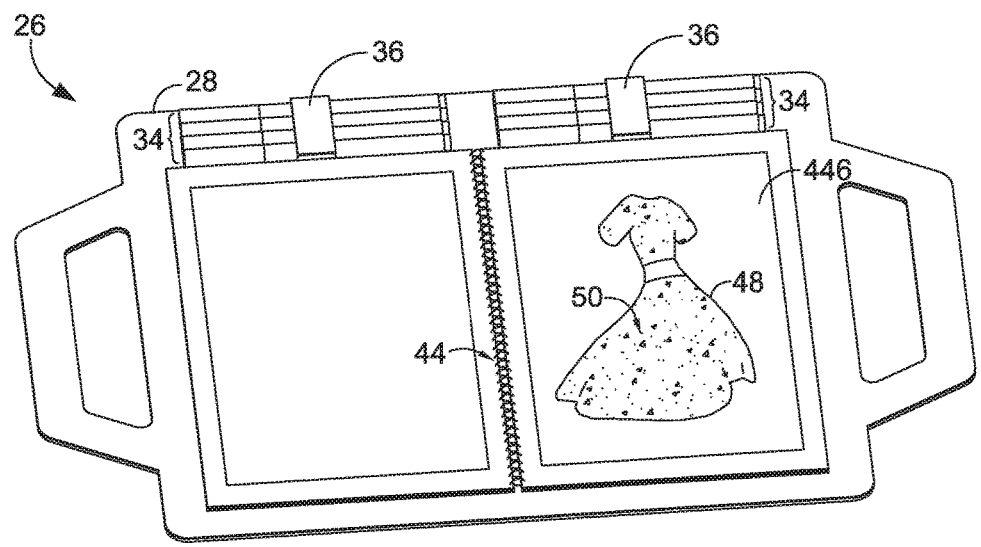
FIG. 2A is a top perspective view of a sketch portfolio, in accordance with an embodiment of the invention.
Figure 2B:
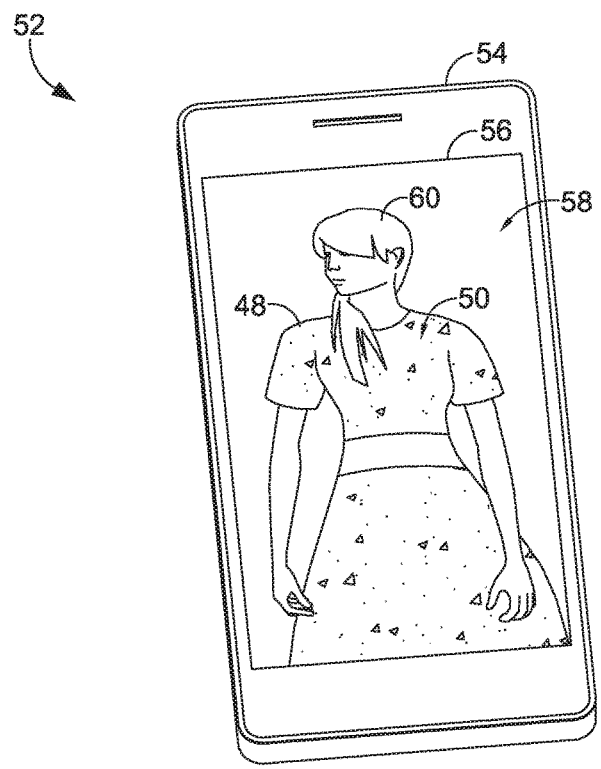
FIG. 2B is a top perspective view of a computing device executing an application in accordance with an embodiment of the invention.

Turning now to FIG. 2A, an embodiment of the digital fashion portfolio kit 26 includes a template page 446 having a template outline 48 of a dress image. The template outline 48 has been enhanced by a user with an amount of coloring 50. As shown in FIG. 2B, an application associated with the digital fashion portfolio kit 26 is being executed on a computing device 52. Computing device 52 may be any computing device adapted to execute an application associated with the digital fashion portfolio kit 26, such as an iPod Touch®, iPad®, and/or an iPhone® device provided by Apple® Inc. In one embodiment, computing device 52 includes a housing 54, a screen 56, and a displayed image 58. In embodiments, the screen 56 of computing device 52 is a touch-screen display. In further embodiments, computing device 52 may be any computing device that includes at least one camera for capturing an image of a template outline on a template page of the fashion portfolio 28.

Having completed coloring in the template outline 48 with an amount of coloring 50, the user of computing device 52 may take a picture of at least a portion of the template page 446 that is then displayed on screen 56. In the example of FIG. 2B, the displayed image 58 includes a three-dimensional representation of the template outline 48 having the amount of coloring 50. In some embodiments, the displayed image 58 may be further enhanced by the digital fashion portfolio kit application running on computing device 52 to add enhancements, such as the human features 60 of displayed image 58. In other words, the colored-in template outline 48 of template page 446, having an amount of coloring 50 applied to the two-dimensional line drawing, may be "captured" via a photograph taken by computing device 52 and displayed on screen 56. In further embodiments of the invention, executing the digital fashion portfolio kit application associated with the digital fashion portfolio kit 26 includes further enhancements to the displayed image 58, such as animation of the displayed image 58 and/or further accessorizing of the figure wearing the template outline 48 outfit.

Figure 3B:
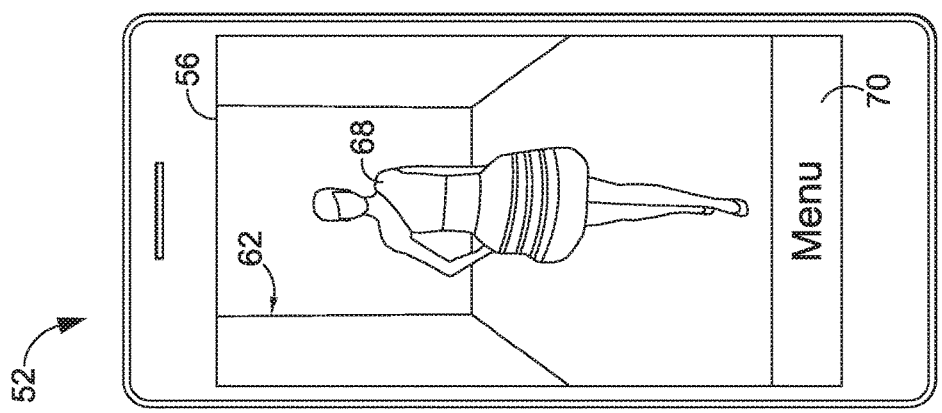
FIGS. 3A-3B are top views of a computing device executing an application in accordance with an embodiment of the invention.
Figure 3A:
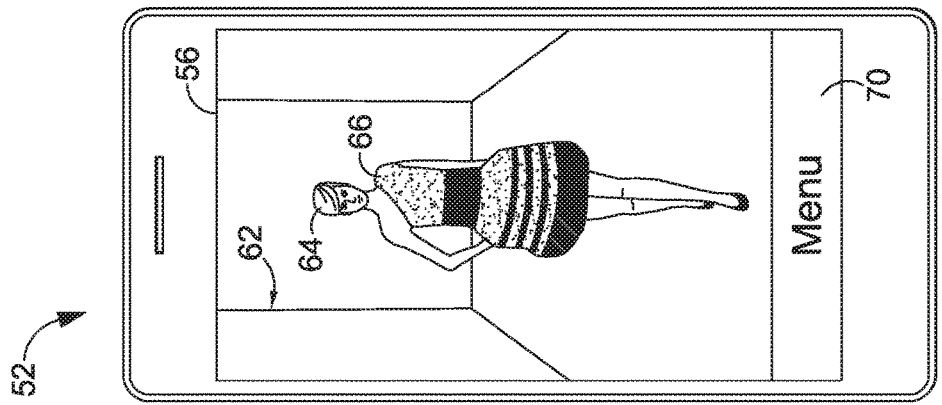

In some embodiments, during animation of the displayed image 58, a background of the screen 56 may simulate a particular digital fashion portfolio environment, such as a runway setting 62 where the animated model wears the outfit of the colored-in template outline, such as in the runway setting depicted in FIGS. 3A-3B. In the computing device 52 of FIG. 3A, according to one embodiment of the invention, an animated, a two-dimensional model 64 is depicted wearing an enhanced outfit 66 that is enhanced with an amount of user coloring, such as the amount of coloring 50 manually applied to the template page 446 of the fashion portfolio 28 in FIG. 2A, and captured by a camera of an computing device 52, such as an iPhone®, in FIG. 2B.

In the embodiment of FIG. 3B, a fashion sketch 68 is depicted as having a line art fashion sketch appearance. In embodiments of the invention, fashion sketch 68 corresponds to a three-dimensional animation of a user-activated fashion from the fashion portfolio 28. As such, in some embodiments, multiple different fashion sketches having line art fashion sketch appearance may be captured via a camera of a computing device and populated within a runway setting 62 for animation on a screen 56.

Figure 4:
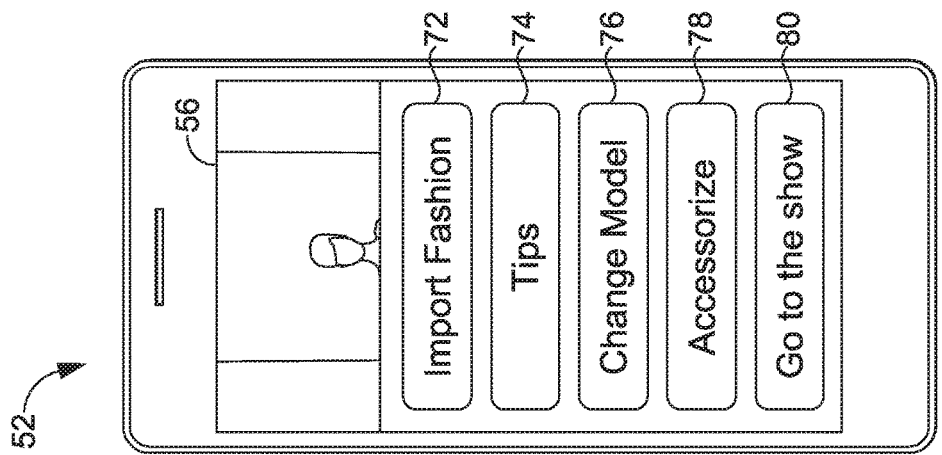
FIG. 4 is a top view of a computing device executing an application having a menu function, in accordance with an embodiment of the invention.

In various embodiments of the invention, the availability of different features executed as part of the digital fashion portfolio kit application may be altered based on purchasing a trial mode or an unlocked, full mode of the digital fashion portfolio kit 26 and/or the digital fashion portfolio kit application associated with the digital fashion portfolio kit 26. In embodiments, in response to the digital fashion portfolio kit application being executed by a computing device, menu selection item 70 may be presented in association with the screen 56, and as shown in FIG. 4. In some embodiments, features associated with the menu selection item 70 may be expanded to display a plurality of options to a user based, on the corresponding purchased and/or activated mode of the digital fashion portfolio kit application. In the example of FIG. 4, the menu selection item 70 may be expanded to reveal multiple selection items, such as an import fashion component 72, a tips component 74, a change model component 76, an accessorize component 78, and a go to the show component 80. As will be understood, any number of expanded menu items may be associated with the menu 70.

In embodiments, the import fashion component 72 provides a camera mode to capture physical art drawn by the user, such as the physical art (i.e., the colored-in template outline 48 having an amount of color 50) depicted in FIG. 2A. In further embodiments, the tips component 74 provides animations, photos, and/or video for associating with the captured image. In one embodiment the tips component overlays the displayed animations, photos, and/or videos on the runway display. In some embodiments, a unique tip is provided for each fashion design provided with the digital fashion portfolio kit 26.

In further embodiments of the invention, the change model component 76 customizes features of the digitally-depicted model, such as by altering the model's skin color, hair color, hair style, and/or additional accessories such as shoes. In embodiments where a model is viewed on a simulated runway backdrop, such as in FIG. 3A, a user may select a model to modify one or more features of the model based on selection of a particular digital model on the simulated runway.

Figure 49A:
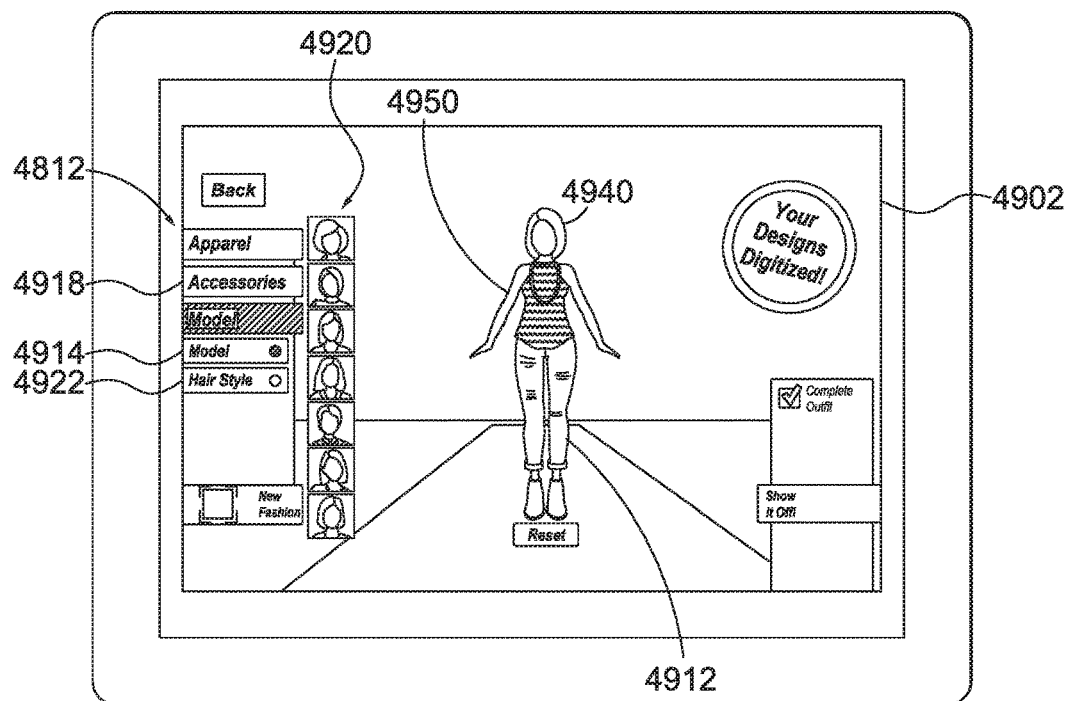
FIG. 49A is a top view of a user interface of a computing device executing an application, in accordance with an embodiments of the invention.

In another embodiment, accessorize component 78 provides for the addition of accessories to the digitally enhanced image. For example, a user may select the accessorize component 78, which prompts an accessory menu providing accessories that correspond to a number of pre-determined places for a selected accessory to appear on a model. For example, for a particular model template, a particular size, shape, and/or style of earrings may be provided for placement only on the ears of the model. As illustrated in FIG. 49A, the accessorize component may be associated with an accessories selectable indicia 4918.

In further embodiments, the go to the show component 80 generates a runway animation of the user's artwork on a digitally enhanced model. This is further illustrated in FIG. 51. For the simulated fashion show initiated upon selection of the go to the show component 80, multiple selection items for a venue for the fashion show may be provided. In some embodiments, each venue provides a unique background for the fashion show. Additional animations and/or enhancements may be displayed on the screen during the fashion show, such as special lighting effects, curtain opening, etc. In further embodiments, during the fashion show, audible and/or visual commentary may be inserted in the show to provide canned thoughts on the show being presented. In one embodiment, commentary on the fashion show includes a pop-up image of a fashion expert with an associated comment (such as a bubble quoting the expert's opinion of your design). In further embodiments, the simulated fashion show presented by the application may end by depicting a fashion magazine showing the user's modeled design. Once the fashion show is complete, the menu may provide one or more options for the finalized video, such as saving a video of the animation, or sharing the video with others.

Accordingly, in embodiments of the invention, a user executing an application on a computing device 52 may photograph a colored-in template outline 48. In one embodiment, template outline 48 is physically enhanced by a user when coloring on the page of the digital fashion portfolio 28, and digitally enhanced based on executing an application on a computing device that adds animation, accessories, and/or creates a runway show environment for displaying the user's digital creation. In further embodiments, a user's digitally enhanced image may be shared in a digital gallery, emailed to friends, and/or printed for display.

In some embodiments, although FIG. 3A depicts a front view of a digitally enhanced template outline, the fashion portfolio 28 may include template outlines that depict both a front view and a back view of a model. As such, upon capturing an image of the colored-in template outlines (i.e., taking a picture using a computing device), the animation created by execution of the application by the computing device may include both front views and back views of the model, such as a model walking towards or away from the viewer.

In further embodiments of the invention, the application may be configured to recognize a line art drawing, such as a template outline, and apply it to a corresponding digital template, such as the digital template of FIG. 3B. The digital template may then add features to the captured template outline, such as limbs, hair, and accessories (referred to herein as an enhanced three-dimensional digital template). For example, a user may color in a physical, template outline for a dress that corresponds to fashion sketch 68 of a digital template. Having captured an image of the colored-in template outline that corresponds to the digital template, the fashion sketch 68 may then become populated with an enhanced outfit 66 on a two-dimensional model 64 (e.g., adding the user's coloring to a digital model). In further embodiments of the invention, having captured an image of a colored-in template outline that corresponds to the digital template, the fashion sketch 68 may then become populated with an enhanced outfit 66 on a three-dimensional model.

In embodiments of the invention, a user may import an image of physical artwork and apply the physical artwork to a 2-dimensional animated model that is animated in the application. In embodiments, the user may then add accessories, change hair style, change hair color, and change skin color. In further embodiments, the application associated with the fashion portfolio kit 26 recognizes line art, and applies the user-generated coloring that fills in the line art to the appropriate digital model. Additionally, the computing device may save the line art and apply it to an appropriate digital model. In one embodiment, a video of a runway show may be saved and/or sent to other users, such as through YouTube® and/or Facebook®.

In one embodiment, the fashion portfolio 28 includes one or more template pages for a user to create a logo, such as a fashion house logo and/or a user signature. The user's fashion house logo and/or signature may be used by the application as part of a background and/or a backdrop on a runway during a fashion show.

In embodiments, a digital template animation kit, such as the digital fashion portfolio kit 26 of FIG. 1, may include a template animation kit application that, upon execution by the computing device 12, is configured to enable a user to create a three-dimensional animation from a captured two-dimensional template. In further embodiments, the digital fashion portfolio kit 26 includes an activation feature for such a template animation kit application. The activation feature may include an activation code and/or an activation indicator, such as a web page, website URL, or other indicator of a resource from which a user may access one or more features of the application. In some embodiments, user interaction with the activation feature enables and/or activates a template animation kit application retrieved by using the activation feature, and/or a template animation kit application associated with the activation feature. In further embodiments, a non-user-specific application, such as a Crayola® My Virtual Fashion Show application, is downloaded from an external source, and the specific features for the template animation kit application (e.g., the digital fashion portfolio kit application) may then be activated and/or "unlocked," by an activation feature. In this instance, the activation feature may involve touching a component included in the user-specific kit to the touch-screen of the computing device 12 running the non-user-specific application. For example, a user may download My Virtual Fashion Show to a computing device 12, and then touch a digital stamper included in a user-specific digital fashion portfolio kit 26, such as the digital stamper 140 of FIG. 11, to the touch-screen of the computing device 12 in order to activate specific features associated with the digital fashion portfolio kit application.

Figure 38:
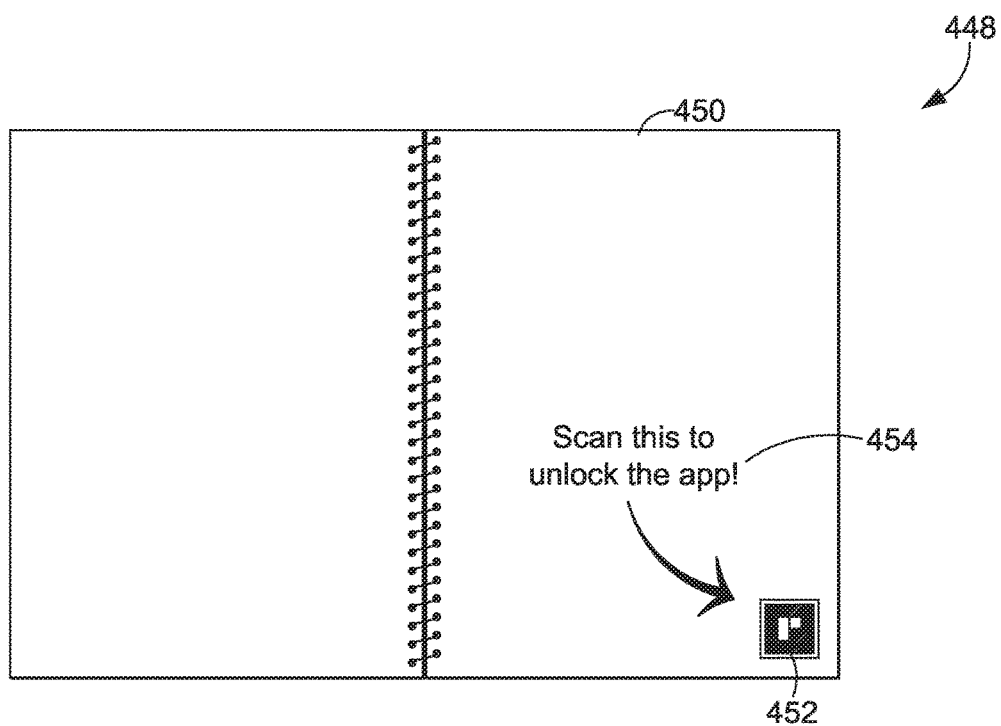
FIG. 38 is an exemplary top view of a first page of a sketch portfolio, in accordance with an embodiment of the invention.

In other embodiments, a scanned image of an unlock code may be used to unlock and/or activate a template animation kit application associated with a template animation kit, such as a digital fashion portfolio kit application associated with a digital fashion portfolio kit 26. For example, as shown in FIG. 38, a sketch portfolio 448 may include an activation page 450 having instructions 454 corresponding to unlock code 452. In embodiments, a user may be prompted by the digital fashion portfolio kit application to activate the application by scanning the unlock code 452 on activation page 450. In some embodiments, instructions 454 direct a user to a particular webpage for retrieval of the template animation kit application, prior to activation of such application using the corresponding unlock code 452 on activation page 450.

Upon enabling/activation, the template animation kit application may be accessed, retrieved from, downloaded, and/or otherwise interacted with via a source separate from the template animation kit. For example, the template animation kit application may be accessed and/or downloaded from a website, a database, a data store, or any other external source that may provide applications. An example of an external source is the online iTunes® store.

Embodiments of the template animation kit, such as the digital fashion portfolio kit 26, further include an application that provides a first tier of options available to a user upon purchase of the template animation kit, and a second tier of options available to the user upon "unlocking" a full mode of the template animation kit. In one example, a user may purchase the digital fashion portfolio kit 26, which may include an application (and/or access to a corresponding application) that enables the user to access a "try me" mode of the product. The "try me" mode may allow, for example, a user to import only one captured template design and utilize a limited number of models and/or backgrounds, etc. In another example, the user may "unlock" a full mode of the purchased digital fashion portfolio kit 26 to activate additional options such as access to additional backgrounds and features, the ability to import multiple models and/or designs, and other features of the digital fashion portfolio kit 26 that may be limited and/or restricted based on which mode a user is executing.

In one embodiment, a digital stamper 92 is used to unlock additional features of the digital fashion portfolio kit 26. In other embodiments, the digital stamper 92, or another component included in the digital fashion portfolio kit 26, may be used to activate and/or unlock a particular mode of the application, such as a limited mode or a full mode. For example, a particular unlock code 452 on an activation page 450 may be included for unlocking additional features of a corresponding application. In one embodiment, a particular user interaction screen associated with the digital fashion portfolio kit application may be presented to a user for activation of the digital fashion portfolio kit application and/or features. For example, scanning of an unlock code and/or contact of a digital tool with a touch-screen display may enable additional enhancement options of an activated digital fashion portfolio kit application, which correspond to a specific user input on the particular user interaction screen.

Figure 14:
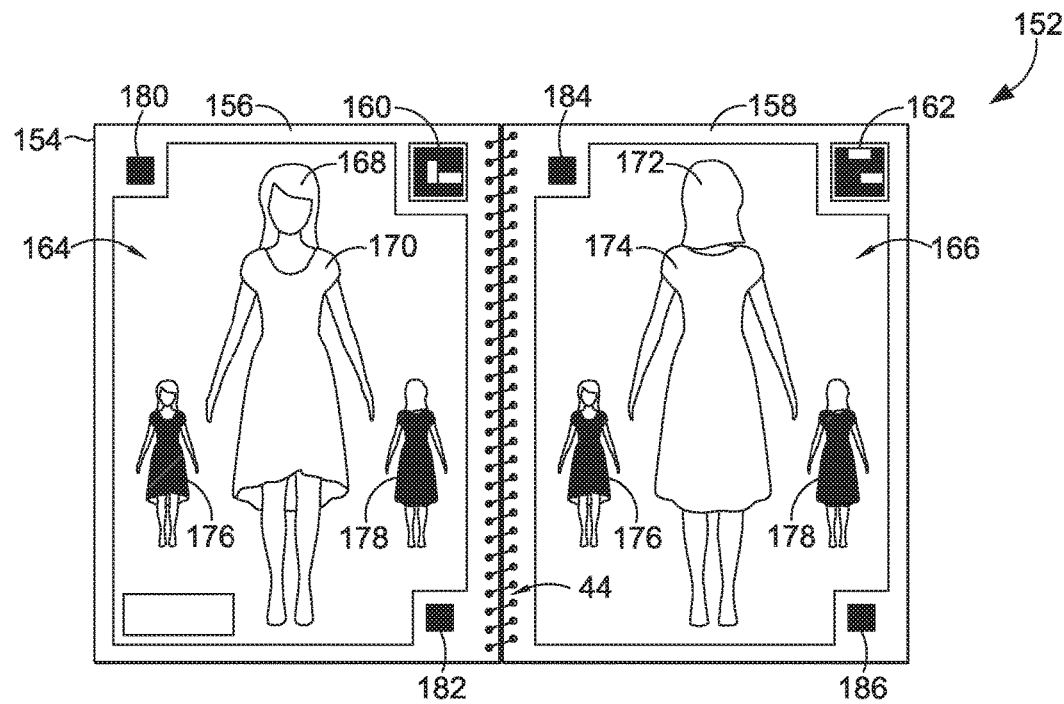
FIG. 14 is a top view of an exemplary sketch portfolio, in accordance with an embodiment of the invention.

Referring next to FIG. 14, one embodiment of a digital template animation kit 152 is depicted according to an embodiment of the invention. In embodiments, the digital template animation kit 152 includes a template portfolio 154 having a first template page 156 and a second template page 158. In the embodiment of FIG. 14, the first template page 156 includes a first coloring figure identifier 160 that corresponds to the first template design 170 of the front view of two-dimensional template design 168, while the second template page 158 includes a second coloring page identifier 162 that corresponds to the second template design 174 of the rear view of the two-dimensional template design 172. In some embodiments, first template page 156 and second template page 158 also include template design front view 176 and template design rear view 178, in association with the first template design 170 and the second template design 174. Additionally, in embodiments of the invention, the first template page 156 includes an upper page guide identifier 180 and a lower page guide identifier 182 for enabling capture of at least a portion of the first template design 170, while the second template page 158 includes an upper page guide identifier 184 and a lower page guide identifier 186 for enabling capture of at least a portion of the second template design 174.

In embodiments of the invention, a user may color in the line drawings of the first template design 170 and the second template design 174, for subsequent capture and animation by a computing device executing the template animation kit application. As shown in the example of FIG. 14, a template portfolio 154 including first template page 156 and second template page 158 may include both the front view and the back view of a drawing image, such as a front and back view of a fashion design. As will be understood, while the first template design 170 and second template design 174 are depicted in embodiments of the invention as including representations of fashion designs and/or models, the first template design 170 and second template design 174 may also correspond to a front view and a back view of any drawing image for animation, such as a first and second template design corresponding to a front and back view of a car or other object for subsequent animation by a computing device.

In embodiments, each of the template pages in a template portfolio 154 include a unique identifier for the particular template design view on each page, such as a unique coloring figure identifier that indicates, to an application executed by a computing device, which particular template design view corresponds to a scanned and/or captured image of a template page. For example, in the embodiment of FIG. 14, the first coloring figure identifier 160 includes a scanning image recognized by an template animation kit application as identifying the particular first template design 170, such as the front view of the FIG. 14 simple dress depicted in the two-dimensional template design 168. Additionally, as further shown in the embodiment of FIG. 14, the second coloring figure identifier 162 includes a scanning image recognized by a template animation kit application as identifying the particular second template design 174, such as the rear view of the FIG. 14 simple dress depicted in the two-dimensional template design 172.

In further embodiments of the invention, at least one reference point incorporated in the template pages of template portfolio 154 may be used to ensure the accuracy of a captured image of a template design, such as first template design 170. For example, the upper page guide identifier 180 may be aligned with a particular portion of the digital template animation environment displayed in response to execution of a digital template animation kit application, as discussed later with reference to FIGS. 17-21.

Figure 15:
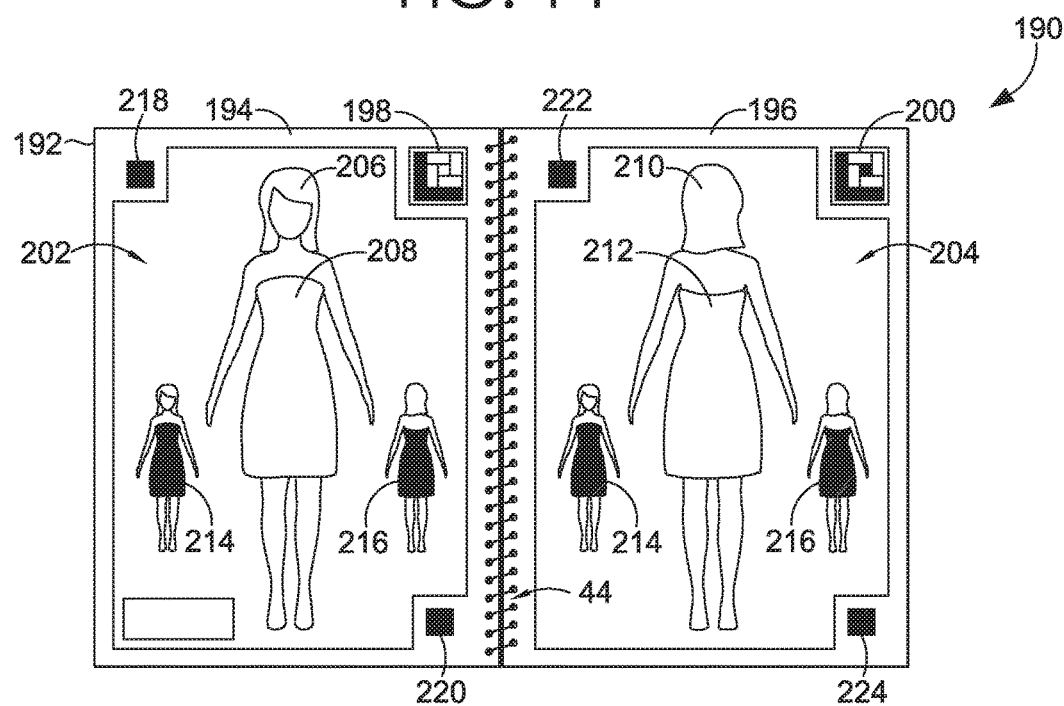
FIG. 15 is a top view of an exemplary sketch portfolio, in accordance with an embodiment of the invention.

With reference now to FIG. 15, an exemplary sketch portfolio and/or template portfolio 192 of a digital template animation kit 190 is depicted according to an embodiment of the invention. As shown in the embodiment of FIG. 15, the template portfolio 192 may include a third template page 194 opposite a fourth template page 196. As will be understood, although exemplary template pages are shown bound together by spiral binding 44, in further embodiments, a template portfolio 192 may include one or multiple template pages individually compiled or coupled together. As such, a user may access a single sheet of a template portfolio 192, for drawing on a variety of surfaces and/or manipulating during scanning.

The third template page 194 includes a third coloring figure identifier 198, which corresponds to the front view of two-dimensional template design 206, associated with a third template design 208. In embodiments, the third coloring figure identifier 198 includes a scanning image recognized by an template animation kit application as identifying the particular third template design 208, such as the front view of the FIG. 15 strapless dress depicted in the two-dimensional template design 206. Additionally, as further shown in the embodiment of FIG. 15, the fourth coloring figure identifier 200 includes a scanning image recognized by a template animation kit application as identifying the particular fourth template design 212, such as the rear view of the FIG. 15 strapless dress depicted in the two-dimensional template design 210.

In embodiments, a template page of a digital template animation kit 190 may include a template design front view 214 and a template design rear view 216 in association with both the third template design 208 (i.e., the front of the strapless dress) and the fourth template design 212. In one embodiment, during scanning of the third template page 194 or the fourth template page 196, an image of each of the template design front view 214 and the template design rear view 216 aids in calibration and/or recognition of each of the third template design 208 and the fourth template design 212. Additionally, one or more page guide identifiers on the third template page 194 and/or fourth template page 196 may be used to capture an image of one or more pages of the template portfolio 192. For example, the upper page guide identifier 218 and lower page guide identifier 220 of third template page 193 may be recognized by a digital template animation kit application, upon capture by a camera scanning the third template page 194, while the upper page guide identifier 222 and lower page guide identifier 224 may be recognized by a digital template animation kit application, upon capture by a camera scanning the fourth template page 196.

Accordingly, in some embodiments of the invention, a user may utilize one or more marking instruments, such as the design markers 34, for coloring within the drawing environment of one or more template pages, such as coloring in a template design. As such, in some embodiments, the user's colored template design of a two-dimensional image may be scanned and applied as a colorant and/or image layer in a three-dimensional design template of a digital template animation kit application. In further embodiments, a template design may be any figure depicted in the drawing environment of a template page, for coloring in by a user. For example, an animal template animation kit may include a template design of a dog, depicted within the drawing environment on a template page for coloring in and capturing by a user. As such, the coloring figure identifier may correspond to a particular shape of the template design, as a coloring figure identifier corresponding to a dress figure may be distinct from the coloring figure identifier corresponding to a dog. In another embodiment, a coloring figure identifier may correspond to a particular page of a template portfolio, with the particular page being associated with particular content of the drawing environment. As such, while the digital template animation kit application may recognize the coloring figure identifier scanned by the camera of a computing device, it may, in some instances, assign the received indication of a coloring figure identifier to a particular, identified page number within a template portfolio. In another embodiment, the digital template animation kit application may recognize the coloring figure identifier scanned by the camera of a computing device and may, in another example, assign the received indication of a coloring figure identifier to a particular, identified view of a two-dimensional template design and/or template design image. In other words, in embodiments, the coloring figure identifier may be associated with the content of a drawing environment by virtue of the location of the scanned content (i.e., corresponding page number within a template portfolio) and/or by recognition of the particular image to which the template design is assigned (i.e., corresponding to the particular image, such as the particular dress scanned), such as discussed with reference to FIG. 46.

With reference to FIG. 16, an exemplary user interface 228 of a computing device 230 executing a digital template animation kit application is provided. The display 234 of computing device 230, such as a touch-screen display of a capacitive touch-screen computing device, is depicted in the example of FIG. 16 as including a digital template animation environment 236. In embodiments, digital template animation environment 236 is generated in response to a scanning of a template page of a digital template animation kit, such as a camera of a computing device 230 scanning a third template page 194. In one embodiment, the camera of computing device 230 is activated upon interacting with the capture button 232.

In the embodiment of FIG. 16, the digital template animation environment 235 is generated by the digital template animation kit application executed by computing device 230, and may include one or more menu items 238. For example, the menu items 238 of a digital template animation environment may include a new design menu item 240, a my fashion menu item 242, a tips menu item 244, a runway menu item 246, a more templates menu item 248, and a settings menu item 250. In embodiments, in response to selection of the new design menu item 240, a scanning user interface may be presented to a user, such as the scanning user interface 252 of FIG. 17. As such, upon executing the digital template animation kit application, and selecting the new design menu option 240, a scanning user interface 252 may be presented to a user for capturing one or more images on a template page of a digital template animation kit. As shown in the embodiment of FIG. 17, the computing device 230 is displaying a digital template animation environment 236 having a first page guide 254, a second page guide 256, and a third page guide 258. Although the page guides of scanning user interface 252 are depicted within particular portions of the digital template animation environment 236 (e.g., the top upper corners and bottom lower corner of the display 234), in further embodiments of the invention, the one or more page guides of a scanning user interface may be positioned in one or multiple locations within a digital template animation environment for capturing an image of a template design.

In embodiments, the scanning user interface 252 also includes a first edge level 264 with a level indicator 266, and a second edge level 260, with a level indicator 262. In some embodiments, a user may view the relative position of one or more level indicators within one or more edge levels when orienting the computing device with respect to a template page. In further embodiments, the digital template animation environment 236 includes a front selection item 268 and a back selection item 270, with which a user may indicate which portion of a template portfolio the user wishes to scan. As such, in some embodiments, without having already scanned a coloring figure identifier for a particular view, the digital template animation environment 236 may be configured to receive the correct and/or corresponding front or back view of a scanned image, based on selection of either the front selection item 268 or the back selection item 270.

In some embodiments, the digital template animation environment 236 further includes a return indicator 274 for returning to a previous display of the digital template animation kit application, a help indicator 276 for requesting instructions and/or tips for utilizing the scanning user interface 252, and/or an instructions portion 272 which provides a user with directions on manipulating the scanning user interface 252.

Turning next to FIG. 18, an exemplary scanning user interface 278 is depicted as overlaid on top of a template page of a template portfolio, according to an embodiment of the invention. In embodiments, as shown on the computing device 230, the digital template animation environment 236 is configured to capture an image of the template page for extraction and animation of a portion of a user's colored template by the digital template animation application. In the example of FIG. 18, the first page guide 254 is beginning to become aligned with the underlying first template page 156. In embodiments, the scanning user interface 278 includes a first page guide 254 beginning to align with the first coloring figure identifier 160, the second page guide 256 beginning to align with the upper page guide identifier 180, and the third page guide 258 beginning to align with the lower page guide identifier 182. In embodiments, the first level indicator 266 is positioned to a left side of the first edge level 264, while the second level indicator 262 is positioned to a bottom side of the second edge level 260. As such, in the embodiment of FIG. 18, a user of the computing device 230 is positioning the computing device 230 at a threshold distance above the template portfolio 154, to provide a captured image based on the camera of the computing device 230 detecting the first template page 156.

As shown in the embodiment of FIG. 19, the scanning user interface 282 includes a digital template animation environment 236 that indicates a more accurate alignment of each page guide indicators and the coloring figure indicator with each corresponding page guide of the digital template animation environment 236. In embodiments, an accurate alignment of a page guide with a page guide indicator and/or coloring figure indicator includes substantial alignment of a page guide indicator and/or coloring figure indicator in a central portion of the corresponding page guide. In another embodiment, a page guide indicator is determined to be aligned with a particular page guide of the digital template animation environment based on orientation of the page guide indicator within the visible portion of the page guide upon capture by a camera of the computing device executing a digital template animation kit application. In another embodiment, a parallel orientation of the computing device 230 with respect to the template portfolio 154 and/or corresponding template page (e.g., first template page 156) corresponds to a correct capturing alignment, such as the alignment depicted in FIG. 19 with the first level indicator 266 in a central portion of the first edge level 264 and the second level indicator 262 in a central portion of the second edge level 260. As such, in some embodiments, a camera component 280 of the computing device 230 may be configured to refrain from capturing a misaligned image of the template page, such as the orientation depicted in FIG. 18, and may be further configured to initiate capture of the correctly aligned image of the template page, such as the orientation depicted in FIG. 19.

Figure 20:
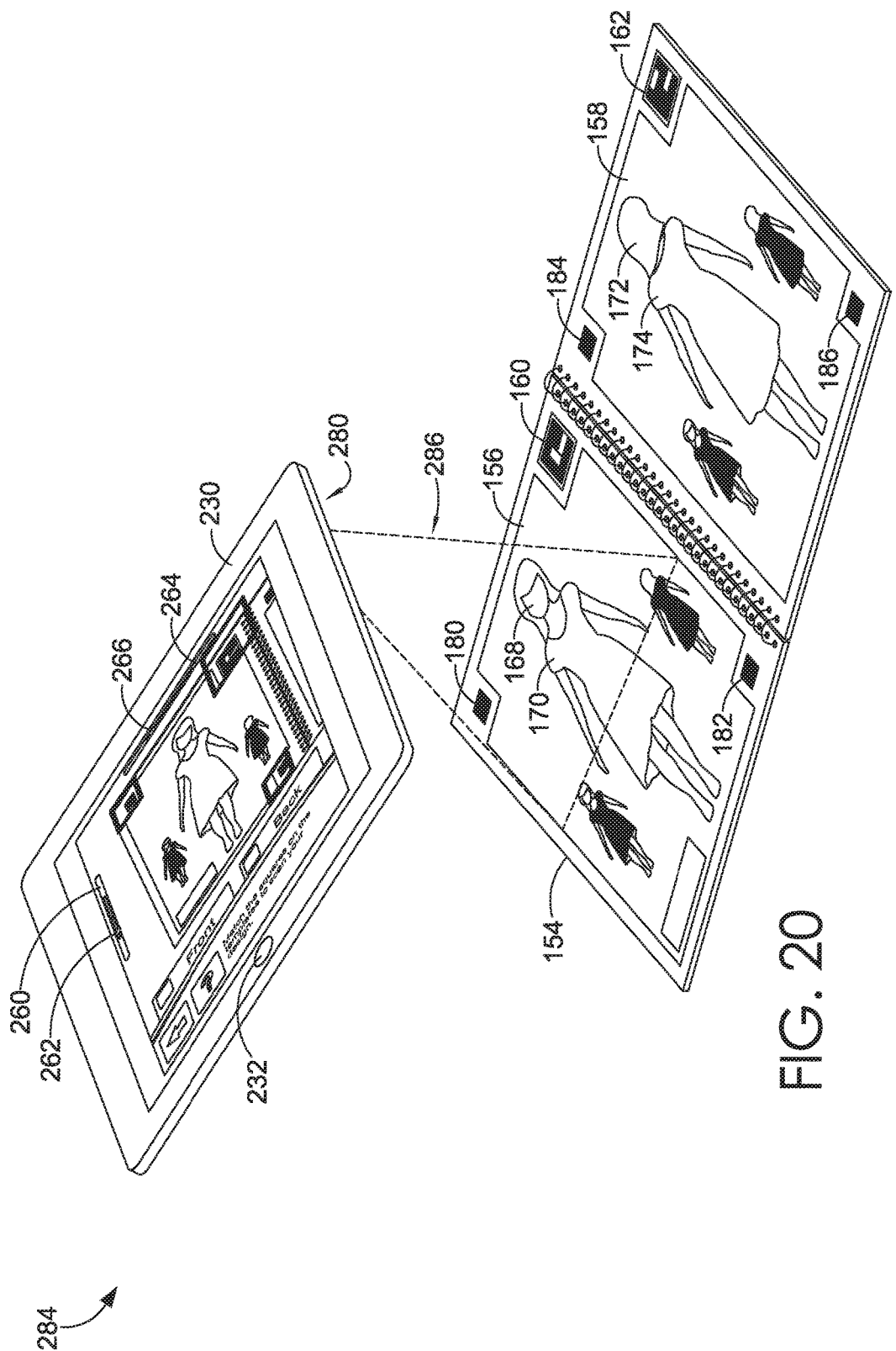
FIG. 20 is a top, perspective view of a computing device capturing an image of an exemplary sketch portfolio, in accordance with an embodiment of the invention.
Figure 21:
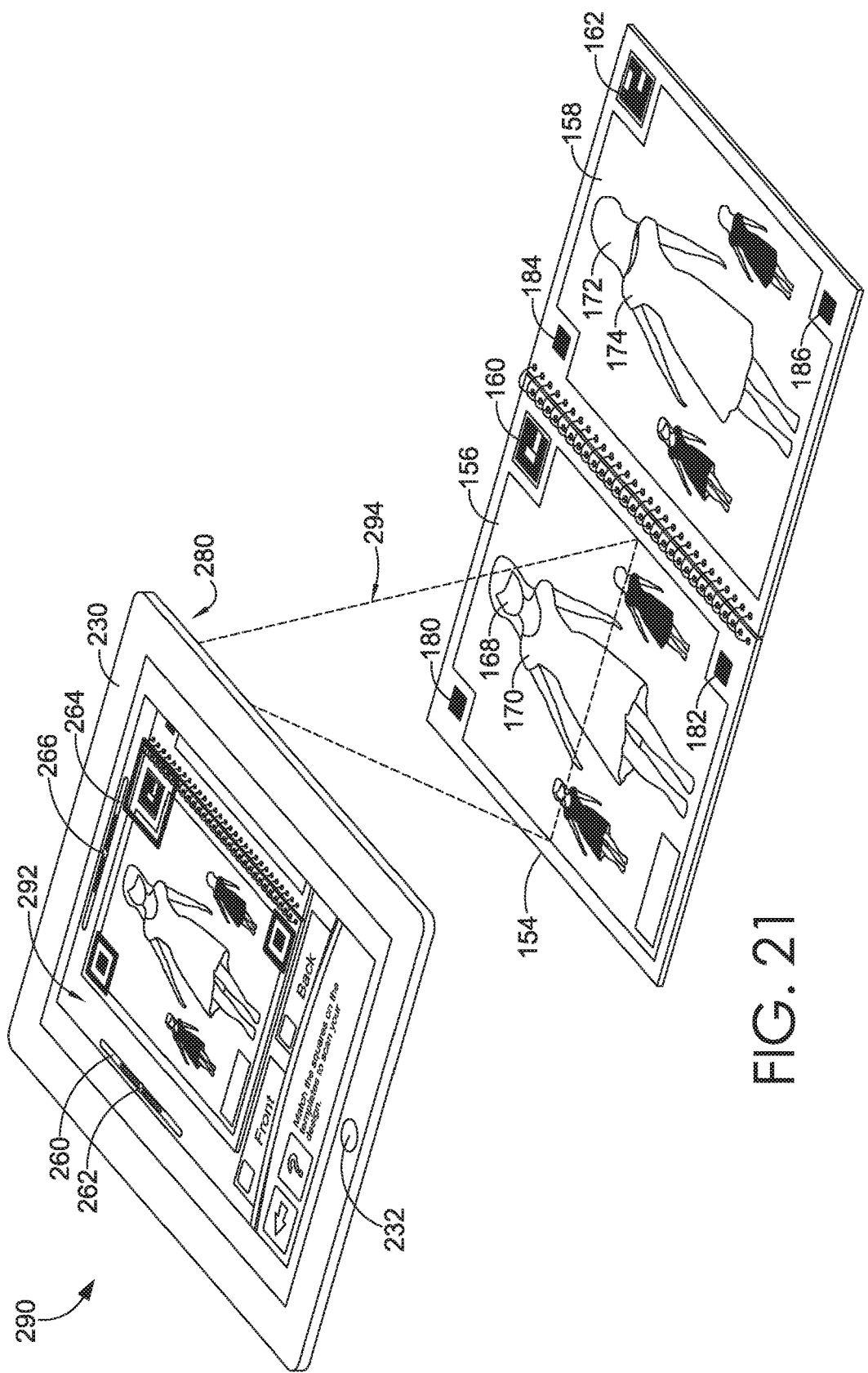
FIG. 21 is a top, perspective view of a computing device capturing an image of an exemplary sketch portfolio, in accordance with an embodiment of the invention.

Turning now to the orientation depicted in the captured image attempt 284 FIG. 20, the camera 280 of exemplary computing device 230 is not aligned in a requisite position above the template portfolio 154, providing a camera view 286 that does not trigger the capture of an image by computing device 230. In one embodiment, the shifted orientation of FIG. 20 corresponds to the alignment discussed with respect to FIG. 18. By contrast, as shown in the captured image attempt 290 of FIG. 21, the camera 280 of exemplary computing device 230 is correctly aligned, in a requisite position above the template portfolio 154, providing a camera view 294 that does trigger the capture of an image by computing device 230. In one embodiment, the correctly aligned orientation of FIG. 21 corresponds to the alignment discussed with respect to FIG. 19. Accordingly, in embodiments of the invention, a template animation kit application executed by a computing device 230 is configured to activate an automatic capture feature of a camera component, such as a camera component of an exemplary computing device 230, in response to a threshold orientation of a template portfolio with respect to a plane of the computing device executing the template animation kit application.

In some embodiments of the invention, a digital template animation kit application, executed by the computing device 230, may provide one or more auto-correction features for application to a captured image. For example, in one embodiment, the digital template animation kit application is configured to automatically correct a captured image, in response to a user not holding the camera and/or computing device 230 perfectly parallel to the surface of the template page (e.g., keystoning), to prevent distortion of the captured image. In further embodiment, the digital template animation kit application may be configured to adjust one or more features of the captured image, such as the color, image quality, and/or other characteristics of the captured image to provide an optimal application of the captured image to a digital template.

In a further embodiment of the invention, the digital template animation kit application may be configured to crop the captured template design such that a user is not required to color within the boundaries of the particular template design when marking on the drawing environment of the template page. In one embodiment, the digital template animation kit application is configured to crop out portions of the surrounding drawing environment, and to extract only those portions of the drawing environment that include the desired template design, with coloring and/or markings from the user, for application to the digital template. As such, in embodiments of the invention, the automatic capture of a user's colored-in template design provides a cropped, tailored, targeted, and/or optimized image for application to the digital template during generation of the digital template animation environment. Accordingly, in embodiments of the invention, execution of the digital template animation kit application by a computing device, in association with a digital template animation kit, provides a "fool-proof" and/or "seamless" transition between a physical item to a virtual animation, and an optimal user experience.

In one embodiment of the invention, in response to an orientation of the computing device with respect to a template page that does not trigger an accurate capture of a template design, a capture error user interface 296 may be presented to a user. In embodiments, the capture error user interface 296 provides an indication to a user that the orientation of one or more page guides with one or more portions of the template page being scanned and/or captured is not sufficient for an accurate capture. As such, in some embodiments, a capture error user interface 296 presented to a user of the computing device 230 may include an error message 298 that includes one or more options for the user, such as a try again option 300 and a tips option 302.

In embodiments of the invention, a captured template design, or a pair of captured template designs (i.e., a front view of a two-dimensional template design and a rear/back view of a two-dimensional template design) may be utilized by the digital template animation kit application to generate an animation scene with an animated three-dimensional digital template, such as the animation scene 304 with enhanced and/or animated three-dimensional digital template 308 of the digital template 306 in FIG. 23. In embodiments, an amount of coloring applied to a template design corresponding to the digital template is applied during animation of the three-dimensional digital template. For example, a user may color in an amount of coloring, such as an amount of coloring 50 in FIG. 1, in association with the first template design 170 of the first template page 156. Upon capture of an image of the colored-in first template design 170 (according to embodiments discussed above for accurately and/or correctly capturing an image), a digital template animation kit application may be used to animate a digital template 306 may be populated with a captured-image representation of the amount of coloring 50.

Figure 31:
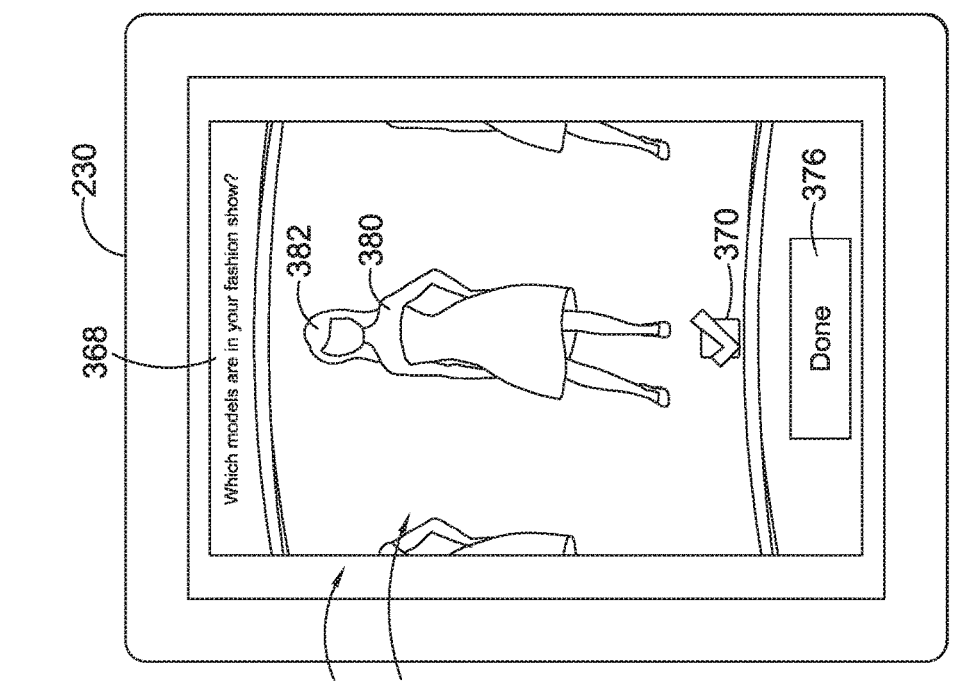
FIG. 31 is a top view of the user interface of a computing device executing an application, in accordance with an embodiment of the invention.
Figure 30:
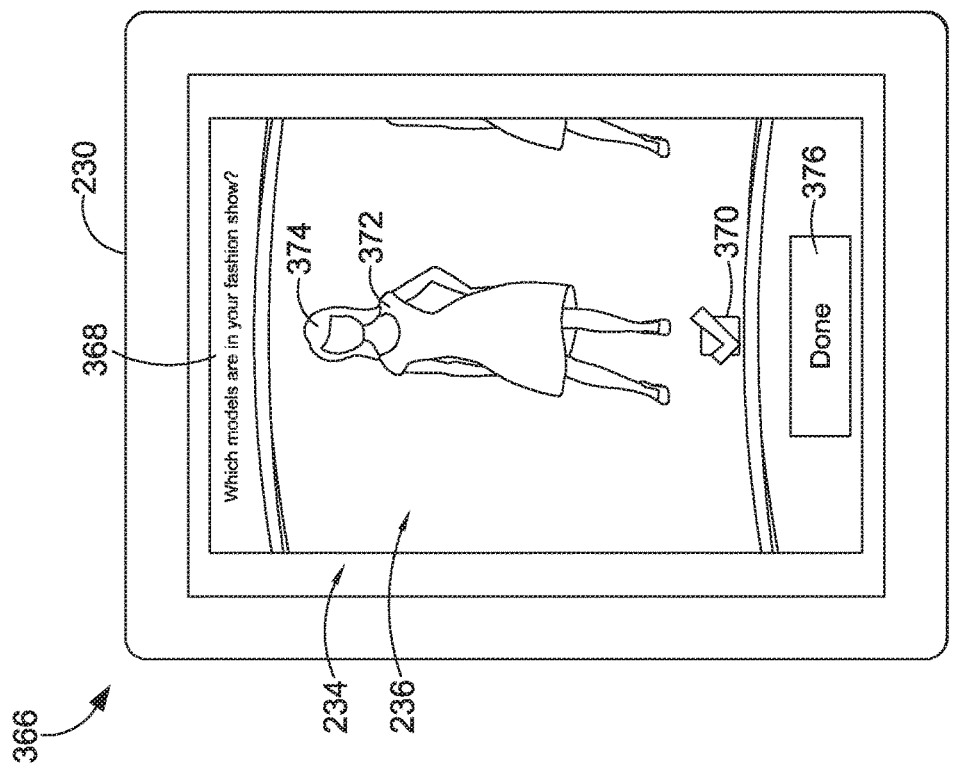
FIG. 30 is a top view of the user interface of a computing device executing an application, in accordance with an embodiment of the invention.

As such, in one embodiment, the animation scene 304 may be generated in response to selection of the runway menu item 246 of FIG. 16. In further embodiments, in response to approval and/or accurate capture of a newly colored template design, captured by a camera of a computing device 230 executing a digital fashion template application, a user may select one or more features of the animation scene 304, such as the model selector 314 and the location selector 316. In one embodiment, in response to selection of the model selector 314 of animation scene 304, a model selection display may be presented to a user, such as the model selection displays 366 and 378 of FIGS. 30 and 31. As shown in FIGS. 30 and 31, a selection prompt 368 may request confirmation from a user, via confirmation indicator 370, that the user wishes to animate the enhanced and/or animated three-dimensional digital templates 374 and 382, having digital templates 372 and 380 applied to each. Upon receiving confirmation via confirmation indicator 370, the user may then indicate completion of a selection via model selection displays 366 and 378 by selecting indicator 376.

Figure 33:
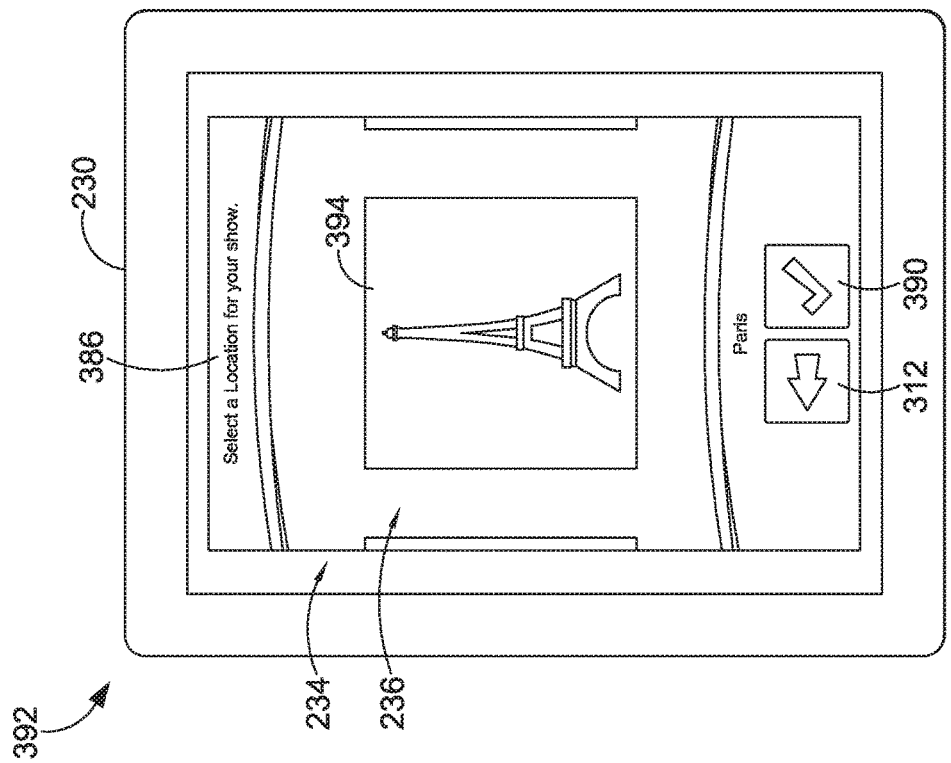
FIG. 33 is a top view of the user interface of a computing device executing an application, in accordance with an embodiment of the invention.
Figure 32:
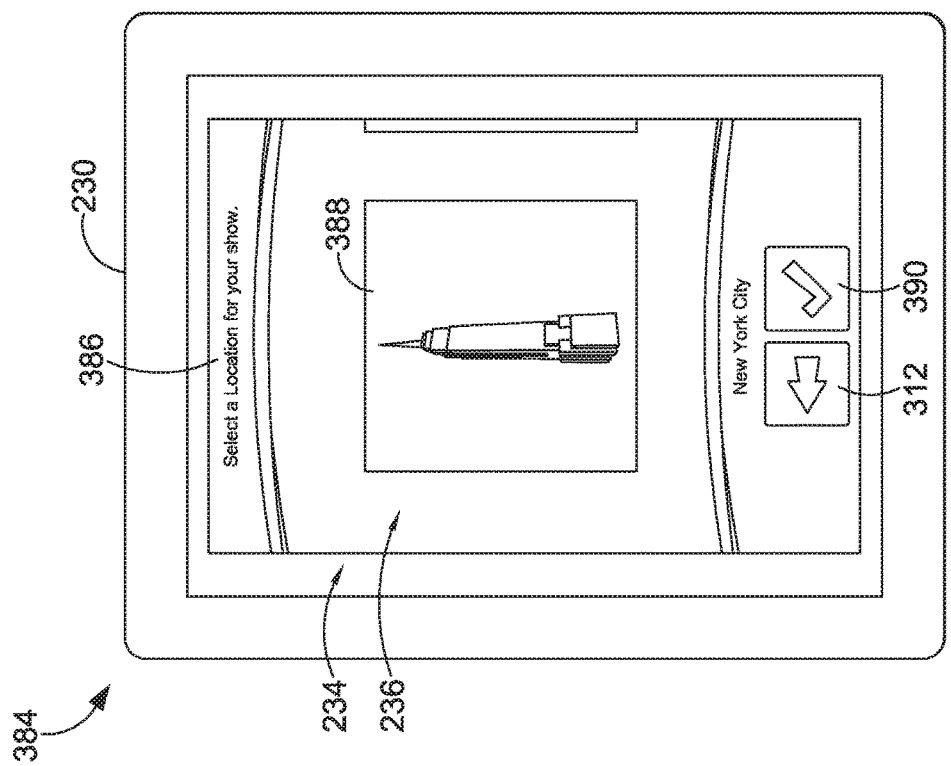
FIG. 32 is a top view of the user interface of a computing device executing an application, in accordance with an embodiment of the invention.

In some embodiments, in response to selection of a location selector 316, a location menu may be presented to a user, such as the location menu displays 384 and 392 of FIGS. 32 and 33. In embodiments, location prompt 386 may instruct a user to select from one of multiple location options for utilizing as a background with the user's animation. For example, the first location 388 and the second location 396 may be selected via a confirmation indicator 390 of the location menu displays 384 and 392. In one embodiment, upon selection of the desired location and/or background to apply to an animated scene created by the digital template animation kit application, a user may return to the animation via return option 312. In embodiments, a selected location provided via location menu displays 384 or 392, may then be populated into the background 310 of a digital template animation environment 236 in FIG. 23. In another example, a selected location provided via location menu display 384 or 392, may then be populated into the background 322 a digital template animation environment 236 in FIG. 24. In further embodiments, a background of a digital template animation environment may include one or more different enhancements, such as music, sound, animations with sound (e.g., a camera flash and clicking sound), or other audible or visible enhancements to an animation background. In some embodiments, the animated background of a digital template animation environment corresponds to the selected digital template for animation, such as a runway scene generated for a fashion show as shown in FIGS. 23-24. In embodiments, a first amount of user markings applied to a simple dress on digital template 306 may be incorporated into the view of FIG. 23, while a second amount of user markings applied to a simple dress on digital template 306 may be incorporated into the view of FIG. 24.

With continued reference to FIG. 24, an exemplary animated scene 320 may include multiple views of animated, three-dimensional templates, such as the enhanced and/or animated three-dimensional digital template 324 with digital template 326 (e.g., a front view of a strapless dress on a three-dimensional model), as well as an enhanced and/or animated three-dimensional digital template 308 with digital template 306 (e.g., a rear view of a simple dress on a three-dimensional model). In embodiments of the invention, a digital template animation environment may be generated by a digital template animation kit application based on capture of a colored-in template design(s) and corresponding animation by applying the captured image to the enhanced and/or animated three-dimensional digital template.

Figure 25:
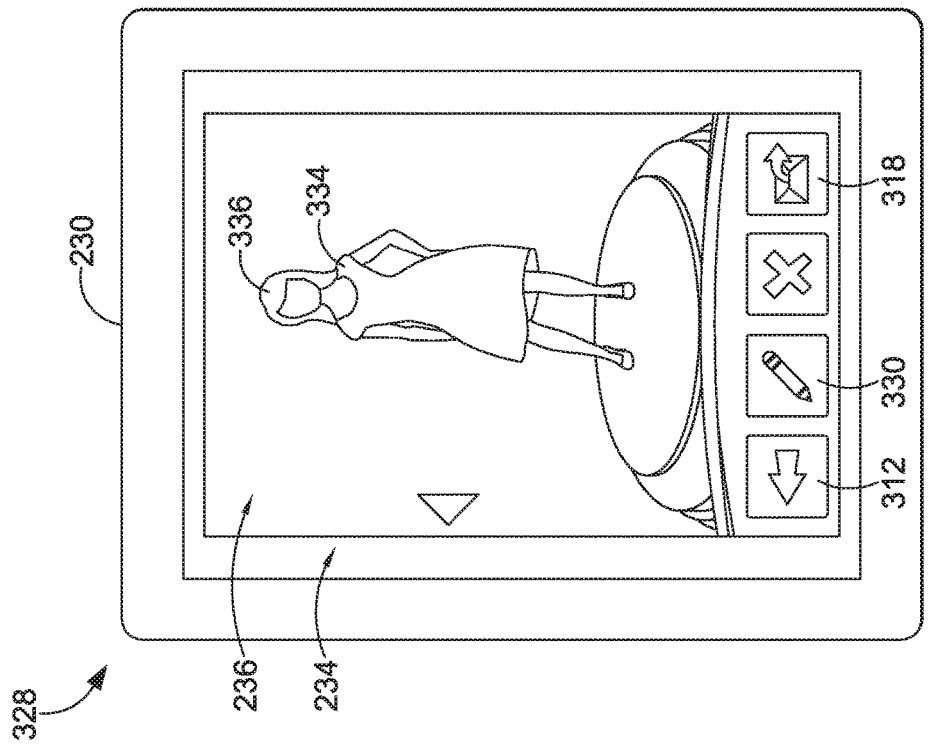
FIG. 25 is a top view of the user interface of a computing device executing an application, in accordance with an embodiment of the invention.

In embodiments of the invention, upon selection of a my fashions menu item 242, an image editing user interface 328 of FIG. 25 may be presented to a user. In image editing user interface 328, a user may select edit option 330 to apply one or more changes to a three-dimensional digital template 336 having a digital template 334. In embodiments, upon selecting edit option 330, one or more options associated with a feature editor are provided, such as a hairstyle editor, a hair color editor, a model skin color editor, a makeup editor, a shoe editor, an accessories editor, and the like.

Figure 26:
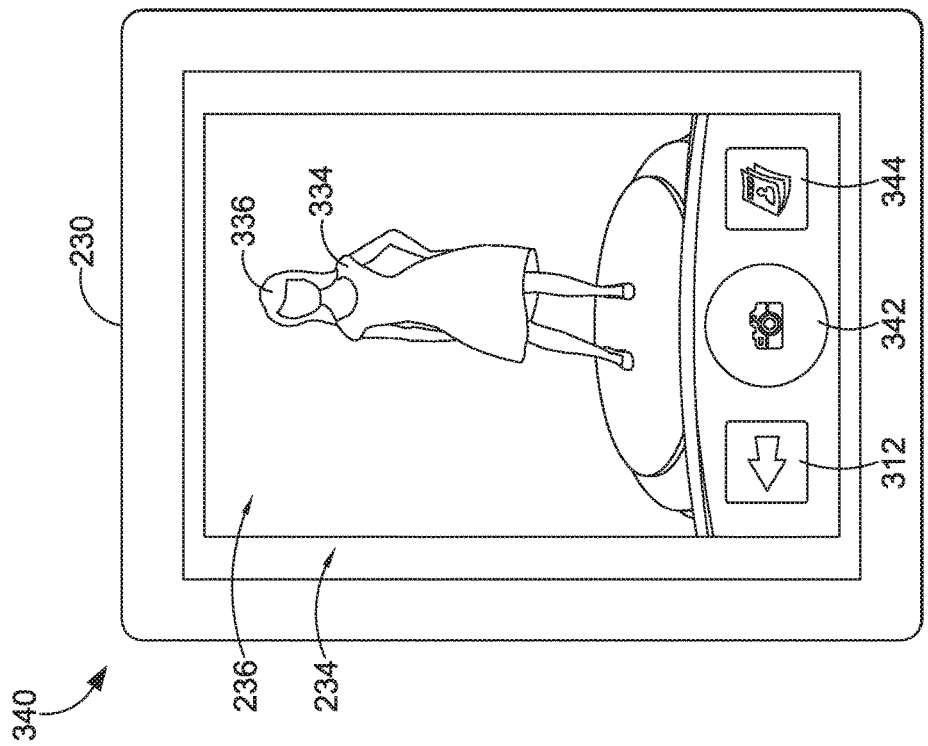
FIG. 26 is a top view of the user interface of a computing device executing an application, in accordance with an embodiment of the invention.
Figure 27:
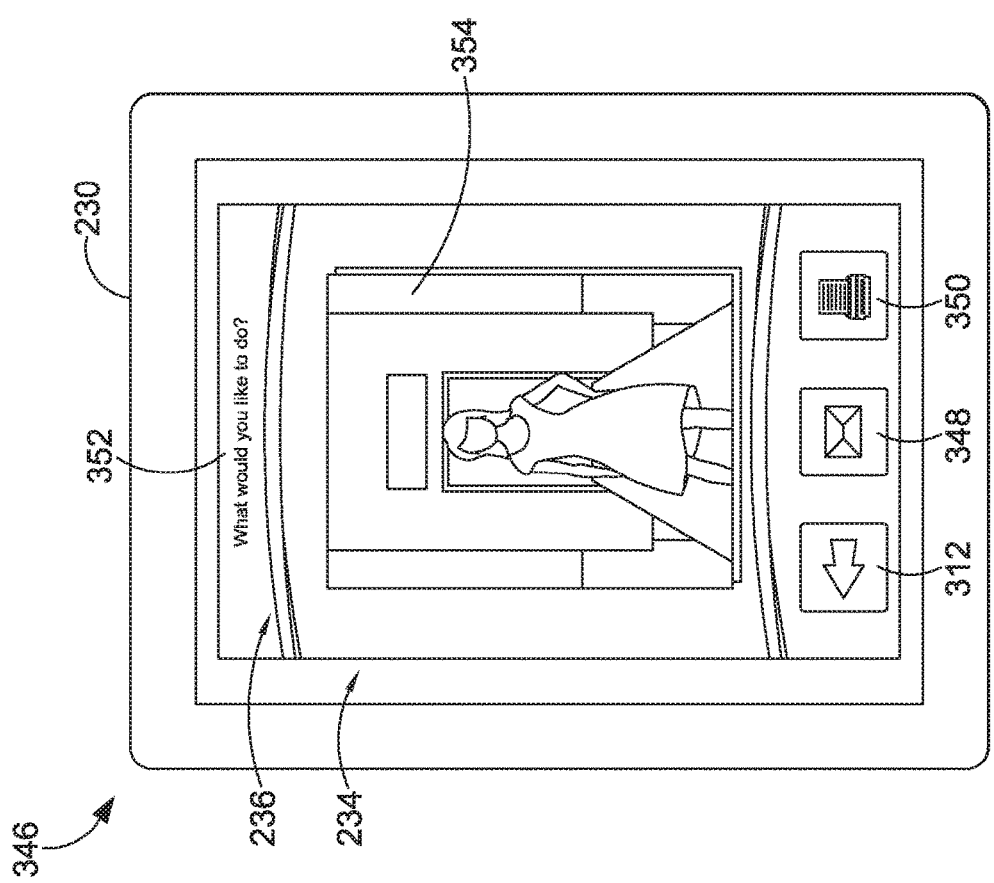
FIG. 27 is a top view of the user interface of a computing device executing an application, in accordance with an embodiment of the invention.

In further embodiments, upon selecting the publish option 318 of FIG. 25, a publication interface 340 may be provided, as in FIG. 26. The publication interface 340 may include one or more options for delivering and/or publishing a digital template selected from the user's collection of creations. In one embodiment, the user may select a capture indicator 342 or a publication option 344. In response to selecting the capture indicator 342, a capture interface 346 may be presented to a user, as in FIG. 27. The capture interface 346 may include a user prompt 352, a captured image 354, an email option 348, and a print option 350. In response to selection of the publication indicator 344 in FIG. 26, a user may populate a simulated and/or predetermined image, such as the magazine interface 362 of FIG. 29. As shown in FIG. 29, the interface 364 includes the digital template image combined and/or imposed as part of a predetermined image, such as a magazine cover. The user may then capture an image of the combined image using capture indicator 342.

In a further embodiment, upon selection of the publish option 318 of FIG. 23, an animation environment publication interface 356 of FIG. 28 may be presented to a user. The publication interface 356 may include additional options for a user to capture an image of the animation environment, such as using capture indicator 342 and/or publication option 344.

Figure 34A:
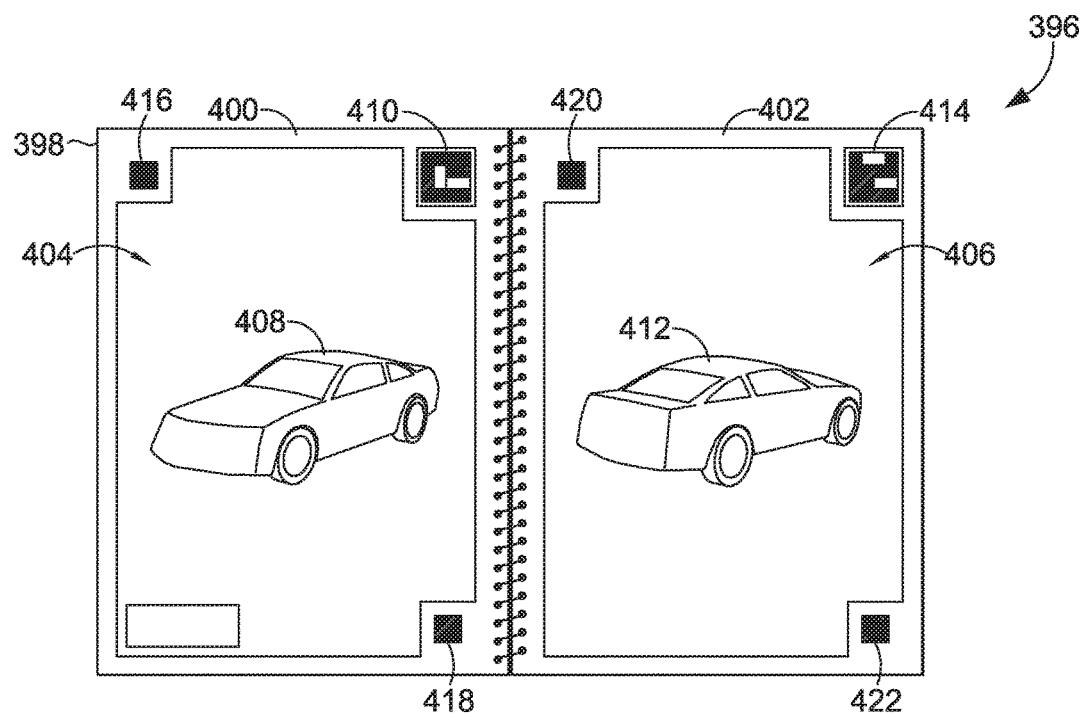
FIG. 34A is a top view of an exemplary sketch portfolio, in accordance with an embodiment of the invention.
Figure 34B:
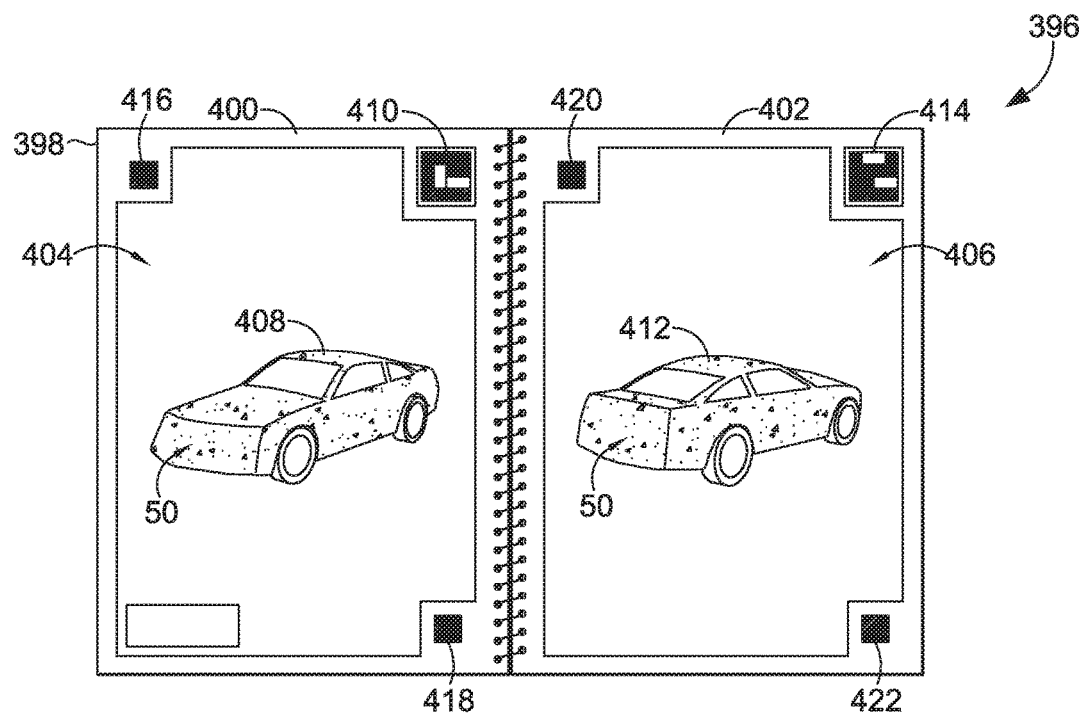
FIG. 34B is a top view of the exemplary sketch portfolio of FIG. 34A, in accordance with an embodiment of the invention.

Turning now to FIGS. 34A and 34B, an exemplary template animation kit 396 may include a template portfolio 398 having a first template page 400 and a second template page 402. The first template page 400 may include a first drawing environment 404 for coloring in a first template design 408. In embodiments, a computing device executing a template animation kit application may identify the first template design 408 based on capturing and/or scanning the first coloring figure identifier 410. First template page 400 may also include an upper page guide indicator 416 and a lower page guide indicator, which may be oriented in a number of different locations on the first template page 400. As further shown in FIG. 34A, the second template page 402 may include a second coloring figure identifier 414, an upper page guide indicator 420, and a lower page guide indicator 422. As such, one or more of the second coloring figure identifier 414, the upper page guide 420, and the lower page guide 422 may be scanned to identify and/or capture the second template design 412 on second template page 402. In embodiments, the first template design 408 indicates a front view of a figure for coloring, while the second template design 412 indicates a rear view of a figure for coloring. As such, in the template animation kit 396 of FIG. 34B, an amount of color 50 applied to the first template design 408 and the second template design 412 may be subsequently captured for application to a digital template as part of a digital animation environment.

Accordingly, as shown in the animation user interfaces 426 and 436 of FIGS. 35 and 36, an exemplary computing device 230 executing a digital template animation kit application may include a digital template animation environment 236 displayed on a screen 235 of the computing device 230, such as a touch-screen surface. In the embodiment of FIG. 35, a first template design 408 applied to a three-dimensional digital template is shown in an animated environment 434, such as a car animated on a track 428. Animation user interfaces 426 and 436 may further include a car selector menu item 430 for selecting among one of multiple prepared digital templates scanned by a user, a background selector item 432 for selecting an animation background, and a publish option 318 for publishing the captured animation, such as providing the user's animation creation, or a captured image (e.g., a digital file) of such, to another user via email or publication via website. As further depicted in the embodiment of FIG. 36, a second template design 412 applied to an animated three-dimensional template may continue to animate within the animated environment 434, such as on the track 428. As such, the orientation of the animated image may change throughout the animated environment 434, while the coloring applied to the view of the digital template may change based on orientation of the object.

Figure 37:
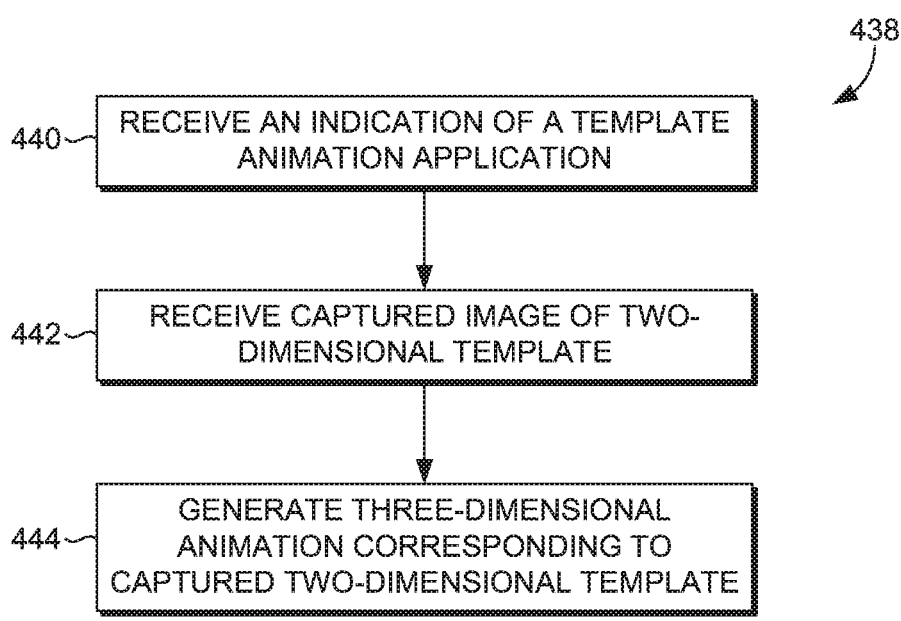
FIG. 37 is an exemplary flow diagram of a method for generating a three-dimensional animation corresponding to a captured two-dimensional template, in accordance with an embodiment of the invention.

As such, in one embodiment of the invention, at method 438 for generating a three-dimensional image from a captured two-dimensional image is provided in FIG. 37. At block 440, an indication of a template animation application is received. At block 442, a captured image of a two-dimensional template is received. Further, as shown at block 444, a three-dimensional animation corresponding to the captured two-dimensional template is generated. As such, in one embodiment, the three-dimensional animation generated at block 444 may include an amount of coloring applied by a user to the two-dimensional template, such as a template design of a template page in a template portfolio.

Figure 39:
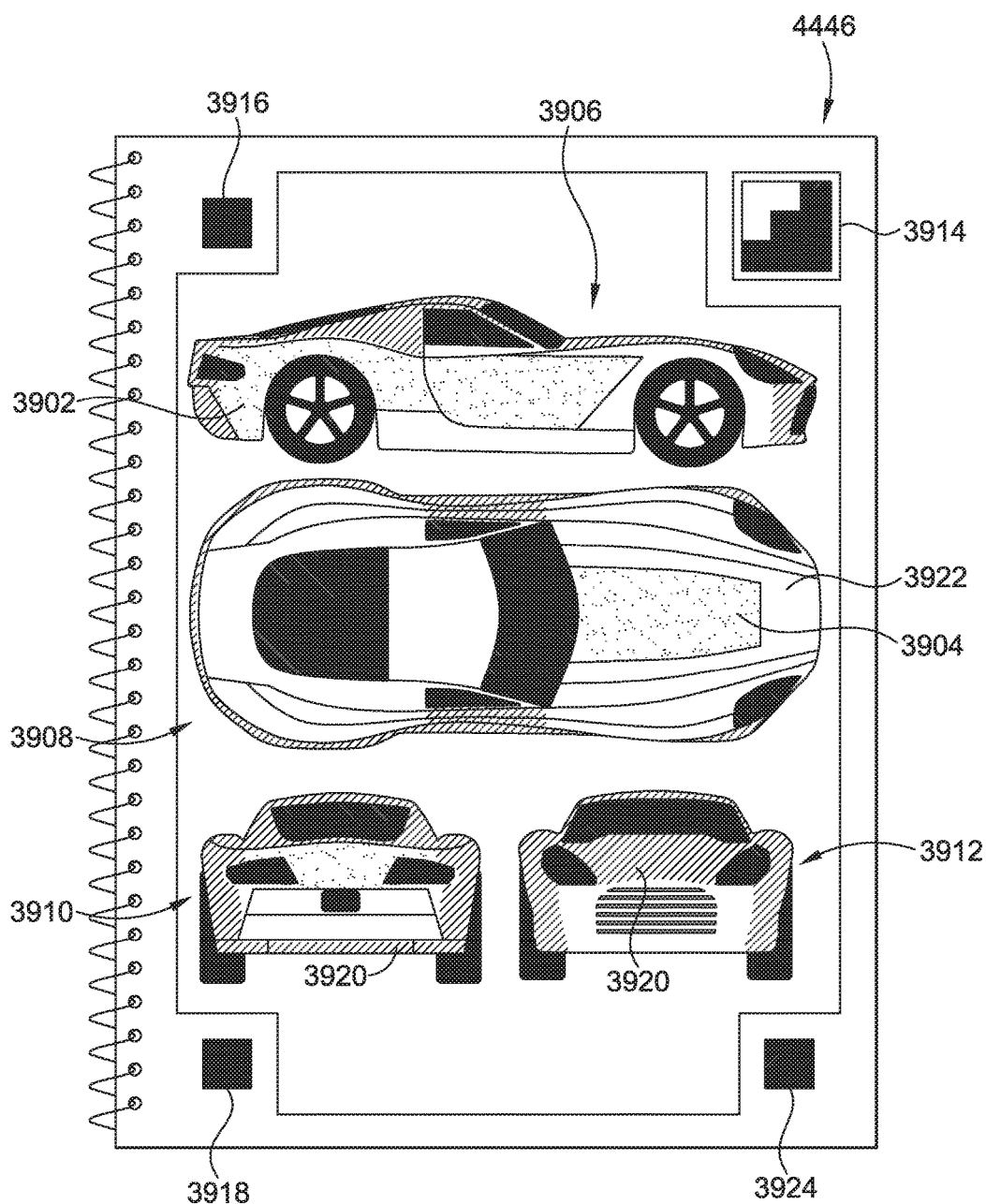
FIG. 39 is a top view of an exemplary sketch portfolio, in accordance with an embodiment of the invention.

In embodiments, the template page comprises a perspective view of the template design and/or multiple different views of the template design. In some aspects, the use of multiple perspectives not only encourages a greater amount of the user's creativity, but it also allows the template animation kit application to generate, via the processor, a more accurate three-dimensional representation of the coloring figure. That is, while some three-dimensional objects may be more accurately represented by two perspectives (e.g., a dress or a plant), other three-dimensional objects benefit from being represented with multiple perspectives (e.g., a car, a building, or an animal). As such, certain embodiments of the template design, as illustrated in FIG. 39, include multiple perspectives. In one embodiment, these multiple perspectives may be represented on a single page such that a user need only color the multiple perspectives of the template design, and scan a single page using embodiments described herein for animating the template design in response to a single captured view.

In some aspects, these multiple perspectives include not only a side perspective 3906 and a top perspective 3908, but also a front perspective 3910 and a back perspective 3912. As will be understood, fewer or additional views may be included within the template page. Because the exemplary template design includes multiple perspectives, the template animation kit application may be able to more efficiently extract the user's markings from multiple perspectives and incorporate those markings into the three-dimensional digital template, thereby creating a more detailed three-dimensional animation and saving computing processing power. For example, in embodiments, the template animation kit application will populate a user's first markings 3902 on the side perspective of a car 3906 to the sides of a three-dimensional template of a car (not shown). Similarly, the template animation kit application applies a user's second markings 3904 on the top perspective of the car 3908 to the top the three-dimensional template of the car. The template animation kit application continues to do the same for each perspective view of the design template, so that the template animation kit application creates a three-dimensional representation of the coloring figure depicted in the two-dimensional perspective view. In other words, the user's hand-drawn coloring of the template design, including colored surfaces on multiple sides of the object being colored, may then be captured and applied to the "virtual" drawing in multiple dimensions, including the colored markings that the user applied to the two-dimensional template. In further aspects, the multiple views of the colored objects, as provided to a user via the coloring template pages, may be singly scanned for activation and/or animation within a three dimensional environment, with minimal interaction from a user to direct the application of the user's colored markings to the three-dimensional template. In one aspect, as described further below, the multiple views of the template design may be automatically applied to the multiple portions of the three-dimensional template for providing a seamless coloring of the animated object that corresponds to the user's markings on the physical, template design.

Due to the difficulty in representing a three-dimensional object in a two-dimensional perspective, the template design may also comprise one or more restricted marking areas, according to some embodiments of the invention. By creating a two-dimensional perspective view of a three-dimensional object, sections of the two-dimensional outline may overlap between two distinct perspective views. For example, referring to FIG. 39, at least a portion of a hood section 3922 appearing in the top perspective view 3908 may also appear in the front perspective view 3912. In these embodiments, the restricted marking area 3920 may include a distinct pattern that indicates to a user that the user's markings in that section will not be applied to the three-dimensional template. In other embodiments, this restricted marking area instructs the template animation kit application to not apply any markings within the restricted area to the three-dimensional template.

Continuing with the embodiment represented in FIG. 39, the template page 4446 comprises one or more page guide identifiers 3916 and a coloring figure identifier 3914. As discussed previously, the coloring figure identifier indicates, to the application executed by a computing device, the particular template design view represented on the template page. According to some embodiments of the invention. This may allow the computing device to readily identify the template design represented in the captured image, which in the current embodiment is a car 3906. Accordingly, the coloring figure may enable the template animation kit application to analyze the captured image in much less time and with much less computer processing power. In embodiments, instead of analyzing the template design to determine which three-dimensional template to generate, the template animation kit application may be able to quickly analyze the coloring figure and determine which three-dimensional template to generate based on the coloring figure identifier that is identified by the application. This in turn preserves the battery life of the computing device, as well as shortens the time between a user's hand-drawn coloring and the user's eventual, virtual experience that portrays the user's artwork in motion. In some aspects, upon identification of the coloring figure identifier, the application identifies and replicates, via the computing device, the user's markings on template design and applies them to the three-dimensional animation template within the digital template animation environment.

Figure 42:
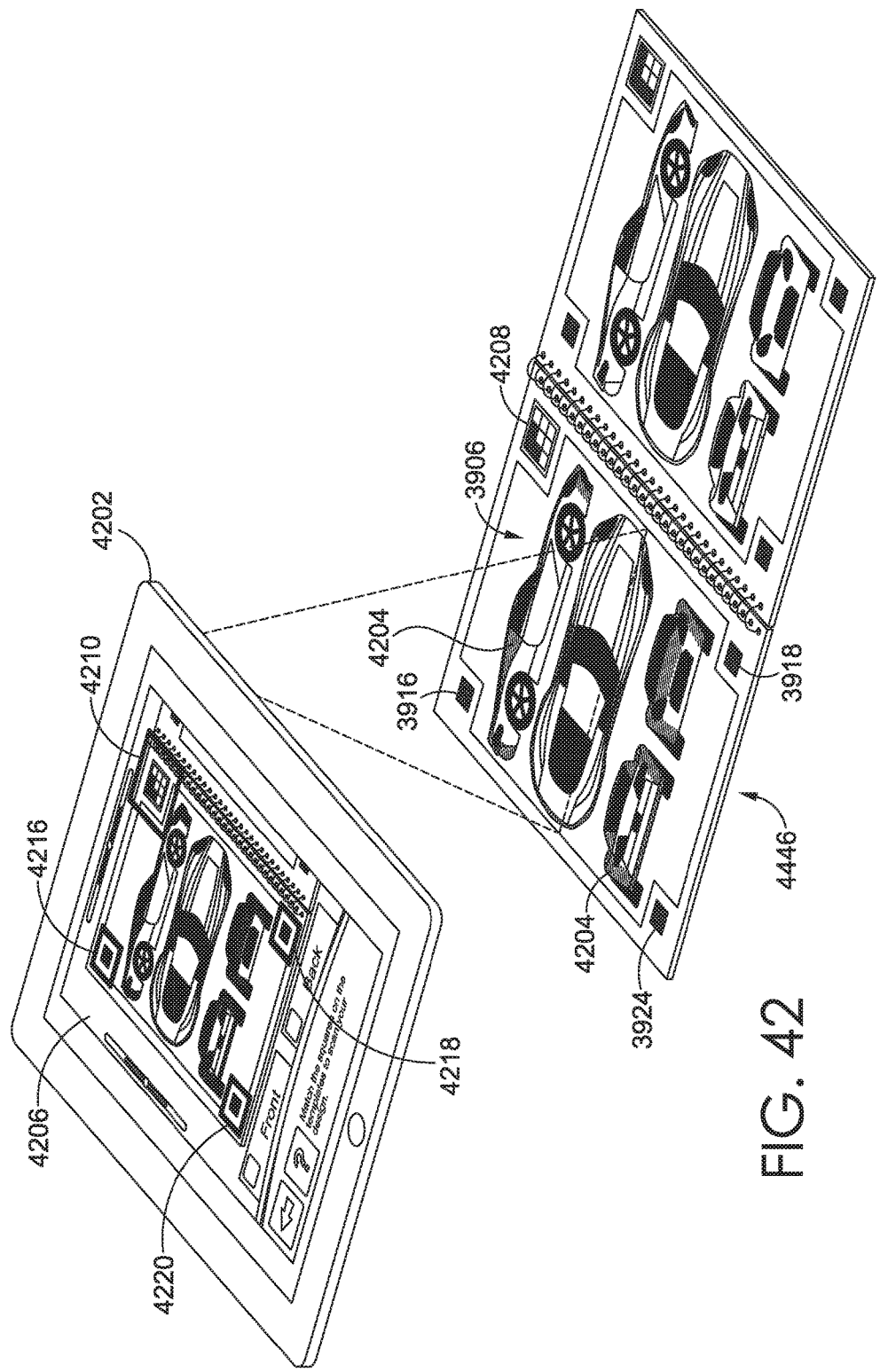
FIG. 42 is a top, perspective view of a computing device capturing an image of an exemplary sketch portfolio, in accordance with an embodiment of the invention.

Referring to FIG. 42, certain embodiments include an application that is associated with a template portfolio kit and executed on a computing device 4202, such as the template animation kit application. As discussed previously, the computing device 4202 may be any computing device adapted to execute an application associated with the template animation kit. Having completed coloring in the template design 3906 with an amount of coloring 4204, the user may use the computing device 4202 to take a picture of at least a portion of the template page 4446, which is then displayed on the screen 4206. As discussed above, according to embodiments, the template animation kit application is configured to activate an automatic capture feature of a camera component associated with the computing device. In these embodiments, the template animation kit application may instruct the camera associated with the computing device 4202 to capture an image of the template page when the upper page identifier 3916 becomes aligned with a first page guide 4216, a lower page identifier 3918 becomes aligned with a second page guide 4218, a third page identifier 3924 becomes aligned with a third page guide 4220, and coloring figure identifier 4208 becomes aligned with a fourth page guide 4210. In some aspects, as shown in the example of FIG. 42, a single template page, including multiple views of a template design, may further include at least one page guide and/or page identifier, and at least one coloring figure identifier that may be scanned and/or captured to generate a multi-dimensional view of a colored-in object from the single template page. In other words, in some embodiments, a single page of coloring by a user may be scanned to populate multiple colored views based on the association of the colored template page and template design with the corresponding coloring figure identifier, as scanned in association with at least one page guide and/or page identifier.

Figure 40:
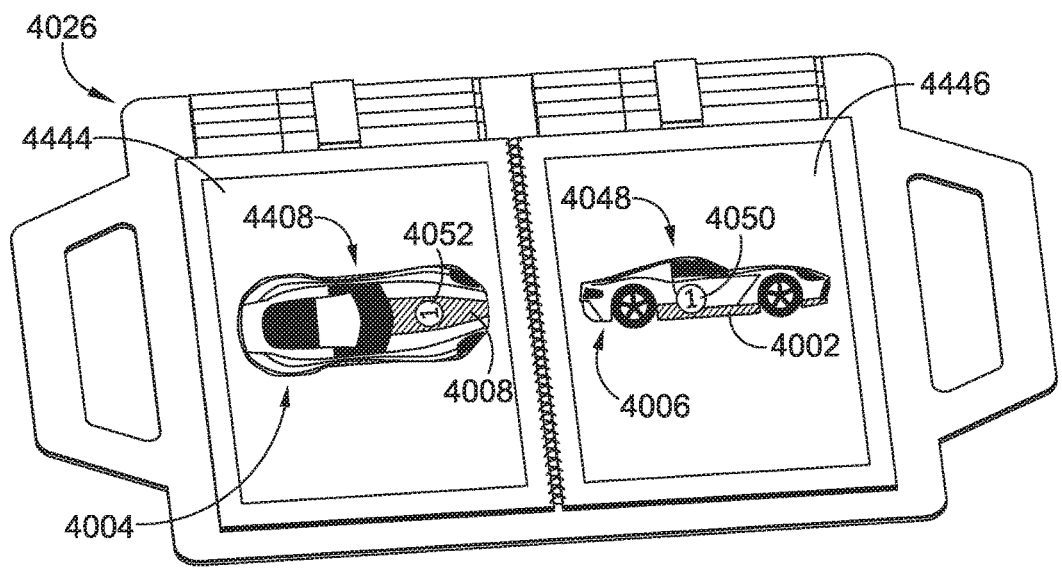
FIG. 40 is a top view of an exemplary sketch portfolio having a top perspective view and a side perspective view, in accordance with an embodiment of the invention.
Figure 41:
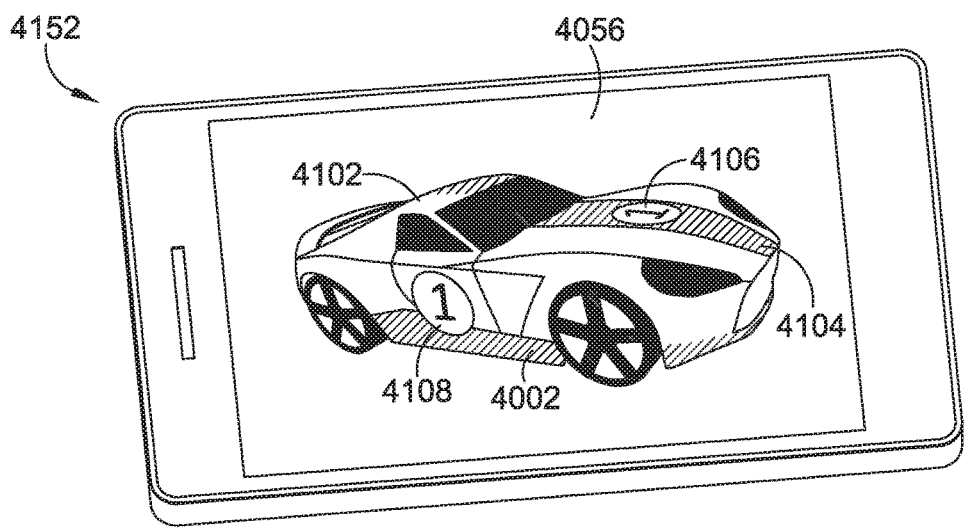
FIG. 41 is a top perspective view of a computing device executing an application, in accordance with an embodiment of the invention.

In FIG. 40, an embodiment of the template portfolio 4026 includes a first template page 4444 and a second template page 4446. The first template page 4444 includes an outlined representation of the template design 4048 from a top perspective 4004. The second template page 4446 includes a side perspective 4006 of template design 4048. While it is understood that marks made by the user may include, for example, coloring, shading, symbols, textures, lettering, patterns, etc., the top perspective 4004 is enhanced by user markings of an amount of shading 4008 and a first numbering 4052. The side perspective 4006 is enhanced by the user with a color marking 4002 and a second numbering 4050. As shown in FIGS. 40 and 41, the application associated with the template animation kit may utilize the computing device to identify and extract the user's markings of the shading 4008, the first numbering 4052, the color marking 4002, and second numbering 4050 and apply one or more of those extractions to the three-dimensional template 4102. As such, the three-dimensional template 4102 now comprises the user markings of shading 4104, the first numbering 4106, and second numbing 4108. In some aspects, the three-dimensional template is then displayed to the user on the computing device 4152 via the display 4056.

In some embodiments, the template animation kit application may autocorrect any discrepancies between the user's marks and the three-dimensional template. In other words, as discussed above, if the user's markings are outside the outline of the design template, the captured image is corrected when the template animation kit application identifies the coloring as being outside the template design. The application therefore does not apply the out-of-bounds coloring to the three-dimensional template, according to some embodiments. Similarly, in some embodiments, if the design template is not completely colored-in by a user and leaves gaps in the markings, then the template animation kit application may generate a color that is consistent with the markings closest to those gaps and auto-fill the gap 42 with the color.

In alternative embodiments, the template animation kit application does not fill in the gaps and generates a generic color, e.g., grey, to any portion of the template design that does not contain any amount of markings. Referring to FIGS. 40 and 41, an uncolored area 4010 on the template page 4446 will be supplemented with a predetermined color, such as grey.

As the three-dimensional template is generated within the digital animation environment, applying a user's hand-drawn markings on the template pages to the virtual, 3-D template, the template animation kit application further generates the animation scene that relates to the three dimensional template. In certain embodiments, the animation scene may be generated by the template animation kit application in response to any of the following circumstances: upon the user's selection; the recognition of the template design; or the recognition of the coloring figure identifier. With regard to the latter, the coloring figure identifier may include one or more items of information that communicate which animation scene should be generated. For example, when the template design relates to a bird, the coloring figure identifier not only instructs the application to generate a three-dimensional bird that corresponds to the template design, but it further instructs the application to generate an animation scene that is unique to that coloring figure, such as a forest.

Various animation scenes are contemplated herein. With regard to FIG. 43, the template animation kit application generates an animation scene of a garage 4316 when the three-dimensional template relates to a sports car 4102. As depicted in FIG. 44, the template animation kit application may alternatively portray the animation scene as a video game. In these embodiments, the digital animation environment includes the animated car that is driving in an animation scene with a background comprising buildings 4414 and a road 4412. Continuing with this example, the template animation kit application displays, via the computing device screen, an amount of laps left in the racing video game 4404, a speed of the three dimensional animation 4406, a total time 4408 that has elapsed since the beginning of the race, and a lap time 4410. Other embodiments of video game animation scenes include a ramps course, where the user controls the animated car through the course and gathers points by jumping off ramps and performing flips and tricks.

Additionally, in embodiments, the animation scene may be manipulated by the user. For example, when the template animation kit application receives a user's instruction via the touch-screen display 4358, the application allows the user to view the three-dimensional template from various vantage points. In other embodiments, when the animation scene relates to a video game, the application allows the user to direct the three-dimensional animation in the video game.

Figure 43:
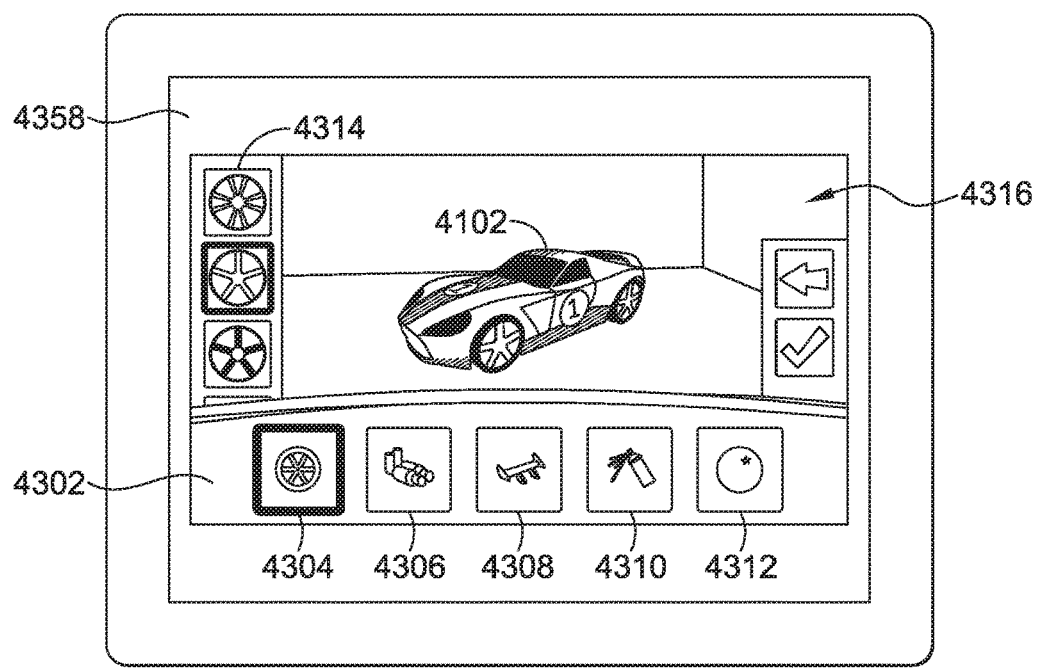
FIG. 43 is a top view of the user interface of a computing device executing an application, in accordance with an embodiment of the invention.
Figure 44:
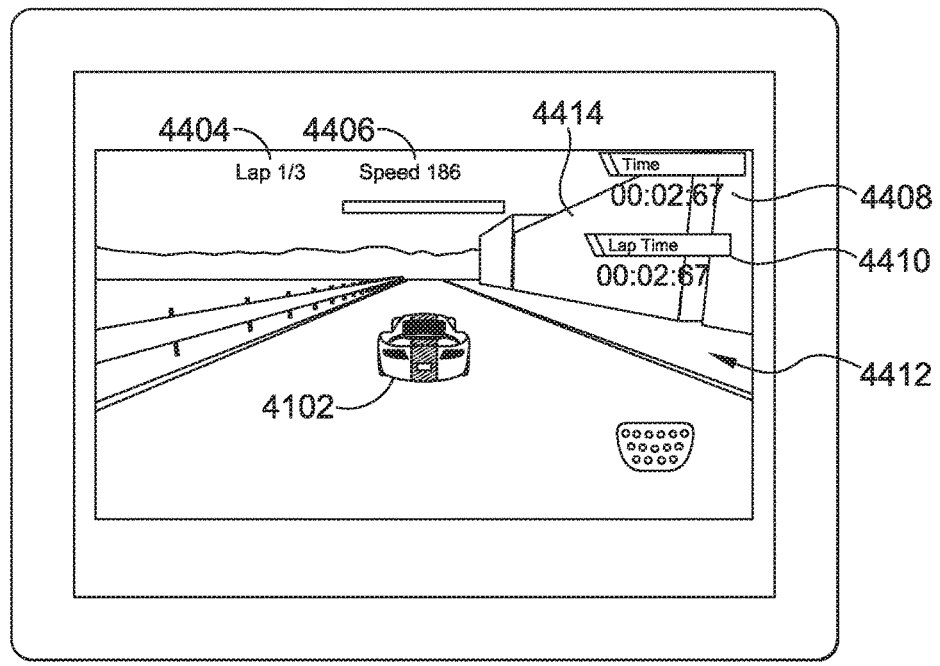
FIG. 44 is a top view of the user interface of a computing device executing an application, in accordance with an embodiment of the invention.

The template animation kit application may also present an editing interface 4302 to the user via the display of the computing device, as depicted in FIG. 43. Within the editing interface 4302, the template animation kit application allows the user to further edit the three-dimensional digital template 4102. For example, the options provided in association with the editing interface in the embodiment of FIG. 43 include a wheel editor 4304, a spoiler editor 4306, a color editor 4310, and a shading editor 4312. In response to a user's selection of the wheel editor 4304, the template animation kit application presents the user with a plurality of wheel options 4314. The template animation kit application then alters the wheels on the three-dimensional digital template based on the user's wheel selection. Similarly, selecting any of the other editors (spoiler editor 4306, color editor 4310, or shading editor 4312) presents the user with the ability to further enhance the three-dimensional template.

Figure 45A:
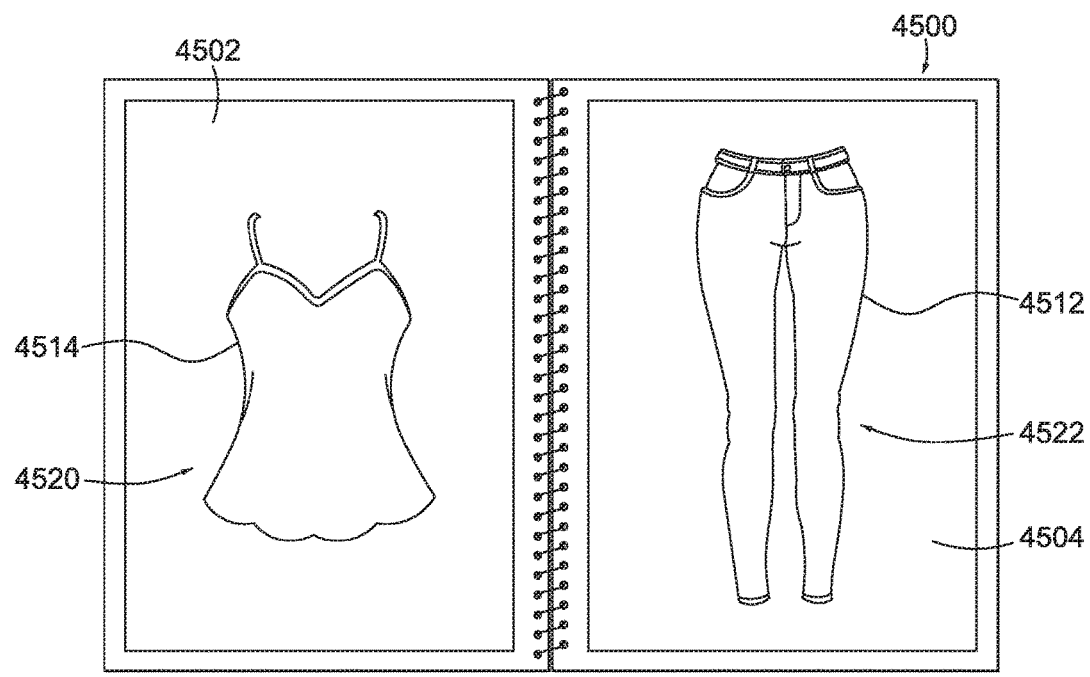
FIG. 45A is a top view of an exemplary sketch portfolio, in accordance with an embodiments of the invention.
Figure 45B:
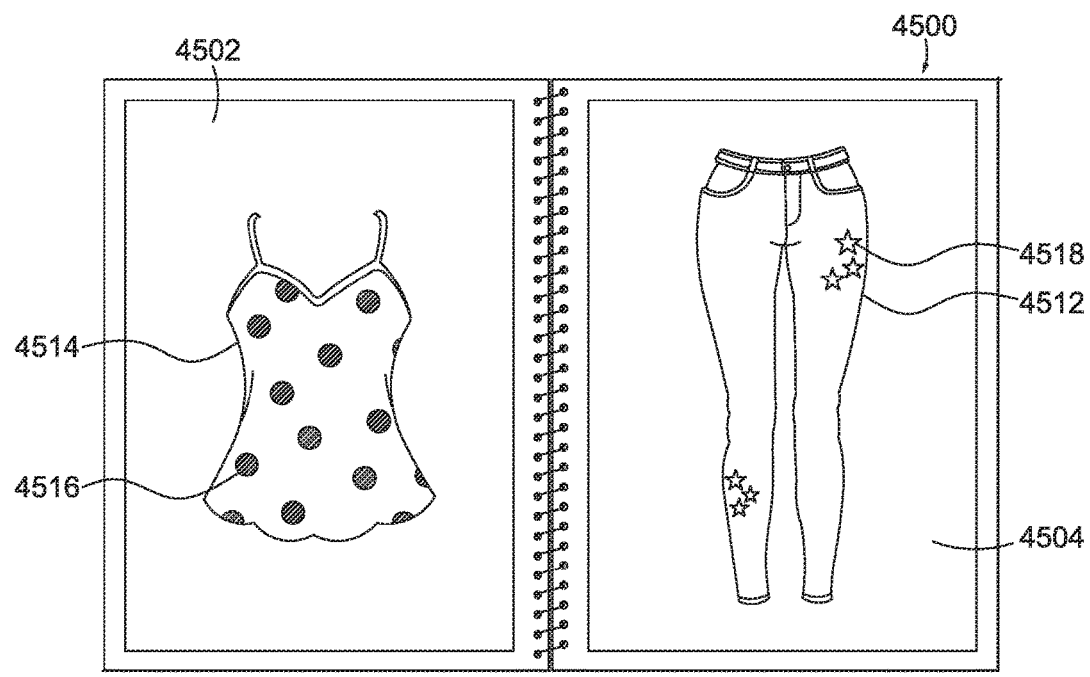
FIG. 45B is a top view of the exemplary sketch portfolio of 45A, in accordance with an embodiments of the invention.

Turning next to FIGS. 45A-B, a template portfolio 4500 comprising at least two template pages is depicted in accordance with an embodiment. For example, the template portfolio 4500 comprises a first template page 4502 and a second template page 4504, where each have a first template design 4514 and a second template design 4512, respectively. While the template portfolio 4500 depicts the first template design 4514 and the second template design 4512 on separate pages, it is foreseen that they may be on a single template page.

In embodiments, the first template design 4514 and the second template design 4512 relate to printed templates having a line art fashion sketch appearance. In one aspect, the first template design 4514 and the second template design 4512 depict an outline of fashion items, such as a tank top 4520 and jeans 4522, respectively. In alternative embodiments, the first template design 4514 and the second template design 4512 create line art for other items, including cars, animals, plants, and buildings. Any and all variations as aspects thereof are contemplated herein.

With reference to 45B, in embodiments, the first template design 4514 and the second template design 4512 can be adapted to receive physical markings from the design marker. For example, a first physical marking 4516, such as shading and patterns, can be received on the first template page 4502. Similarly, a second physical marking 4518, such as a symbol (e.g., a star), can be received on the second template page 4504. Accordingly, a user can color-in and personalize template design outlines.

Figure 46:
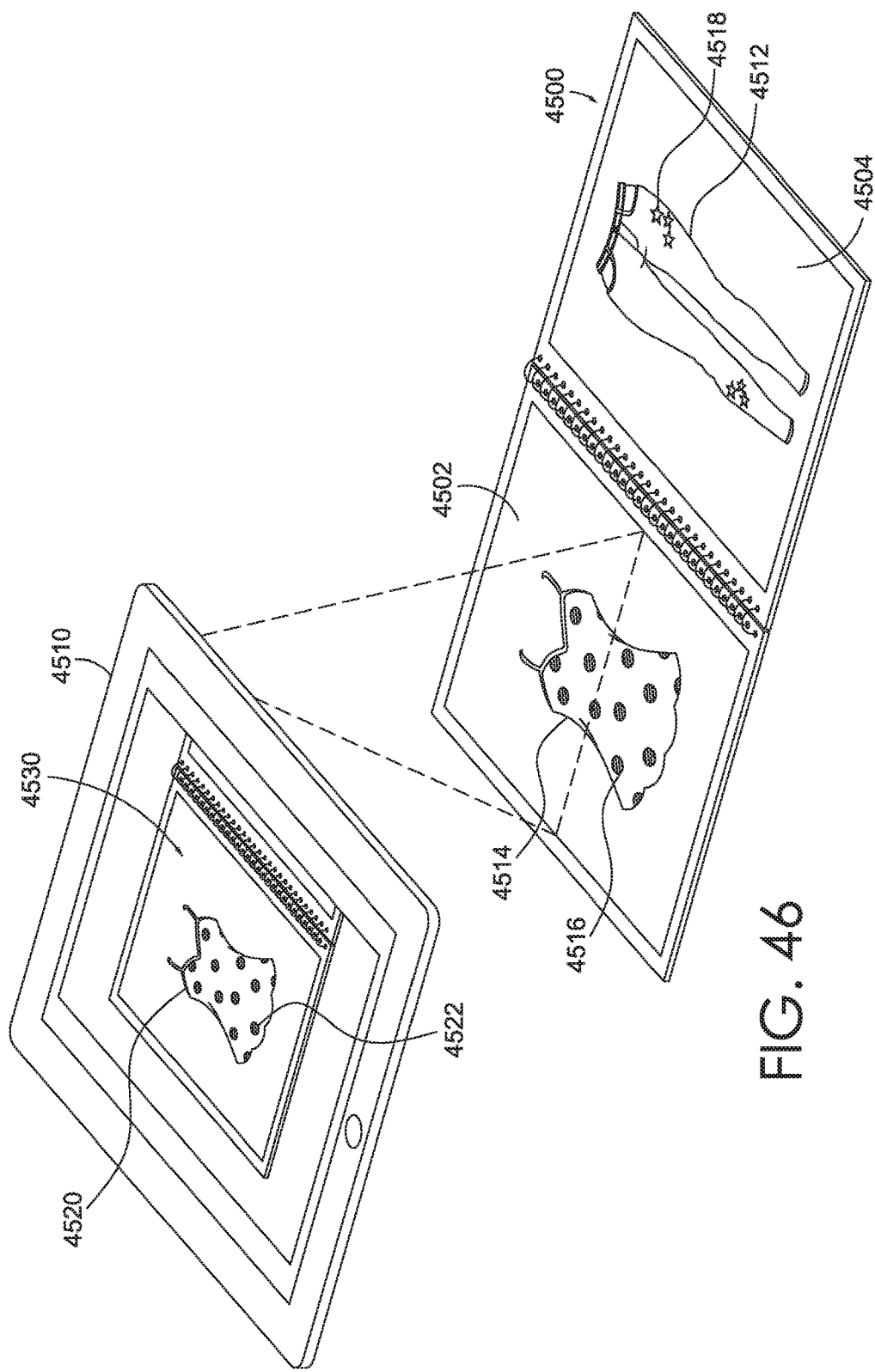
FIG. 46 is a top, perspective view of a computing device capturing an image of an exemplary sketch portfolio, in accordance with an embodiments of the invention.

As shown in FIG. 46, embodiments of the template animation kit application can generate the modified digital template. For instance, the template animation kit application can receive one or more captured images taken by a camera associated with a computing device 4510. The captured image may comprise one or more template pages having physical markings, such as the first physical marking 4516. The template animation kit application may automatically identify the first template design 4514 based on the content of the drawing environment (e.g., the line art associated with first template design).

In embodiments, upon identifying the first template design 5414, the template animation kit application can generate a digital template 4520 corresponding to the identified first template design 5414. Based on the corresponding digital template 4520, the template animation kit application can create a digitally enhanced outline 4530 (also referred herein as a modified digital template 4530) by incorporating the physical markings 4516 into the corresponding digital template 4520. In other words, the digital template 4520 is populated with a captured-image representation 4522 of the physical marking 4516. In embodiments, the template animation kit application can create a plurality of modified digital templates based on other template designs and physical markings, such as the second template design 4512 having the second physical markings 4518.

Figure 47:
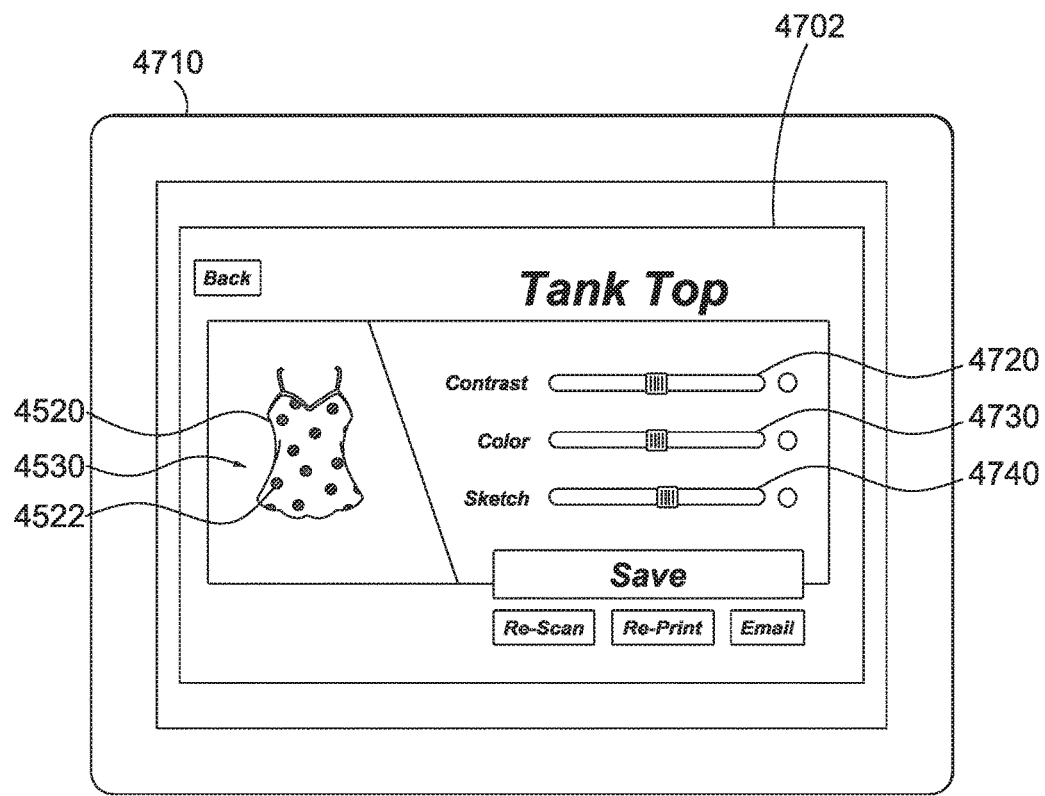
FIG. 47 is a top view of a user interface of a computing device executing an application, in accordance with an embodiments of the invention.

In embodiments, the digital template animation kit enables the computing device 4510 to further enhance the modified digital template 4530 through a digital template editor. As shown in FIG. 47, the digital template editor may be presented as a digital template editor user interface 4702 for display on a computing device 4710. In embodiments, the digital template editor user interface 4702 comprises one or more refining tools for enhancing the modified digital template 4530. For instance, the one or more refining tools can refine the physical markings 4522 incorporated into the modified digital template 4530.

With continued reference to FIG. 47, the one or more image refining tools may comprise a contrast refining tool 4720, a color refining tool 4730, and a sketch refining tool 4740. For instance, the contrast refining tool 4720 can alter the contrast between the colors of the markings 4522. The color refining tool 4730 can alter the shades of color or the color itself of the user markings 4522. The sketch refining tool 4740 can enhance the markings 4522 by changing the texture of the markings 4522. For instance, a first texture may comprise a higher differentiation between individual marks such that the user markings appear more rough and/or distinct. A second texture may comprise a lower differentiation between individual user marks such that the user markings appear more blended and/or smooth. As such, in one aspect, the digital template animation kit application improves the functioning of the computing device 4710 by enabling it to further enhance the modified digital template 4530 after it is generated.

Figure 48A:
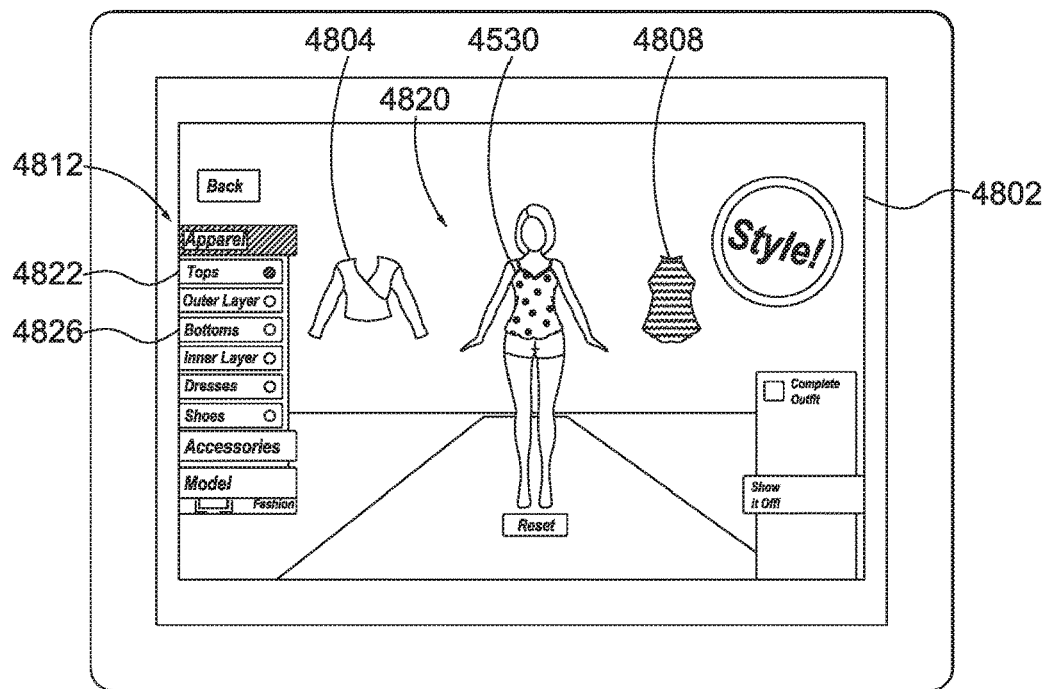
FIG. 48A is a top view of a user interface of a computing device executing an application, in accordance with an embodiments of the invention.
Figure 48B:
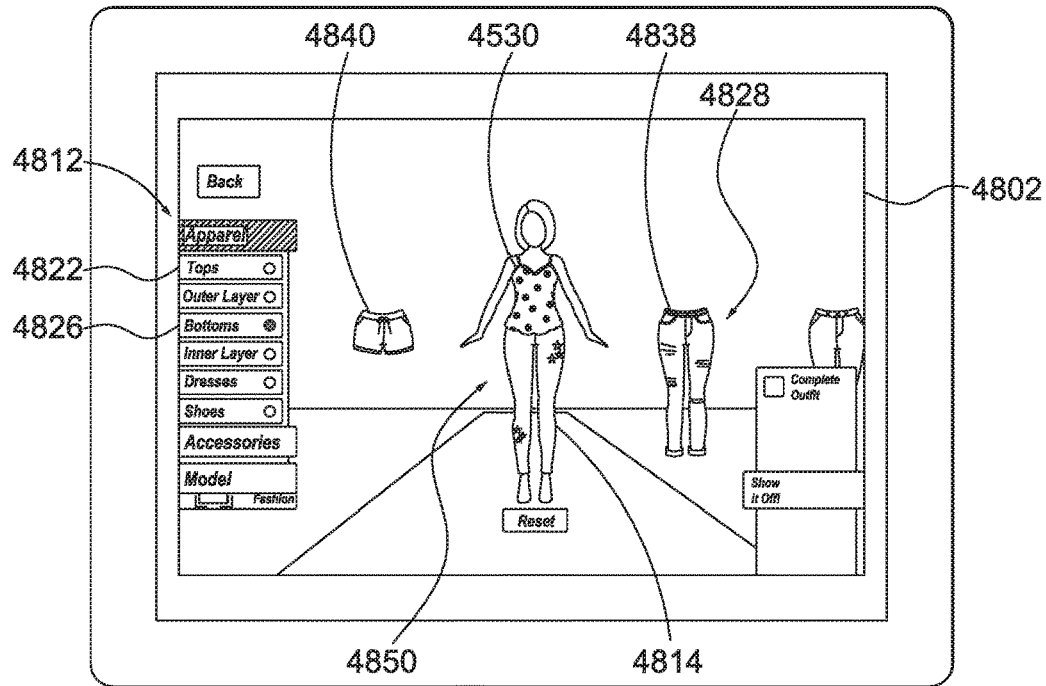
FIG. 48B is a top view of the user interface of a computing device executing an application of FIG. 48A, in accordance with an embodiments of the invention.

In exemplary embodiments, the modified digital template can be generated from at least two template designs, such as a front side and a back side of the modified digital template (as illustrated in FIGS. 14-15) or a top side and a bottom side (as illustrated in FIGS. 48A-B). In other words, each of the at least two template designs can relate to different aspects or features (used interchangeably herein) of the modified digital template that can be combined to create a complex modified digital template. As shown in FIGS. 14-15, the at least two template designs relate to a front aspect and a back aspect that can be combined to create a modified digital template having a corresponding front aspect and back aspect. Additionally or alternatively, the at least two template designs can relate to a top aspect and a bottom aspect of the modified digital template. For example, as shown in FIG. 45A-B, the first template design 4514 can relate to a top aspect of the digital template, such as fashion top (e.g., a tank top). Similarly, the second template design 4512 can relate to a bottom aspect of the digital template, such as a fashion bottom (e.g., jeans). Accordingly, the digital template animation kit application can generate a modified digital template (e.g., a fashion outfit) having the top aspect based on the first template design 4514 and a bottom aspect based on the second template design 4512. While the at least two template designs are described spatially (e.g., front, back, top, bottom), this is for ease of reference as the at least two template designs need not be limited to a spatial orientation.

As mentioned, the digital template animation kit application can generate a plurality of modified digital templates that may be used to further generate a modified digital template (also referred to as a complex modified digital template). For example, as illustrated in FIG. 48B, a virtual outfit 4850 can be generated from a first modified digital template (such as tank top digital template 4530) and a second modified digital template (such as a star-studded jeans digital template 4814). By integrating the first modified digital template with the first modified digital template from the first template design 4514 and user markings 4516 and a second modified digital template from the second template design 4512 and user markings 4518. It should be appreciated that by generating a modified digital template from at least two template designs, embodiments can improve the functioning of the computer by creating of more sophisticated and complex modified digital templates.

In embodiments, the modified digital template can be generated from at least two template designs based on user selection. With reference to FIGS. 48A-B, the digital template animation kit application can cause a computing device 4810 to present a modified digital template selection interface 4802. The modified digital template selection interface 4802 is an enhanced interface that allows for a user to selectively combine the first digital template (such as tank top digital template 4530) and second modified digital template (such as a star-studded jeans digital template 4814).

In embodiments, the modified digital template selection interface 4802 allows for faster querying and selection of modified digital templates to be combined. For example, the modified digital template selection interface 4802 may present for display two or more sets of modified digital templates that a user may query. Accordingly, a first set of modified digital templates 4820 may be queried for the first modified digital template (such as tank top digital template 4530) through user input (such as a scrolling or tapping input). Similarly, a second set of modified digital templates 4828 may be queried to pair the second modified digital template (such as a star-studded jeans digital template 4814) with the first modified digital template. In embodiments, two or more modified digital templates are presented within each set. It should be appreciated, however, that any number of the modified digital templates within each set may be presented at any given time.

Additionally or alternatively, each set of modified digital templates may correspond with a particular feature of a modified digital template. In other words, each set of modified digital templates may be associated with unique variations of the modified digital template. For example, the first set of modified digital templates 4820 may correspond various features related to a fashion top. As shown in FIG. 48A, the first set of modified digital templates 4820 may comprise a long-sleeve blouse digital template 4804, the tank-top digital template 4530, and a sleeveless-blouse digital template 4808. Similarly, the second set of modified digital templates 4828 may relate to a fashion bottom. As shown in FIG. 48B, the second set modified digital templates 4828 may comprise a shorts digital template 4840, the star-studded jeans digital template 4814, and a fashion jean digital template 4838. It should be appreciated that while template designs and modified digital templates are described with respect to fashion items, it is contemplated they may relate to all types of items and objects, such as cars, animals, buildings, plants and the like.

In embodiments, the modified digital template selection interface 4802 allows for quicker and more efficient querying of the one or more sets of modified digital templates via a corresponding rotational index. For example the digital template animation kit application may cause may cause the computing device 4810 to present for display the first set of modified digital templates 4820 and/or the second set modified digital templates 4828 via the corresponding rotational index. The corresponding rotational index allows for at least one modified digital templates from each of the sets to be presented simultaneously. In other words, a modified first digital template (e.g., the tank top digital template 4530) from the first set of modified digital templates 4820 may be presented simultaneously with a corresponding modified digital template (e.g., the star-studded jeans digital template 4814) from the second set of modified digital templates 4828. Additionally or alternatively, the corresponding rotational index allows the user to query within each set of modified digital templates. For instance, a user may rotate through the first set modified digital templates to view each modified digital templates indexed therein. As shown in FIG. 48A-B, the corresponding rotational index rotates horizontally such that the user can quickly query the first set of modified digital templates 4820 (FIG. 48A) and/or the second set of modified digital templates 4828 (FIG. 48B).

With continued reference to FIGS. 48A-B, in exemplary embodiments, the modified digital template selection interface 4802 comprises a navigation pane 4812 for transitioning between the corresponding rotational index. For instance, the navigation pane 4812 may have a selectable indicia to transition between each set of modified digital templates. As shown in FIGS. 48A-B, the modified digital template selection interface 4802 comprises a fashion tops selectable indicia 4822 to navigate to the first set of modified digital templates 4820 and a fashion bottom selectable indicia 4826 to navigate to the second set modified digital templates 4828. It should be appreciated that any one of these features of the modified digital template selection interface 4802 offer improvements in querying times.

As discussed above with reference to FIG. 24, a digital template 334 may be applied to a three-dimension template 336 to create an animated and/or enhanced three-dimensional template (also referred to as a customized three-dimensional template). As mentioned, a user may apply one or more changes to the three-dimensional digital template 336 having the digital template 334, as shown in FIG. 25. For example, one or more changes may be made to the three-dimensional digital template 336, such as hairstyle, hair color, model skin color, makeup, shoes, accessories, and the like, which is referred to herein as a customizable three-dimensional digital template.

Figure 49B:
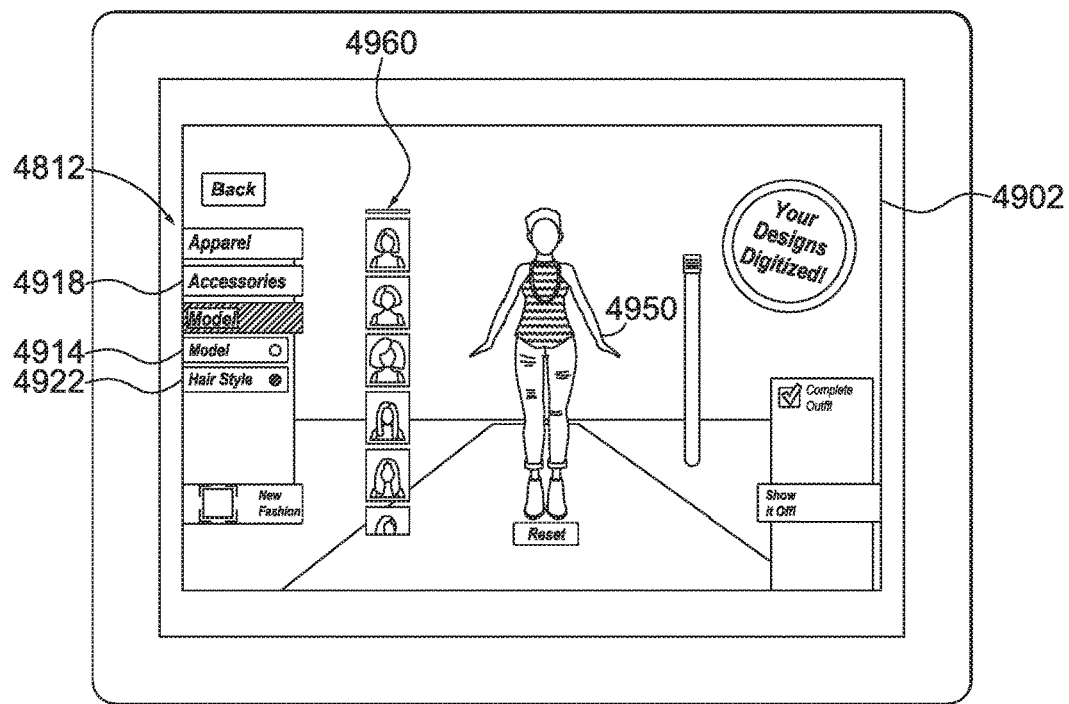
FIG. 49B is a top view of the user interface of a computing device executing an application of FIG. 49A, in accordance with an embodiments of the invention.

Similarly, FIGS. 49A-B illustrates that the modified digital template 4912 can be applied to a three-dimensional template 4950. In aspects, one or more changes can be made to the three-dimensional template to create a customizable three-dimensional template. In embodiments, the three-dimensional template 4950 is a model. Accordingly, in on aspect, one or more changes may be made to the hair style of the model using a hair style selectable indicia 4922 within the navigation pane 4812, as shown in FIG. 49B. By receiving a selection of the hair style selectable indicia 4922 via the computing device 4910, the digital template kit application will cause one or more hair style options 4960 to be presented in the three-dimensional template edit interface 4902. In embodiments, the model may be changed by receiving a selection of the model selectable indicia 4914 via the computing device 4910. As shown in FIG. 49A, the digital template kit application may cause one or more model options 4920 to be presented in the three-dimensional template edit interface 4902. Other features of the three-dimensional digital template may be changed, such as accessories, inner layers, outer layers, and shoes. Changing any and all features of an enhanced three-dimensional digital template are contemplated herein.

Figure 50:
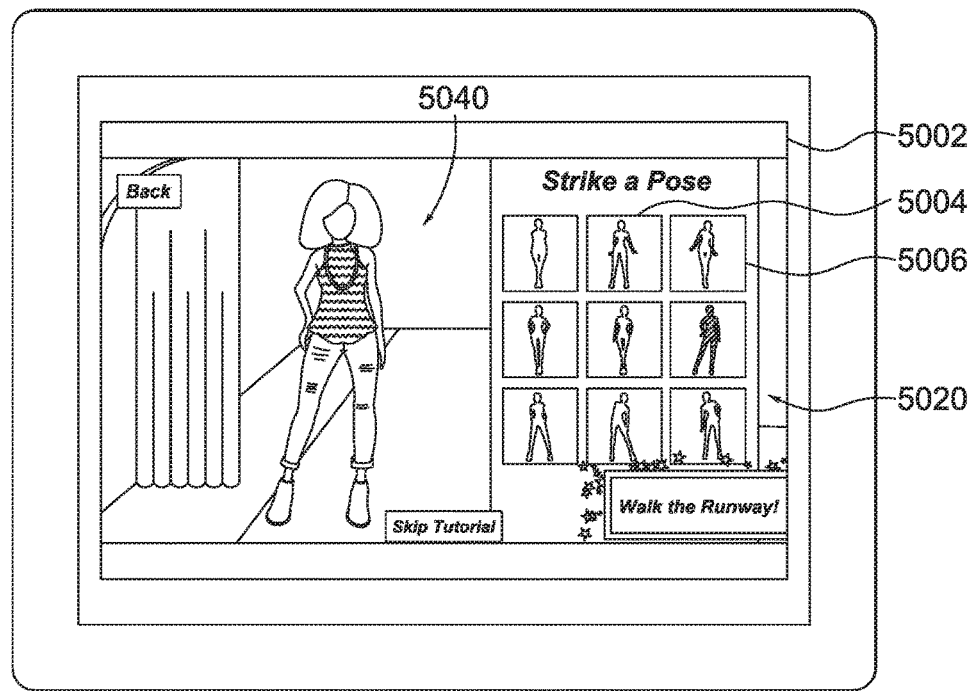
FIG. 50 is a top view of a user interface of a computing device executing an application, in accordance with an embodiments of the invention.
Figure 51:
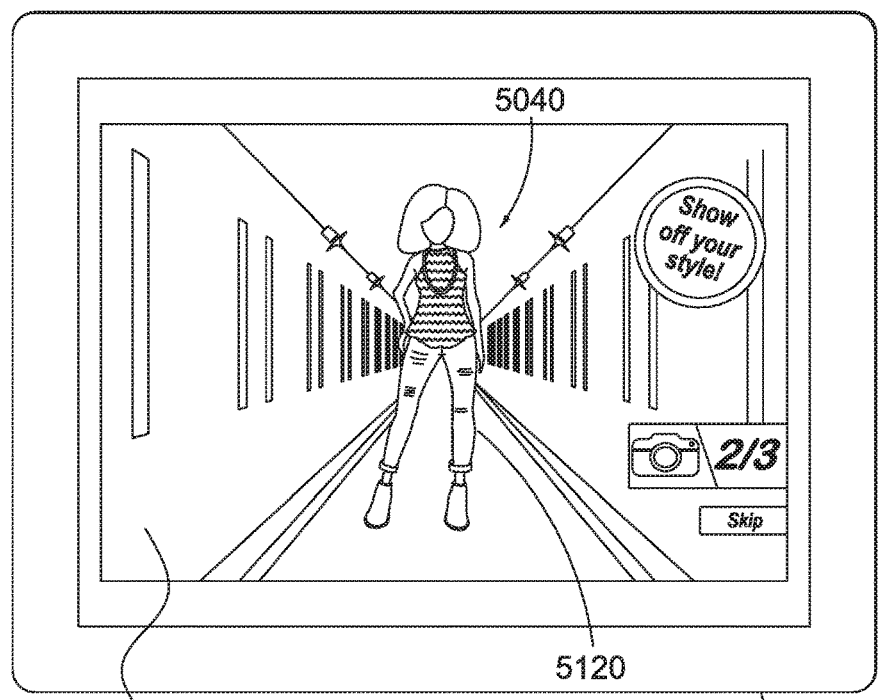
FIG. 51 is a top view of the user interface of a computing device executing an application, in accordance with an embodiments of the invention.

Referring next to FIGS. 50-51, in embodiments, the enhanced three-dimensional template can be animated in an animation scene. For instance, the model 5040 can be animated in a runway show 5110 (which is discussed in further details above with reference to FIGS. 23-24). In embodiments, the animation scene may comprise animated sup-sequences for the enhanced three-dimensional template. As shown in FIG. 51, the animated sub-sequence can be a pose 5120 for the model 5040.

In embodiments, the animation scene for the enhanced three-dimensional template may be automatically rendered from a plurality of sub-sequences. For instance, in embodiments where the animation scene is the runway show 5110, the runway show may be rendered from a plurality of poses for the model 5040. As shown in FIG. 50, an animation scene editor interface 5002 allows a user to modify the plurality of sub-sequences, such as model poses 5020. Accordingly, the digital template kit application may have predetermined animation sub-sequences (e.g., a first pose 5004 and a second pose 5006) that are user selectable. Upon receiving a user selection via input to the computing device 5010, the digital template kit application can render the animated scene based on the selected sub-sequences. In other words, the digital template kit application can automatically render the animated scene from the plurality of sub-sequences without requiring the user to go through the effort of writing computer code for customized animated sequences.

Referring next to FIG. 5, a green screen animation kit 82 depicted according to an embodiment of the invention includes a tool case 84, a pair of green screen gloves 86, a green screen 88, a digital stylus 90, a digital stamper 92, and a special effects glyph 94. In various embodiments of the animation kit 82, a portion of the components depicted in FIG. 5 may be part of the animation kit 82, while other components may be excluded from the kit. Tool case 84 provides a storage mechanism for one or more of the components in the animation kit 82, such as the green screen gloves 86 and the special effects glyph 94. Green screen 88 may be used as a backdrop for creating animations using the green screen animation kit 82. In some embodiments, the digital stylus 90 and digital stamper 92 may be used to enhance images generated using the animation kit 82.

Accordingly, embodiments of the invention include a device stand 96 for supporting a computing device 98, such as an iPad® device. A display 100 of the computing device 98 may include the animated image 102 generated using animation kit 82, as discussed below.

Figure 6:
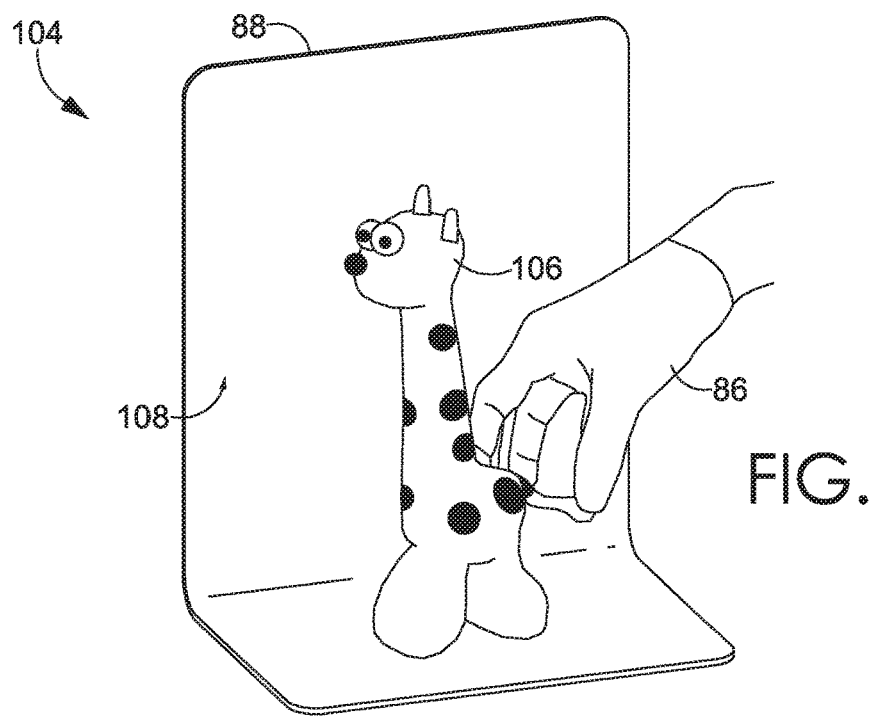
FIG. 6 is a perspective view of components of the green screen animation kit of FIG. 5, in accordance with an embodiment of the invention.
Figure 7:
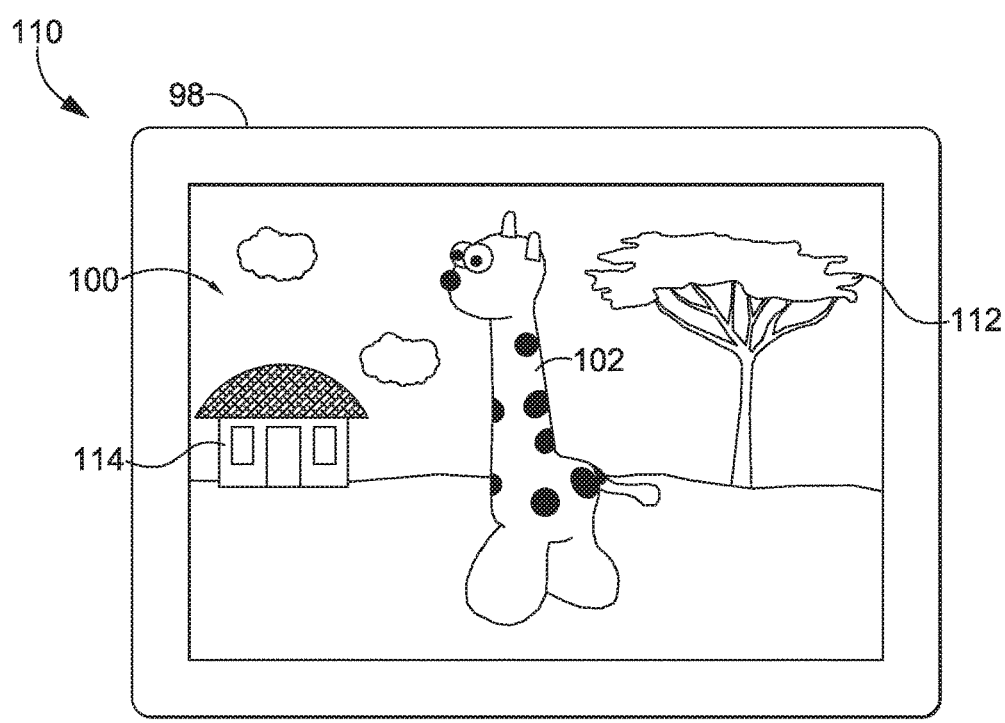
FIG. 7 is a top view of a computing device executing an application, in accordance with an embodiment of the invention.

Referring now to FIGS. 6 and 7, the components of the animation kit 82 may be used to create a digital animation using a physical object captured by a camera on a computing device, such as an iPad®. For example, in FIG. 6, an animation scene 104 includes the green screen 88 with a physical object 106 (the giraffe toy) positioned in front of the green screen 88. The physical object 106 is held by a user wearing the green screen glove 86. The surface 108 of the green screen 88 serves as a backdrop for the physical object 106 during an animation recording. As shown in the embodiment depicted in FIG. 7, a recorded image of the animation scene 104 in FIG. 6 is now portrayed on the display 100 of the computing device 98, with the animated image 102 of the physical object 106 being presented by the computing device 98 without the user's hand. As is known in the area of green screen technology, objects masked in green will not appear in a recorded image of a scene. As such, the user's hand is covered with green screen glove 86 so that the physical object 106 may be freely animated during animation by the computing device 98 executing an application associated with the animation kit 82.

Figure 8:
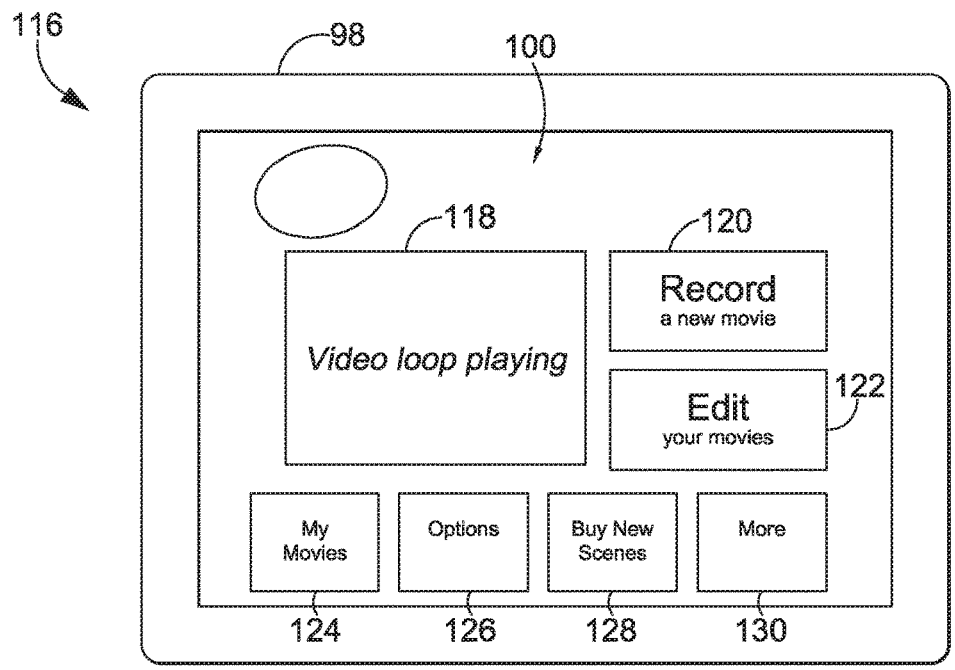
FIG. 8 is a top view of the user interface on a computing device executing an application, in accordance with an embodiment of the invention.

In some embodiments, digital content items 112 and 114 may be imported into the animated image by a user. As such, the green screen system is used to create an animated object without a background. A user-specified background may then be inserted into the captured/animated image using any number of digital content items, such as the digital content items 112 and 114 available via the application. As such, as shown in FIG. 8, a number of features provided by the application may be used to enhance the captured green screen view of FIG. 6. Further, additional enhancements may be made to the background of the video segment being generated on the user interface 110 of FIG. 7, such as movement of one or more of the digital content items 112 and 114 relative to the animated image 102. In some embodiments, the animated image 102 may move in coordination with the recorded movements generated by a user, such as a user simulating walking of the physical object 106. As such, the simulated walking of physical object 106 may be enhanced with the animated image 102 presented in front of a moving background.

In the embodiment of FIG. 8, an exemplary interface 116 includes a video loop playing component 118, a record component 120, an editing component 122, a my movies component 124, an options component 126, a buy new scenes component 128, and a more component 130.

Figure 9:
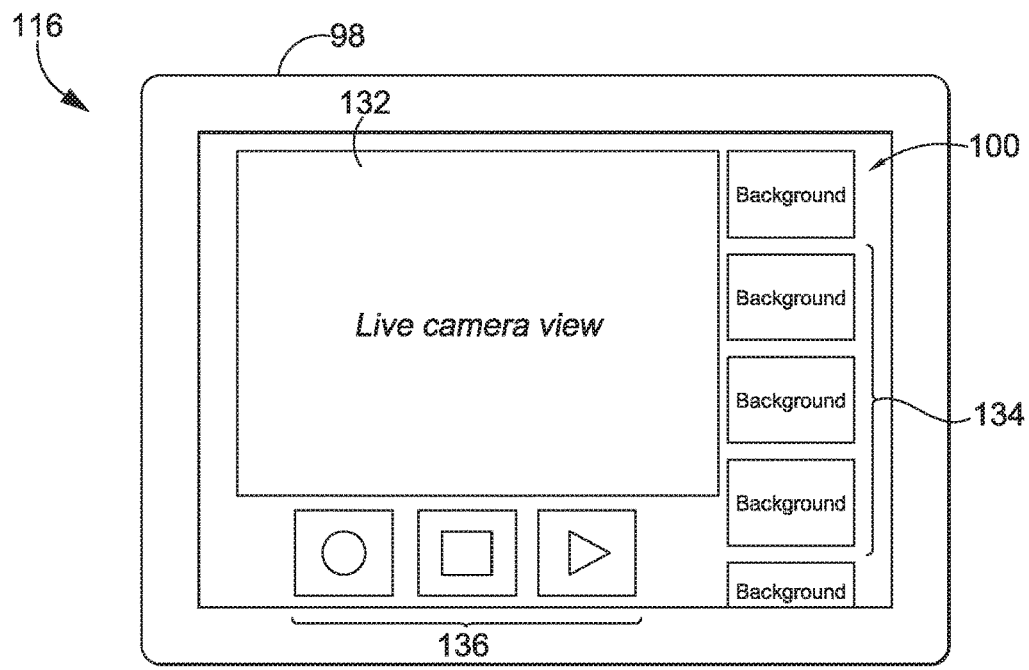
FIG. 9 is a top view of the user interface of a computing device executing an application, in accordance with an embodiment of the invention.

In FIG. 9, exemplary interface 116 includes a live camera view 132, multiple backgrounds 134, and playback buttons 136. During live recording of a physical object 106 in front of the green screen 88, a user may monitor the video being collected using the live camera view 132 of the application. Further, a user may select and insert a background layer or a foreground layer into the recorded image, such as one of the backgrounds 134 presented in interface 126. In some embodiments, the live camera view is provided with playback buttons 136.

In still further embodiments of the invention, a simplified user interface is provided for editing of a green screen animation. As such, a series of "quick tools" may be provided to perform editing features such as trimming the length of a movie to remove a beginning or end, adding music to the video, adding sound effects to the video, adding a video filter effect, etc. Additionally, other features may include the ability to merge movies together to create a single movie. In embodiments, such editing features are provided by an application included with the animation kit 82, and executed by the computing device 98.

In some embodiments, during recording with the animation kit 82, one or more settings associated with the application may be adjusted to compensate for video quality characteristics, such as lighting differences in the recording. In some embodiments, a hue slider is provided for color keying, while a range slider is used to compensate for hardness of shadows. Still further, a brightness/saturation boost may be provided by the application to enhance the visible characteristics of the displayed video. In embodiments of the invention, to stop and start a recording being taken by the computing device 98 running the application, a user may press a button on the screen to start a timer. Further, a glyph and/or indicator may be displayed to indicate that a timer has started. In further embodiments, a particular word, phrase, or gesture may be used to start the timer, such as a clap. In some embodiments, the computing device may record the green screen animation from either a front surface of the computing device or a back surface of the computing device.

Figure 10A:
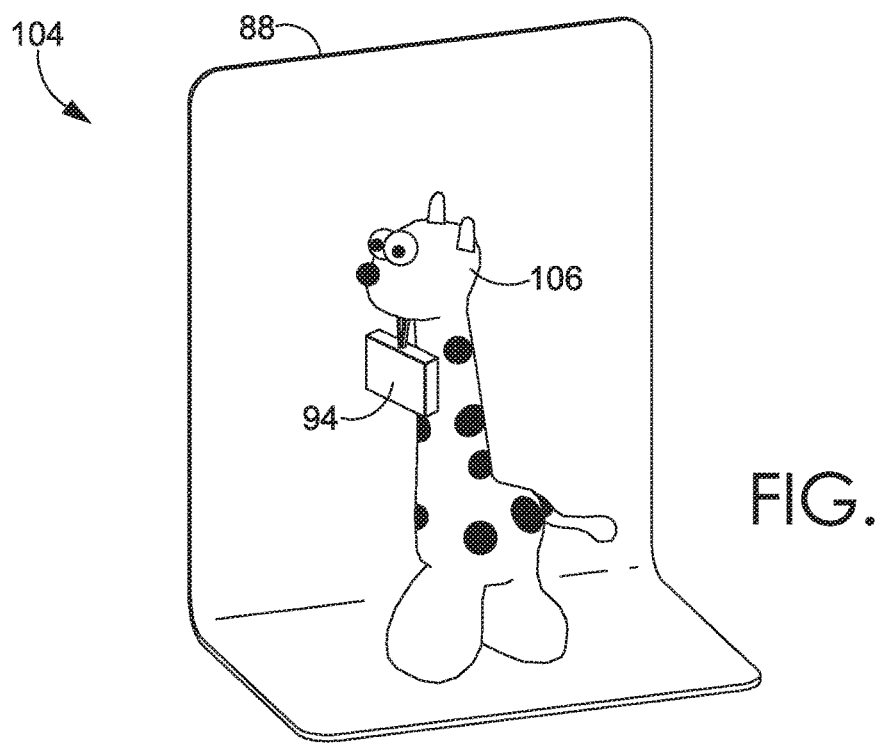
FIG. 10A is a perspective view of components of the green screen animation kit of FIG. 5, in accordance with an embodiment of the invention.
Figure 10B:
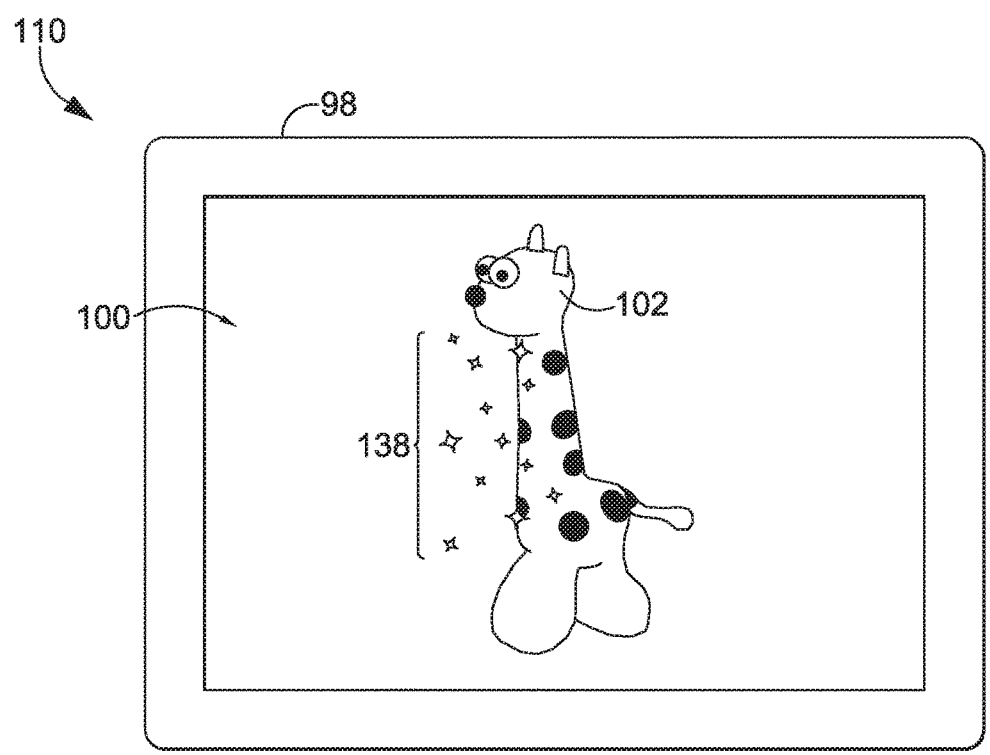
FIG. 10B is a top view of the user interface of a computing device executing an application, in accordance with an embodiment of the invention.

Turning now to the exemplary embodiments depicted in FIGS. 10A and 10B, a special effects animation scene on the user interface 110 includes the physical object 106 coupled to a glyph 94. The glyph 94 is a small object, detectable by the computing device 98, which is used to add special effects based upon recognition of the glyph 94 in association with the physical object 106. In embodiments, the application running on computing device 98 recognizes the glyph 94, as shown in the captured special effects animation of user interface 110 in FIG. 10B, and layers an animation on top of the captured video, such as the sparkle animation 138. While the location of the glyph determines the position of the animation added to the green screen animated scene, the application may be used to determine which special effect to layer on top of the animation. In some embodiments, fairy dust sparkles, fire, super hero capes, snow, and a variety of other animation special effects may be added to the animated image 102 based on attaching the glyph 94 to the physical object 106.

Figure 11:
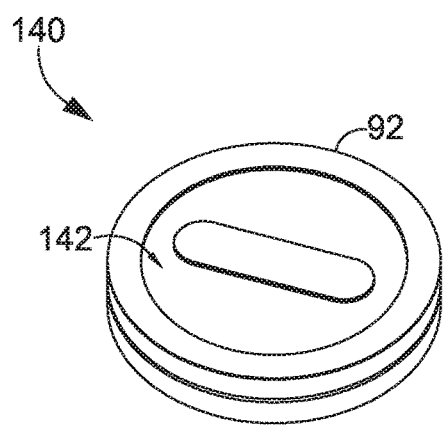
FIG. 11 is a top view of a digital stamping tool, in accordance with an embodiment of the invention.
Figure 12:
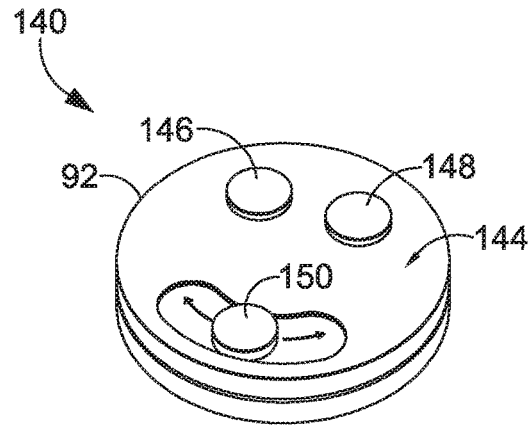
FIG. 12 is a bottom view of the digital stamping tool of FIG. 11, in accordance with an embodiment of the invention.

Turning now to FIGS. 11 and 12, the animation kit 82 may include additional enhancement tools such as the digital stamper 92 which is used to add additional enhancements to the animated image 102 based on contacting a touch-screen surface of the computing device 98. The digital stamper 140 has a top surface 142 and a bottom surface 144. When the bottom surface contacts the touch-screen of a computing device 98, one or more touchpoints contact the surface, such as stationary touch points 146 and 148, and translating touch-point 150. In embodiments, to determine which enhancements to generate based on contact with the digital stamper 92, the application is configured to identify a particular orientation of the translating touch-point 150 relative to the two other stationary touch points 146 and 148.

The following U.S. patent applications are hereby incorporated by reference in their entirety: U.S. Provisional Application No. 61/788,371 entitled "Digital Coloring Tools Kit with Panoramic View and Create-to-Destroy Interactive Features," filed Mar. 15, 2013, U.S. Nonprovisional application Ser. No. 14/213,544, entitled "Digital Coloring Tools Kit with Dynamic Digital Paint Palette," filed Mar. 14, 2014, U.S. Nonprovisional application Ser. No. 14/211,815, entitled "Panoramic Coloring Kit," filed Mar. 14, 2014, U.S. Provisional Application No. 61/788,349, entitled "Personalized Digital Animation and Digital Collage Creation Kit," filed Mar. 15, 2013, U.S. Nonprovisional application Ser. No. 14/213,526, entitled "Digital Collage Creation Kit," filed Mar. 14, 2014, and U.S. Nonprovisional application Ser. No. 14/213,564, entitled "Personalized Digital Animation Kit," filed Mar. 14, 2014, U.S. Nonprovisional application Ser. No. 14/213,586, entitled "Coloring Kit for Capturing and animating two-Dimensional Colored Creation".

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

Having thus described the invention, what is claimed is:

1. A digital template animation kit comprising:
a template portfolio comprising a plurality of template pages, wherein each of the plurality of template pages comprises at least one template design to receive a user marking; and
a template animation kit application that, when executed by a computing device,
generates a customizable animation environment, comprising a plurality of modified digital templates and at least one complex modified digital template,
wherein the plurality of modified digital templates is a digital representation generated from at least one captured image of the user marking made to at least one of the plurality of template pages,
and wherein the at least one complex modified digital template is generated in response to receiving a user selection of at least two modified digital templates to combine.

2. The digital template animation kit of claim 1, wherein the modified digital template is applied to a three-dimensional digital template to create an enhanced three-dimensional template.

3. The digital template animation kit of claim 2, wherein one or more features of the three-dimensional digital template is customizable.

4. The digital template animation kit of claim 2, wherein the enhanced three-dimensional template is incorporated into an animated scene.

5. The digital template animation kit of claim 4, wherein the template animation kit application generates the animated scene from a plurality of sub-segments for the enhanced three-dimensional template.

6. The digital template animation kit of claim 5, wherein the sub-segments are presented in an animation scene editor interface.

* * * * *

UNITED STATES PATENT AND TRADEMARK OFFICE
CERTIFICATE OF CORRECTION

PATENT NO. : 10,475,226 B2
APPLICATION NO. : 15/953073
DATED : November 12, 2019
INVENTOR(S) : Joseph Thomas Moll, Brian Nemeckay and Stephen Weiss Page 1 of 1

It is certified that error appears in the above-identified patent and that said Letters Patent is hereby corrected as shown below:

In the Specification

Column 29, Line 13: Please remove "on" in "in on aspect" and replace with --one--.

Signed and Sealed this
Twenty-fourth Day of December, 2019

Andrei Iancu
*Director of the United States Patent and Trademark Office*